(12) United States Patent
Nakatani et al.

(10) Patent No.: US 7,103,262 B2
(45) Date of Patent: *Sep. 5, 2006

(54) OPTICAL DISC RECORDING APPARATUS, COMPUTER-READABLE RECORDING MEDIUM RECORDING A FILE MANAGEMENT PROGRAM, AND OPTICAL DISC

(75) Inventors: Tokuo Nakatani, Ibaraki (JP); Yoshiho Gotoh, Osaka (JP); Yasushi Tamakoshi, Hirakata (JP); Hiroshi Kato, Kasuga (JP); Tomoyuki Okada, Katano (JP); Kaoru Murase, Ikoma-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1169 days.

This patent is subject to a terminal disclaimer.

(21) Appl. No.: 09/910,910

(22) Filed: Jul. 24, 2001

(65) Prior Publication Data

US 2001/0043804 A1    Nov. 22, 2001

Related U.S. Application Data

(62) Division of application No. 09/692,831, filed on Oct. 20, 2000, now Pat. No. 6,353,704, which is a division of application No. 09/512,353, filed on Feb. 24, 2000, now Pat. No. 6,285,827, which is a division of application No. 09/154,879, filed on Sep. 17, 1998, now Pat. No. 6,118,924.

(30) Foreign Application Priority Data

Sep. 17, 1997  (JP)  ................... 09-251991
Apr. 3, 1998  (JP)  ................... 10-092044
Apr. 24, 1998  (JP)  ................... 10-114665

(51) Int. Cl.
*H04N 5/91*    (2006.01)
*H04N 5/781*    (2006.01)

(52) U.S. Cl. ................... 386/70; 386/125; 386/126

(58) Field of Classification Search ........ 386/125–126, 386/70, 68, 69, 124

See application file for complete search history.

(56) References Cited

U.S. PATENT DOCUMENTS 4,862,439 A    8/1989  Ando et al.

(Continued)

FOREIGN PATENT DOCUMENTS

EP    0653758 A2    5/1995

(Continued)

OTHER PUBLICATIONS

"Hard Disk Cache Alterations for Digital Versatile/Video Disks", IBM Technical Disclosure Bulletin, Mar. 1997, vol. 40, No. 3, pp. 165-166.

*Primary Examiner*—Vincent F. Boccio
(74) *Attorney, Agent, or Firm*—Wenderoth, Lind & Ponack, L.L.P.

(57) ABSTRACT

An optical disc recording apparatus for recording a video object onto an optical disc. A recording area of the optical disc is divided into a plurality of zones which each include a plurality of adjacent tracks. The optical disc recording apparatus includes: a reading unit for reading from the optical disc the sector information showing data assignment for sectors on the optical disc; a recording unit for recording the video object onto the optical disc; and a control unit for controlling the reading unit and the recording unit. The control unit detects at least one series of consecutive unassigned sectors on the optical disc by referring to the read sector information. Each series has a total size greater than a minimum size and is located within a single zone. The minimum size corresponds to a data amount that ensures uninterrupted reproduction of the video object. The control unit also controls the recording unit to record the video object into the detected series.

10 Claims, 42 Drawing Sheets

U.S. PATENT DOCUMENTS

| | | |
|---|---|---|
| 5,038,217 A | 8/1991 | Hayashi et al. |
| 5,053,898 A | 10/1991 | Hashimoto et al. |
| 5,107,481 A | 4/1992 | Miki et al. |
| 5,386,402 A | 1/1995 | Iwata |
| 5,434,991 A | 7/1995 | Maeda et al. |
| 5,537,217 A | 7/1996 | Kajita et al. |
| 5,675,379 A | 10/1997 | Kato et al. |
| 5,675,383 A | 10/1997 | Yagasaki et al. |
| 5,719,983 A | 2/1998 | Henderson et al. |
| 5,757,421 A | 5/1998 | Kato et al. |
| 5,761,373 A | 6/1998 | Yamamoto |
| 5,778,142 A | 7/1998 | Taira et al. |
| 6,118,924 A * | 9/2000 | Nakatani et al. ............... 386/70 |
| 6,148,140 A | 11/2000 | Okada et al. |
| 6,181,870 B1 | 1/2001 | Okada et al. |
| 6,285,827 B1 * | 9/2001 | Nakatani et al. ............ 386/126 |
| 6,353,704 B1 * | 3/2002 | Nakatani et al. ............ 386/126 |

FOREIGN PATENT DOCUMENTS

| | | |
|---|---|---|
| EP | 0655740 | 5/1995 |
| EP | 0676761 A1 | 10/1995 |
| EP | 0709843 | 5/1996 |
| EP | 0 847 200 | 6/1998 |
| EP | 0866456 A1 | 9/1998 |
| EP | 0903738 A2 | 3/1999 |
| FR | 2759471 | 8/1998 |
| JP | 63104284 | 5/1988 |
| WO | 97/13366 | 4/1997 |
| WO | 98/14938 | 4/1998 |

* cited by examiner

FIG. 3A
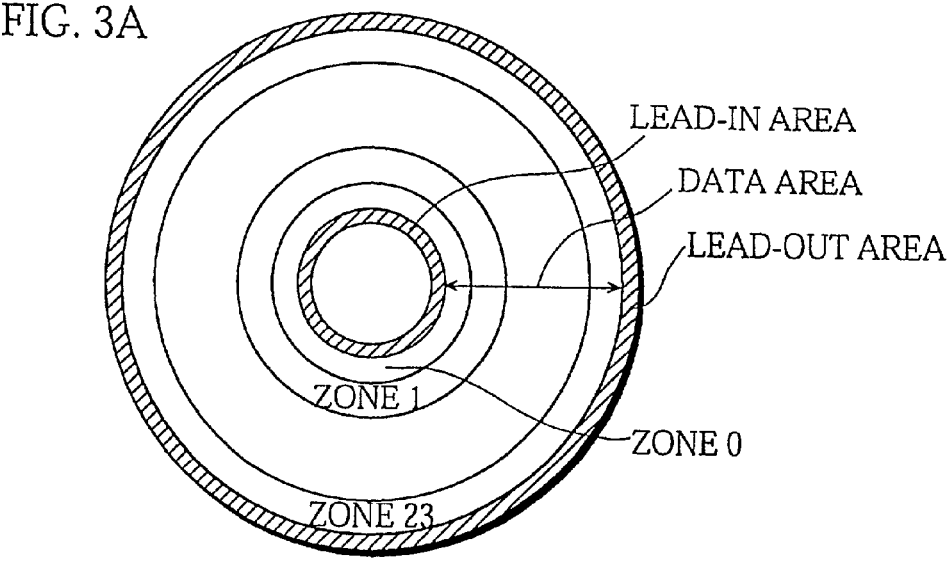
FIG. 3B
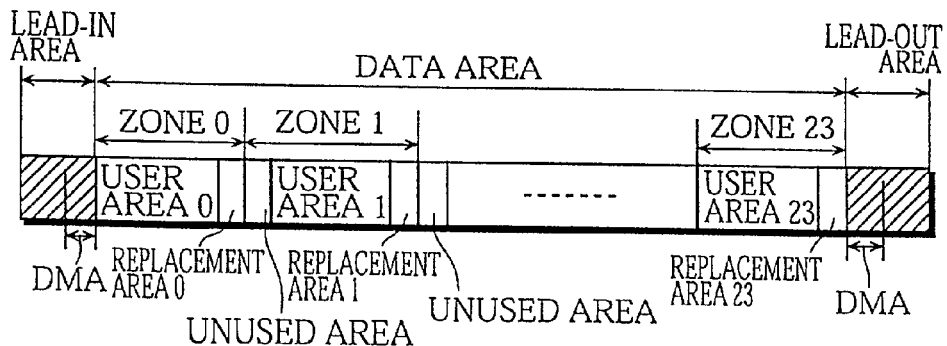
FIG. 3C
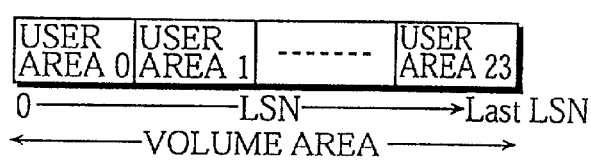
FIG. 3D
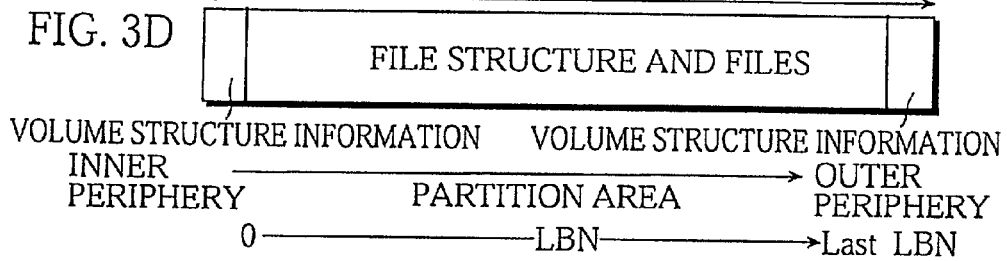

FIG. 5

LAST BLOCK-LENGTH TABLE

| ZONE NUMBER | NUMBER OF ECC-BS | LAST LBN |
|---|---|---|
| 1 | 272 | |
| 2 | 304 | |
| 3 | 315 | |
| 4 | 293 | |
| ⋮ | ⋮ | |
| i | FL(i) | |
| ⋮ | ⋮ | |

FIG. 11A  FILE ENTRY

| BP | LENGTH | FIELD NAME | CONTENT |
|---|---|---|---|
| 0 | 16 | DESCRIPTOR TAG | tag |
| 16 | 20 | ICB TAG | icbtag |
| .. | .. | .. | .. |
| 172 | 4 | ALLOCATION DESCRIPTOR LENGTH | Unit32 |
| 176 | L-EA | EXTENSION ATTRIBUTE | BYTE |
| a | L-AD | ALLOCATION DESCRIPTOR | BYTE |

ALLOCATION DESCRIPTOR LENGTH=L-AD, EXTENSION ATTRIBUTE LENGTH=L-EA, a=L-EA+176

ALLOCATION DESCRIPTOR FIELD IN FILE ENTRY

| RBP | LENGTH | CONTENT |
|---|---|---|
| 0 | 8 | ALLOCATION DESCRIPTOR : EXTENT A |
| 16 | 8 | ALLOCATION DESCRIPTOR : EXTENT B |
| 24 | 8 | ALLOCATION DESCRIPTOR : EXTENT C |
| 32 | 8 | ALLOCATION DESCRIPTOR : EXTENT D |

FIG. 11B  ALLOCATION DESCRIPTOR

| RBP | LENGTH | FIELD NAME | CONTENT |
|---|---|---|---|
| 0 | 4 | EXTENT LENGTH | Unit32 |
| 4 | 4 | EXTENT POSITION | Unit32 |

FIG. 11C  INTERPRETATION OF UPPER TWO BITS OF EXTENT LENGTH OF ALLOCATION DESCRIPTOR (NON-AV FILE)

| VALUE | INTERPRETATION |
|---|---|
| 0 | ASSIGNED AND RECORDED EXTENT |
| 1 | ASSIGNED AND NOT-RECORDED EXTENT |
| 2 | RESERVED |
| 3 | EXTENT AS EXTENSION OF ALLOCATION DESCRIPTOR |

FILE IDENTIFICATION DESCRIPTOR FOR DIRECTORY

FILE IDENTIFICATION DESCRIPTOR FOR FILE

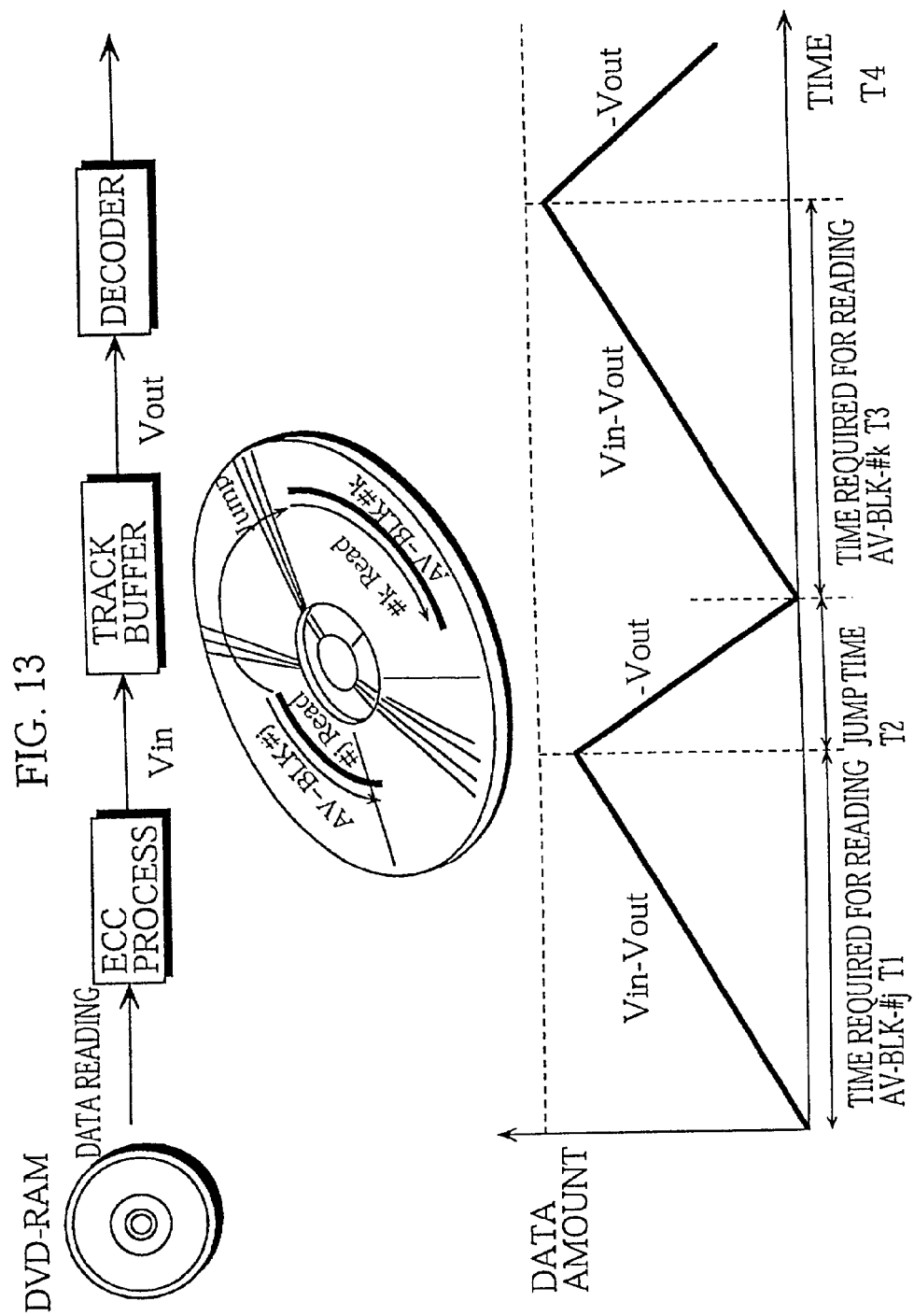

FIG. 20

CHANGE OF STATE IN SPACE BIT MAP 000
(ALL SECTORS IN AV-BLK ARE 1)
000

→

111
(ALL SECTORS IN AV-BLK ARE 1)
111

AV-BLK #n

AV-BLK #n

01 → 00
(FOR AV DATA) (UNASSIGNED)

FIG. 21

| COMMON FILE SYSTEM UNIT | |
|---|---|
| CREATE | GENERATE A FILE |
| DELETE | DELETE A FILE |
| OPEN | OPEN A FILE |
| CLOSE | CLOSE A FILE |
| WRITE | WRITE A NON-AV FILE |
| READ | READ A FILE (COMMON TO AV AND NON-AV) |
| SEEK | MOVE INSIDE A DATA STREAM |
| RENAME | CHANGE A FILE NAME |
| MKDIR | GENERATE A DIRECTORY |
| RMDIR | REMOVE A DIRECTORY |
| STATFS | OBTAIN A FILE SYSTEM STATE |
| GET-ATTR | OBTAIN A FILE ATTRIBUTE |
| SET-ATTR | SET A FILE ATTRIBUTE |

| AV FILE SYSTEM UNIT | |
|---|---|
| AV-WRITE | WRITE AN AV FILE |
| MERGE | MERGE OF AVFILE1+BUFFER+AV FILE2 |
| SPLIT | SPLIT AN AV FILE |
| SHORTEN | DELETE AN EDGE OF AV FILE |
| REPLACE | REPLACE A PART OF AV FILE |
| SEARCH-DISCON | DETECT WHETHER A SPECIFIED SECTION INCLUDES A DISCONTINUOUS BOUNDARY (ZONE BOUNDARY) |

FIG. 24

| RECORDING CONDITION | SETTING BY AV DATA INPUT UNIT |
|---|---|
| HIGH QUALITY | BIT RATE=6Mbps,RESOLUTION=720×480 |
| STANDARD | BIT RATE=3Mbps,RESOLUTION=360×480 |
| TIME-ENSURING | BIT RATE=1.5Mbps,RESOLUTION=360×240 |

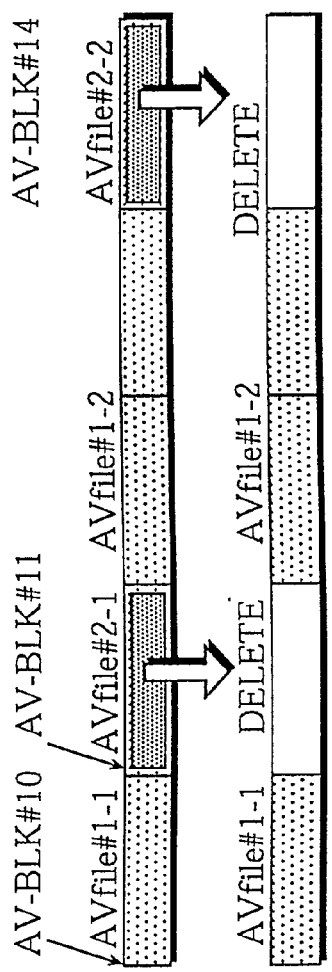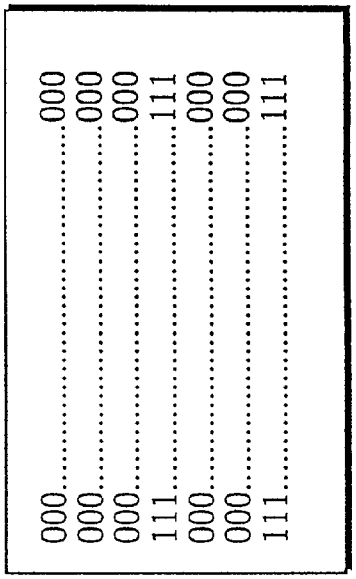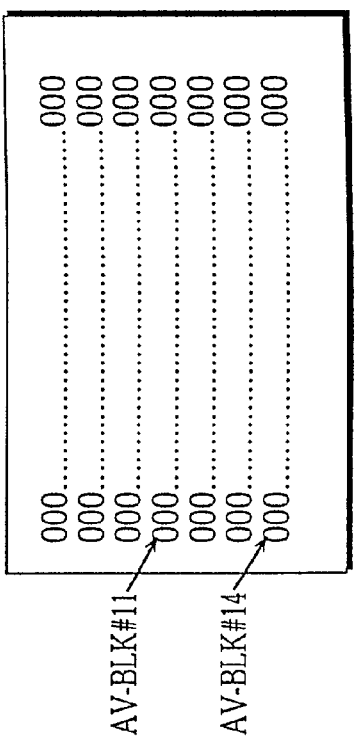
FIG. 28A
FIG. 28B

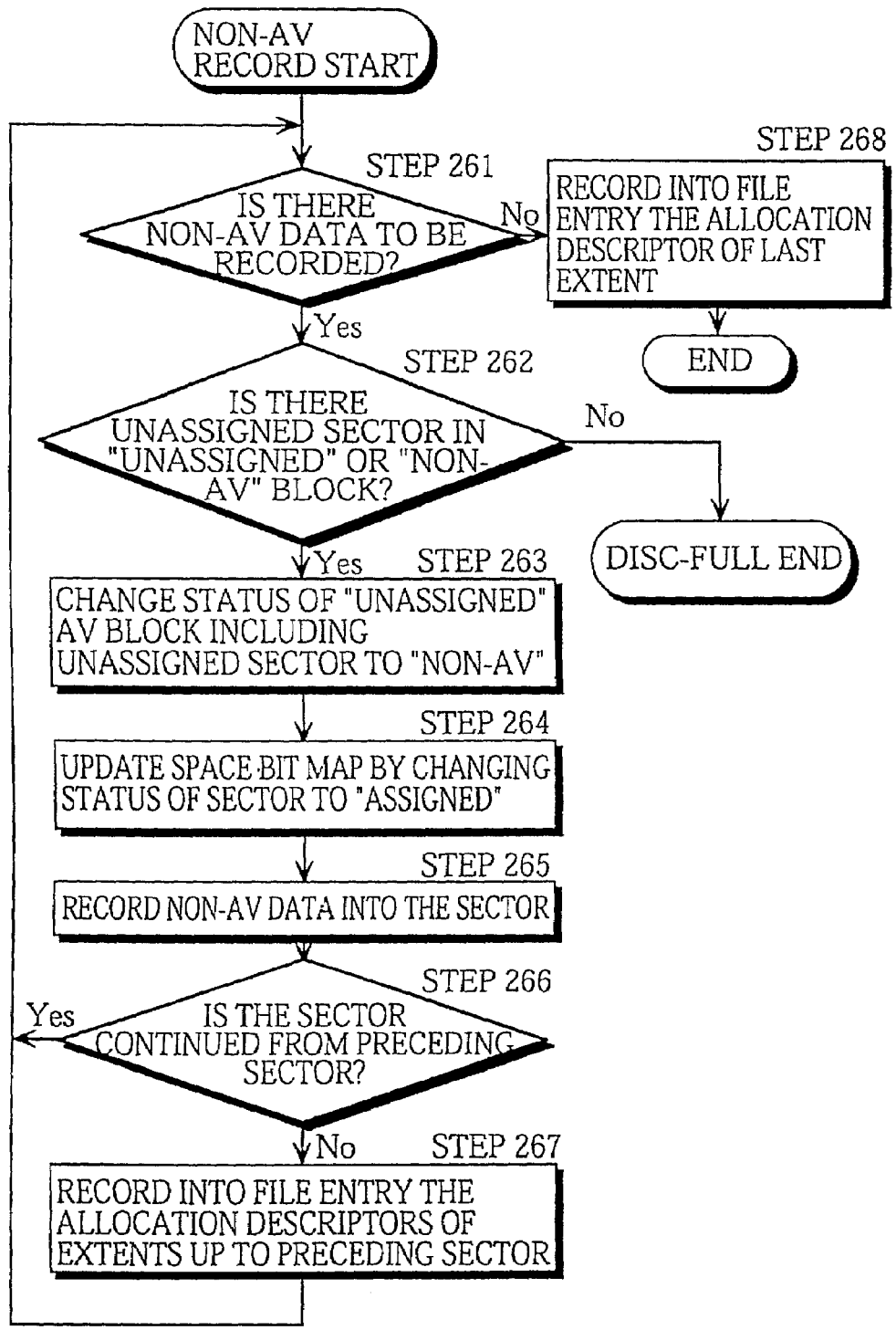

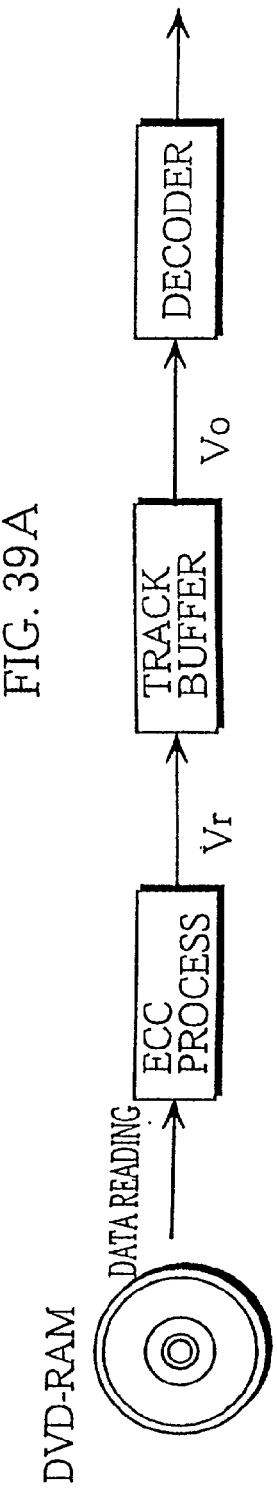
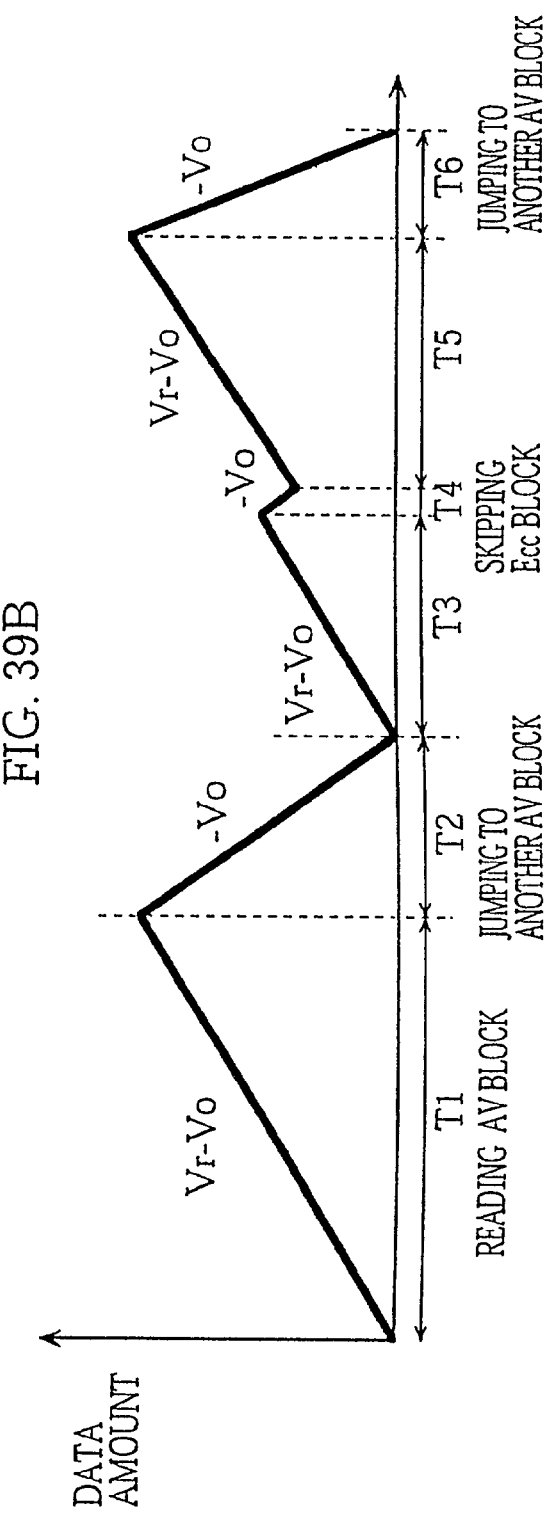
FIG. 39A
FIG. 39B

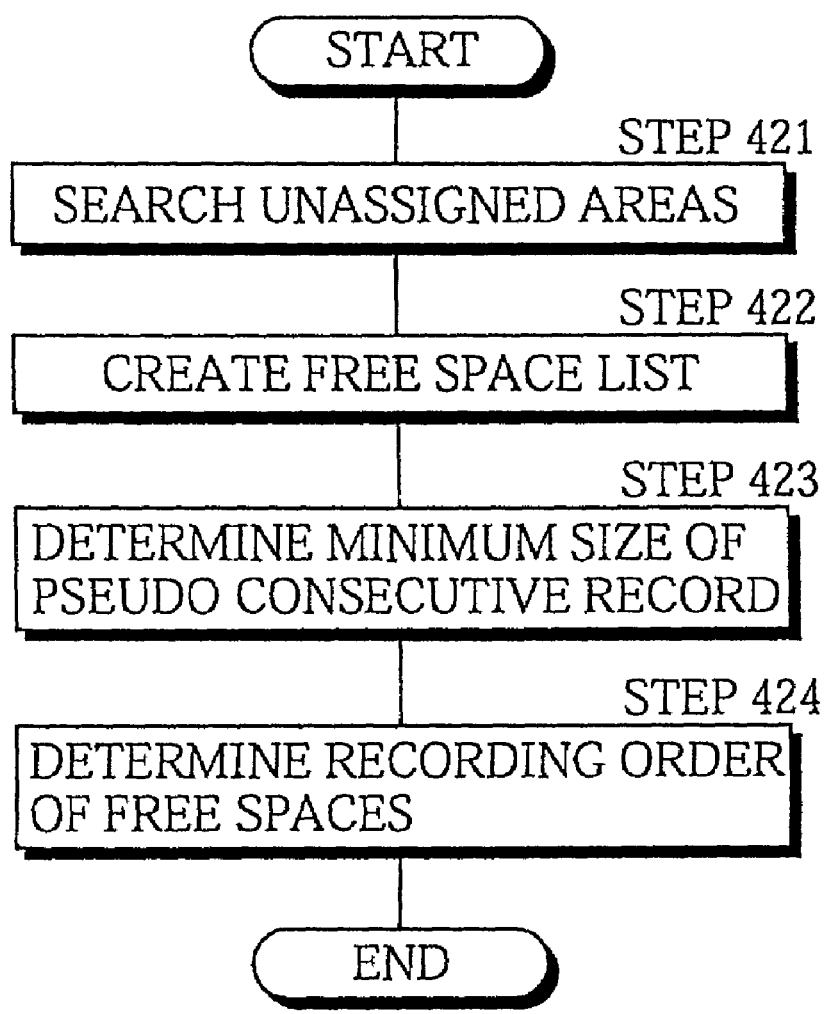

OPTICAL DISC RECORDING APPARATUS, COMPUTER-READABLE RECORDING MEDIUM RECORDING A FILE MANAGEMENT PROGRAM, AND OPTICAL DISC

This is a Rule 1.53(b) Divisional application of Ser. No. 09/692,831, filed Oct. 20, 2000 now U.S. Pat. No. 6,353,704 which is a Rule 1.53(b) Divisional application of Ser. No. 09/512,353, filed Feb. 24, 2000 now U.S. Pat. No. 6,285,827 which is a Rule 1.53(b) Divisional application of Ser. No. 09/154,879, filed Sep. 17, 1998 now U.S. Pat. No. 6,118,924.

BACKGROUND OF THE INVENTION (1) Field of the Invention

This invention relates to an optical disc recording apparatus, a computer-readable recording medium recording a file management program, and an optical disc.

(2) Description of the Prior Art

Recently, recording mediums such as magneto optical discs (MO) have been widely used for recording data to be read by computers. Currently, practical uses of DVD (Digital Versatile Disc)-RAM discs are waited for due to general expectation that DVD-RAMs will become a main recording medium of the next generation.

In conventional MOs, like HD (Hard Disc) or FD (Flexible Disc), the minimum unit in accessing data on discs is "sector" having several kilobytes. Each file is recorded in one or more sectors.

Reading and writing of files from/onto discs are executed by computers as functions of a file system which is a part of operating systems (OS). A file system is defined, for example, in ISO/IEC13346.

According to a conventional technique, for example, when recording a file of 200 KB onto a recording medium with 2 KB-sectors, computers must find 100 unassigned sectors on the recording medium. The 100 unassigned sectors need not be physically consecutive. For example, when four separate groups respectively having 30, 30, 30, and 10 unassigned sectors are found on the recording medium, the file is divided into the four groups of sectors. Each part of the file recorded in each group of sectors, namely each group of consecutive sectors, is called "extent".

In such a conventional technique, files can be divided and recorded into a plurality of extents. This provides a merit that all the sectors on a recording medium can be used efficiently even after recording and deleting of files on the medium are repeated a number of times.

However, conventional recording mediums and file systems have a problem that uninterrupted reproduction of audio/video data (hereinafter referred to as AV data) recorded on the recording mediums cannot be ensured.

More specifically, when recording and deleting of files on a recording medium are repeated several times, the AV data may not be recorded in consecutive sectors. The AV data may be divided and recorded into a plurality of extents, as described above. When this happens, the reproduction apparatus cannot achieve uninterrupted reproduction of the AV data due to a seek operation of an optical pickup that occurs as the optical pickup moves between the plurality of extents.

For example, when a seek occurs between a sector at the innermost periphery and a sector at the outermost periphery of a disc, the seek time amounts to several-hundred milliseconds. In case of moving images, such a seek of several-hundred milliseconds interrupts reproduction since reproducing 30 frames per second is required for reproduction of moving images.

As described above, uninterrupted reproduction may not be ensured by conventional file systems. This is especially a serious problem for mass storages such as DVD-RAM on which, like VTR, a plurality of pieces of AV data (e.g., TV programs) can be recorded, edited, and deleted.

Here, it should be reminded that recording mediums can also record computer data, as well as AV data. Accordingly, particular attention should be paid on how to efficiently store both types of data on a disc.

SUMMARY OF THE INVENTION

It is therefore an object of the present invention to provide an optical disc recording apparatus, a computer-readable recording medium recording a file management program, and an optical disc which ensure uninterrupted reproduction of AV data and record various types of data including AV data together and efficiently.

The above object is achieved by an optical disc recording apparatus for recording a video object on an optical disc, where a recording area of the optical disc is divided into a plurality of zones which each include a plurality of adjacent tracks, and includes sector information showing data assignment for sectors on the optical disc, the optical disc recording apparatus including: a reading unit for reading the sector information from the optical disc; a recording unit for recording the video object onto the optical disc; and a control unit for controlling the reading unit and the recording unit, where the control unit: detects at least one series of consecutive unassigned sectors on the optical disc by referring to the read sector information, each series having a total size greater than a minimum size and being located within a single zone, the minimum size corresponding to a data amount that ensures uninterrupted reproduction of the video object; and controls the recording unit to record the video object into the detected series.

With the above construction, the video object is recorded in a series of consecutive unassigned sectors with the total size greater than a predetermined size, the series without including a zone boundary. This is achieved by searching of such a series of consecutive unassigned sectors prior to the recording of the video object onto the optical disc. The predetermined size is set so that the uninterrupted reproduction is ensured in any types of reproduction apparatuses. As a result, the video object recorded by the present optical disc recording apparatus is reproduced by any types of reproduction apparatuses without gaps in the reproduced video and audio images (without missing frames). Also, the record area is divided into a plurality of zone areas to realize rotation control called Z-CLV (Zone-Constant Linear Velocity) during recording and reproduction. By doing so, a qualified recording efficiency is achieved without sacrificing the recording density of the outermost periphery of the optical disc. Also, the uninterrupted reproduction is ensured since the video object does not outstep the zone boundary.

In the above optical disc recording apparatus, the recording area of the optical disc may be divided into a plurality of 2 KB sectors, with each set of 16 consecutive sectors forming one ECC block, the video object is composed of a plurality of packs, each pack having a size of 2 KB, the minimum size is the number of ECC blocks which is represented as "N_ecc" in the following formula: $N\_ecc = Vo*Tj/((16*8*2048)*(1-Vo/Vr))$, where "Tj" represents a maximum jump time of an optical pickup of a reproduction apparatus, "Vr" represents an input transfer rate (Mbps) of a track buffer of the reproduction apparatus, and "Vo" represents an effective output transfer rate (Mbps) of the track buffer.

With the above construction, the predetermined size for ensuring the uninterrupted reproduction can be obtained in case defective sectors are not included in the series of consecutive unassigned sectors.

In the above optical disc recording apparatus, the recording area of the optical disc is divided into a plurality of 2 KB sectors, with each set of 16 consecutive sectors forming one ECC block, the video object is composed of a plurality of packs, each pack having a size of 2 KB, the minimum size is the number of ECC blocks which is represented as "N_ecc" in the following formula: N_ecc=dN_ecc+Vo*Tj/((16*8*2048)*(1−Vo/Vr)), where dN_ecc is a number of ECC blocks, in a series of consecutive unassigned sectors, that include defective sectors, "Tj" represents a maximum jump time of an optical pickup of an reproduction apparatus, "Vr" represents an input transfer rate (Mbps) of a track buffer of the reproduction apparatus, and "Vo" represents an effective output transfer rate (Mbps) of the track buffer.

With the above construction, the predetermined size for ensuring the uninterrupted reproduction can be obtained in case defective sectors are included in the series of consecutive unassigned sectors.

In the above optical disc recording apparatus, the effective transfer rate Vo may be found according to the following formula:

$$Vo=(N\_pack*2048*8)*(27 M/(SCR\_first\_next-SCR\_first\_current)$$

where N_pack is the total number of packs included in the video object that should be recorded in N_ecc ECC blocks, SCR_first_current is a time (in 1/(27 mega) seconds) at which the track buffer of the reproduction apparatus should output the first pack of the video object, and SCR_first_next is a time (in 1/(27 mega) seconds) at which the track buffer of the reproduction apparatus should output the first pack of the following video object.

With the above construction, it is possible to obtain, based on the effective output transfer rate, the predetermined size for video objects with a variable bit rate. This achieves, for example, an efficient use of optical disc having a small amount of unassigned areas.

In the above optical disc recording apparatus, the control unit may generate management information showing areas of the optical disc where the video object has been recorded by the recording unit and controls the recording unit to record the generated management information onto the optical disc, and when the reading unit reads out management information from the optical disc, the control unit refers to the read management information as well as the sector information to detect the series.

With the above construction in which the management information is recorded on the optical disc, it is possible to detect unassigned areas at high speed and without difficulty.

The above object is also achieved by a computer-readable recording medium prestoring a file management program for recording a video object onto an optical disc, the file management program being to be run by a computer which includes: a reading unit for reading data from an optical disc; and a recording unit for recording data onto the optical disc, where a recording area of the optical disc is divided into a plurality of zones which each include a plurality of adjacent tracks, and includes sector information showing data assignment for sectors on the optical disc, the file management program including the following steps to be executed by the computer: a reading step for reading the sector information from the optical disc; a detecting step for detecting at least one series of consecutive unassigned sectors on the optical disc by referring to the read sector information, each series having a total size greater than a minimum size and being located within a single zone, the minimum size corresponding to a data amount that ensures uninterrupted reproduction of the video object; and a recording step for recording the video object into the detected series.

With the above construction in which the computer runs the file management program, it is possible to record the video object into the series of consecutive unassigned sectors which is larger than a predetermined size. This ensures the uninterrupted reproduction of the video object.

The above object is also achieved by a computer-readable optical disc including a data recording area, where the data recording area is divided into a plurality of zones which each include a plurality of adjacent tracks, and the data recording area includes: sector information showing data assignment for sectors on the optical disc; and management information showing areas of the optical disc where a video object has been recorded and are located within a single zone.

The above object is also achieved by a computer-readable optical disc including a data recording area, where the data recording area is divided into a plurality of blocks which each include a plurality of consecutive sectors, and the data recording area includes: an area for recording sector information showing data assignment for sectors on the optical disc; and a management area for recording block information showing data assignment for blocks on the optical disc.

With the above construction, it is possible to record data in units of sectors or blocks. Each block includes a plurality of consecutive sectors. Accordingly, even if one file is divided and recorded into a plurality of extents, the size of the extent is larger than the size of the block at the minimum. As a result, it is possible to ensure the uninterrupted reproduction of the video data recorded on the present optical disc by preventing interruptions which are cased by occurrences of seek operations in the reproduction apparatus. Furthermore, data management in units of sectors and blocks are performed together depending on the types of data. This achieves efficient use of the recording area of the optical disc.

In the above computer-readable optical disc, when the block information shows that blocks have been assigned to data that is mainly composed of video data, the sector information may show that all sectors in the assigned blocks have been assigned.

With the above construction, even if data is recorded by a conventional file system which uses a file management system managing data in units of sectors, the blocks assigned to video data are not overwritten by another data. Such a computer-readable optical disc is suitable for uninterrupted reproduction.

In the above computer-readable optical disc, a block size represented as "L" may satisfy the following formula:

$$L>T*Vin*Vout/(Vin-Vout),$$

where "L" (bits) represents the block size, "T" (seconds) represents a seek time of a reproduction apparatus, "Vin" represents an input transfer rate (Mbps) of a buffer of the reproduction apparatus, and "Vout" represents an effective output transfer rate (Mbps) of the buffer.

In the above computer-readable optical disc, when the block information shows that blocks have been assigned to data that is not video data, the sector information may show that among sectors in the assigned blocks, only sectors recording the data have been assigned.

With the above construction, it is possible to record data other than video data (non-video) into unassigned sectors in blocks which have been assigned to non-video data. With this arrangement, even if video data and other types of data are recorded in mixture, the uninterrupted reproduction is ensured, and both of video and other types of data are stored efficiently.

In the above computer-readable optical disc, the data recording area may be divided into a plurality of zones which each include a plurality of adjacent tracks, and each of the plurality of blocks is included in any one of the plurality of zones.

With the above construction, the record area is divided into a plurality of zone areas to realize Z-CLV. By doing so, a qualified recording efficiency is achieved without sacrificing the recording density of the outermost periphery of the optical disc. Also, the uninterrupted reproduction is ensured since the video object does not outstep the zone boundary.

In the above computer-readable optical disc, blocks in each zone may have the same size except a block that is adjacent to a zone boundary, and the block that is adjacent to the zone boundary has a size being equal to or larger than the size of the other blocks.

With the above construction, it is possible to use the data recording area efficiently since one block in each zone has a size larger than the common size of the other blocks.

In the above computer-readable optical disc, the block that is adjacent to the zone boundary may include a sector having a maximum sector address in the current zone, and the management area includes a maximum block length table which shows, for each zone, sizes of blocks which each include the sector having the maximum sector address in a zone.

With the above construction, it is possible to manage variable-length blocks around the zone boundary without difficulty.

In the above computer-readable optical disc, an error correction code may be attached to every predetermined number of consecutive sectors, and each block may be composed of an integral multiple of the predetermined number of consecutive sectors.

With the above construction, it is possible for the recording/reproducing apparatus to record and reproduce continuously without generating overhead since each block is composed of an integral multiple of the predetermined number of consecutive sectors.

The above object is also achieved by an optical disc recording apparatus for recording data onto an optical disc which includes: a data recording area divided into a plurality of sectors; and a management area for recording sector information showing data assignment for sectors on the optical disc and block information showing data assignment for blocks on the optical disc, the optical disc recording apparatus including: a reading unit for reading the block information and the sector information from the optical disc; a judging unit for judging a type of the data to record or delete the data, the type being classified into a first type and a second type; a first specifying unit for, when the judging unit judges that the data is the first type, specifying, based on the read block information, either of: unassigned blocks in which the data is to be recorded; and blocks in which the data has already been recorded; a second specifying unit for, when the judging unit judges that the data is the second type, specifying, based on the read sector information, either of: unassigned sectors in which the data is to be recorded; and sectors in which the data has been recorded; a data updating unit for either of recording and deleting first-type data into/from the blocks specified by the first specifying unit and for either of recording and deleting second-type data into/from the sectors specified by the second specifying unit; and an assignment updating unit for updating at least one of the sector information and the block information in accordance with operations of the data updating unit.

With the above construction, it is possible to record data in units of sectors or blocks. Each block includes a plurality of consecutive sectors. Accordingly, even if one file is divided and recorded into a plurality of extents, the size of the extent is larger than the size of the block at the minimum. As a result, it is possible to ensure the uninterrupted reproduction of the video data recorded on the present optical disc by preventing interruptions which are cased by occurrences of seek operations in the reproduction apparatus. Furthermore, data management in units of sectors and blocks are performed together depending on the types of data. This achieves efficient use of the recording area of the optical disc.

In the above optical disc recording apparatus, the assignment updating unit may include: a block information updating unit for, when the first specifying unit specifies unassigned blocks, updating the block information by changing indication of the specified blocks from "unassigned" to "assigned"; and a sector information updating unit for, when the block information updating unit updates the block information by changing indication of the specified blocks from "unassigned" to "assigned," updating the sector information by changing indication of all sectors included in the specified blocks from "unassigned" to "assigned."

With the above construction, even if data is recorded by a conventional file system which uses a file management system managing data in units of sectors, the blocks assigned to video data are not overwritten by another data. Such a computer-readable optical disc is suitable for uninterrupted reproduction.

In the above optical disc recording apparatus, the block information updating unit, when the first specifying unit specifies blocks which are assigned to a piece of first-type data to be deleted, updates the block information by changing indication of the specified blocks from "assigned" to "unassigned," and the sector information updating unit, when the block information updating unit updates the block information by changing indication of the specified blocks from "assigned" to "unassigned," updates the sector information by changing indication of all sectors included in the specified blocks from "assigned" to "unassigned."

With the above construction, it is possible to use the data recording area efficiently by recording the first-type data and the second-type data in mixture since all the sectors in a block are released when the first-type data is deleted.

In the above optical disc recording apparatus, the block information may show whether each block is: (1) unassigned data; (2) assigned first-type data which is mainly composed of video data; or (3) assigned second-type data which is mainly composed of data other than the first-type data, where the assignment updating unit includes: a first updating unit for updating the block information; and a second updating unit for updating the sector information, where the first updating unit, when the second updating unit updates the sector information by changing indication of any sectors included in unassigned blocks to "assigned," updates the block information by changing indication of the unassigned blocks from "unassigned" to "second-type data assigned,"

and the second updating unit, when the first updating unit updates the block information by changing indication of blocks from "unassigned" to "first-type data assigned," updates the sector information by changing indication of all sectors included in the blocks to "assigned."

With the above construction, it is possible to manage the data recording area without difficulty by recording the first-type data and the second-type data in mixture.

The above object is also achieved by a computer-readable recording medium prestoring a file management program for recording data onto an optical disc which includes: a data recording area divided into a plurality of sectors; and a management area for recording sector information showing data assignment for sectors on the optical disc and block information showing data assignment for blocks on the optical disc, the file management program including the following steps to be executed by the computer: a reading step for reading the block information and the sector information from the optical disc; a judging step for judging a type of the data to record or delete the data, the type being classified into a first type and a second type; a first specifying step for, when in the judging step it is judged that the data is the first type, specifying, based on the read block information, either of: unassigned blocks in which the data is to be recorded: and blocks in which the data has already been recorded; a second specifying step for, when in the judging step it is judged that the data is the second type, specifying, based on the read sector information, either of: unassigned sectors in which the data is to be recorded; and sectors in which the data has been recorded; a data updating step for either of recording and deleting first-type data into/from the blocks specified by the first specifying unit and for either of recording and deleting second-type data into/from the sectors specified in the second specifying step; and an assignment updating step for updating at least one of the sector information and the block information in accordance with operations in the data updating step.

With the above construction, it is possible to record data in units of sectors or blocks. Each block includes a plurality of consecutive sectors. Accordingly, even if one file is divided and recorded into a plurality of extents, the size of the extent is larger than the size of the block at the minimum. As a result, it is possible to ensure the uninterrupted reproduction of the video data recorded on the present optical disc by preventing interruptions which are cased by occurrences of seek operations in the reproduction apparatus. Furthermore, data management in units of sectors and blocks are performed together depending on the types of data. This achieves efficient use of the recording area of the optical disc.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3A shows the plurality of zone areas 0–23 and other areas provided on a DVD-RAM;

FIG. 3B shows a horizontal arrangement of the zone areas 0–23 and other areas;

FIG. 3C shows logical sector numbers (LSNs) in the volume area;

FIG. 3D shows logical block numbers (LBNs) in the volume area;

FIG. 5 shows a last-block-length table;

FIG. 11A shows a detailed data structure of file entry;

FIG. 11B shows the data structure of the allocation descriptor;

FIG. 11C shows an interpretation of upper two bits of extent length of allocation descriptor;

FIG. 13 shows a model of buffering of AV data into the track buffer, the AV data being read from the DVD-RAM disc by a reproduction apparatus

FIG. 20 shows the changes in the AV block management table and the space bit map when AV data is deleted;

FIG. 21 shows a list of commands supported by the file system unit 102 for the file management;

FIG. 24 shows the bit rate and resolution for each of the quality types "high," "standard," and "time-ensuring;"

FIG. 28A shows AV files before and after deletion;

FIG. 28B shows the changes in the AV block management table and the space bit map corresponding to the deletion;

FIG. 29 is a flowchart showing the process of recording non-AV files performed by the common file system unit 104;

FIG. 39 shows a model of buffering of AV data into the track buffer in the reproduction apparatus;

FIG. 42 is a flowchart detailing the procedure of assigning the pseudo consecutive record.

DESCRIPTION OF THE PREFERRED EMBODIMENTS

The following are the table of contents of the present section.
(1) Embodiment 1
(1-1) Optical Disc
(1-1-1) Physical Structure of Optical Disc
(1-1-2) File System Management Information (Part 1)
(1-1-3) File System Management Information (Part 2)
(1-1-4) Minimum Size of AV Block
(1-2-1) Entire System
(1-2-2) Hardware Structure of DVD Recorder 10
(1-2-3) Function Block Diagram
(1-2-4) Commands Executed by File system Unit 102
(1-3) Recording/Deleting
(1-3-1) Manual Recording of AV Data
(1-3-2) Programmed Recording of AV Data
(1-3-3) Deleting of AV Data
(1-3-4) Recording of Non-AV Data
(1-3-5) Deleting of Non-AV Data
(2) Embodiment 2
(2-1) Optical Disc
(2-1-1) Pseudo Consecutive Record
(2-1-2) Assignment of Pseudo Consecutive Records
(2-1-3) Pseudo Consecutive Record Assignment Management Information and Space Bit Map
(2-2) Recording/Reproducing Apparatus
(2-2-1) System and Hardware Structure
(2-2-2) Function Block Diagram
(2-3-1) Recording of AV Files
(3) Embodiment 3
(3-1) Minimum Size of Pseudo Consecutive Record
(3-2) Recording of AV files Now, an optical disc and an optical disc recording apparatus of the present invention are described in several embodiments with the above-listed headings.

(1) Embodiment 1

(1-1) Optical Disc (1-1-1) Physical Structure of Optical Disc

Figure 1:
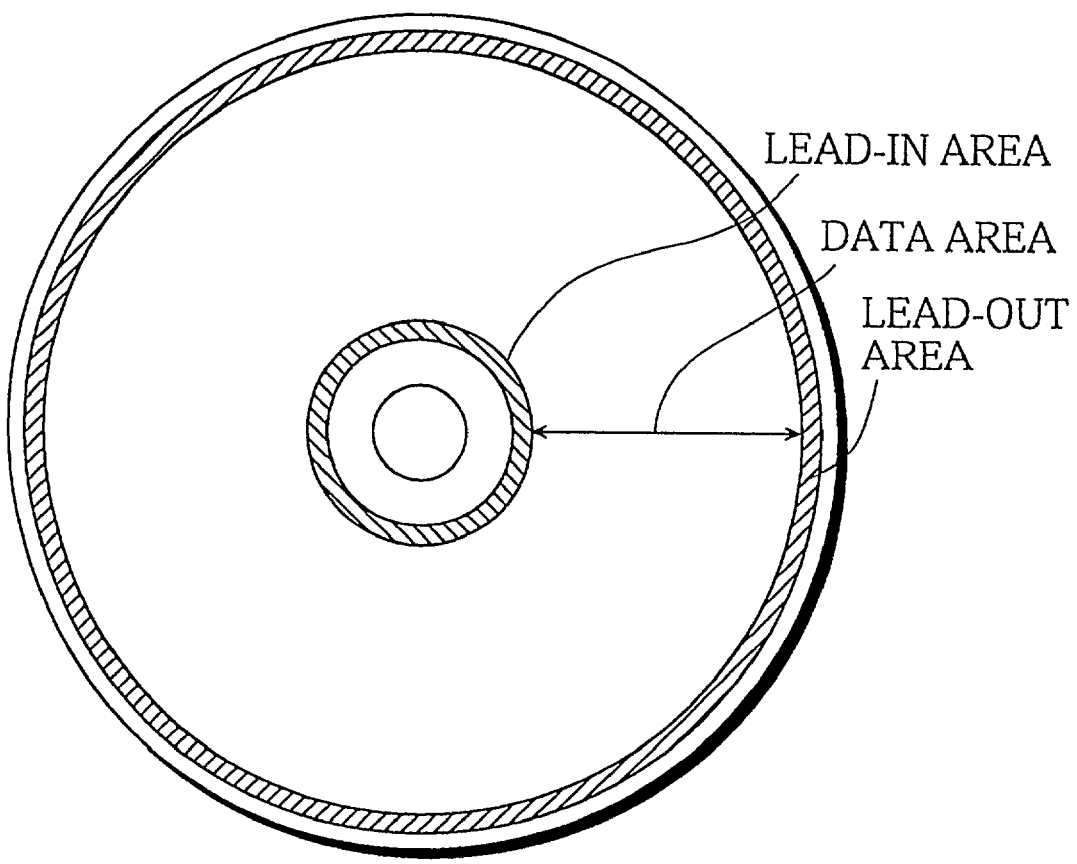
FIG. 1 shows the appearance and the recording area of the DVD-RAM disc which is the optical disc of the present invention described in Embodiment 1.

FIG. 1 shows the appearance and the recording area of a DVD-RAM disc which is an optical disc. As shown in the figure, the DVD-RAM disc has a lead-in area at its innermost periphery and a lead-out area at its outermost periphery, with the data area in between. The lead-in area records the necessary reference signals for the stabilization of a servo during access by an optical pickup, and identification signals to prevent confusion with other media. The lead-out area records the same type of reference signals as the lead-in area.

The data area, meanwhile, is divided into sectors which are the smallest unit by which the DVD-RAM can be accessed. Here, the size of each sector is set at 2 KB. The data area is also divided into a plurality of AV blocks which each are a group of consecutive sectors. The size of each AV block is set so that the uninterrupted reproduction the reproduction apparatus is ensured even if a seek operation occurs. In the present embodiment, the size is set to about 7 MB. The data area, divided into sectors and AV blocks as described above, is managed as follows.

"Non-AV data," data other than AV data, is assigned areas in units of sectors, while AV data is assigned areas in units of AV blocks. Non-AV data is managed in units of sectors; AV data is managed in units of AV blocks. Non-AV data is also recorded in sectors in AV blocks. Each AV block is managed not to include AV data and non-AV data in mixture.

Figure 2:
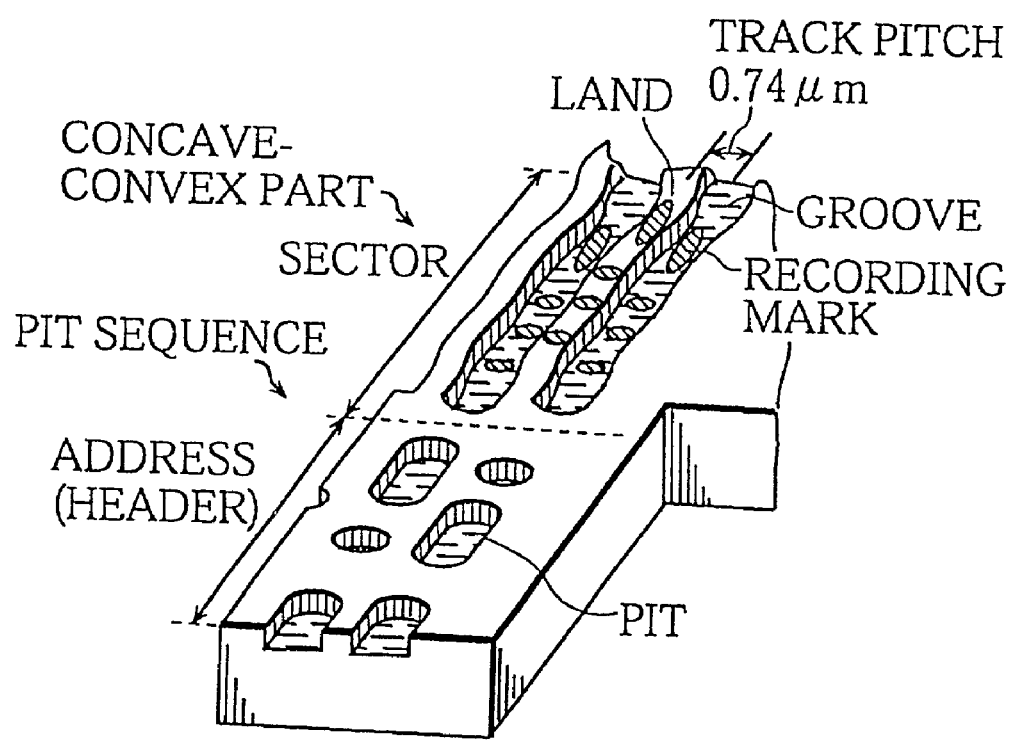
FIG. 2 shows the cross-section and surface of a DVD-RAM cut at the header of a sector.

FIG. 2 shows the cross-section and surface of a DVD-RAM cut at the header of a sector. As shown in the figure, each sector is composed of a pit sequence that is formed in the surface of a reflective film, such as a metal film, and an uneven part.

The pit sequence is composed of 0.4 µm~1.87 µm pits that are carved into the surface of the DVD-RAM to show the sector address.

The uneven part is composed of a concave part called a "groove" and a convex part called a "land". Each groove and land has a recording mark composed of a matal film capable of phase change attached to its surface. Here, the expression "capable of phase change" unit that the recording mark can be in a crystalline state or a non-crystalline state depending on whether the metal film has been exposed to a light beam. Using this phase change characteristic, data can be recorded into this uneven part. While it is only possible to record data onto the land part of an MO disc, data can be recorded onto both the land and the groove parts of a DVD-RAM, meaning that the recording density of a DVD-RAM exceeds that of an MO disc. Error correction information is provided on a DVD-RAM for each group of 16 sectors. In the present embodiment, each group of 16 sectors that is given an ECC (Error Correcting Code) is called an ECC block.

On a DVD-RAM, the data area is divided into a plurality of zone areas to realize rotation control called Z-CLV (Zone-Constant Linear Velocity) during recording and reproduction.

FIG. 3A shows the plurality of zone areas provided on a DVD-RAM. As shown in the figure, a DVD-RAM is divided into 24 zone areas numbered zone 0 to zone 23. Each zone area is a group of tracks that are accessed using the same angular velocity. In this embodiment, each zone area contains 1888 tracks. The rotational angular velocity of the DVD-RAM is set separately for each zone area, with this velocity being higher the closer a zone area is located to the inner periphery of the disc. This ensures that the optical pickup can move at a constant velocity while performing access within a single zone area. By doing so, the recording density of DVD-RAM is raised, and rotation control is made easier during recording and reproduction.

FIG. 3B shows a horizontal arrangement of the lead-in area, the lead-out area, and the zone area 0–23 that were shown in FIG. 3A.

The lead-in area and lead-out area each have a DMA (Defect Management Area) inside. The DMA records: position information showing the positions of sectors found to include defects; and replacement position information showing the positions of the sectors replacing the defective sectors located in a replacement area.

Each zone area has a user area on the inside, and the replacement area and an unused area are provided at the boundary between zone areas. The user area is an area that can be used by the file system as a recording area. The replacement area is used to replace defective sectors when such defective sectors are found. The unused area is an area that is not used for recording data. Only two tracks are assigned as the unused area, with such unused area being provided to prevent mistaken identification of sector addresses. This is because while sector addresses are recorded at a same position in adjacent tracks within the same zone, for Z-CLV the sector addresses are recorded at different positions in adjacent tracks at the zone boundary.

In this way, sectors which are not used for data recording exist at the boundaries between zone areas. Therefore, on a DVD-RAM logical sector numbers (LSN: Logical Sector Number) are assigned to physical sectors of the user area in order starting from the inner periphery to consecutively show only the sectors used for recording data.

As shown in FIG. 3C, the area that records user data and is composed of sectors that have been assigned LSNs is called volume area.

Also, as shown in FIG. 3D, in the innermost and outermost peripheries, volume structure information is recorded to be used to deal with the disc as a logical volume. The rest of the volume area except the areas for recording the volume structure information is called partition area. The partition area records files. The logical block numbers (LBN: Logical Block Number) are assigned to sectors of the partition area in order starting from the first sector.

Figure 4:
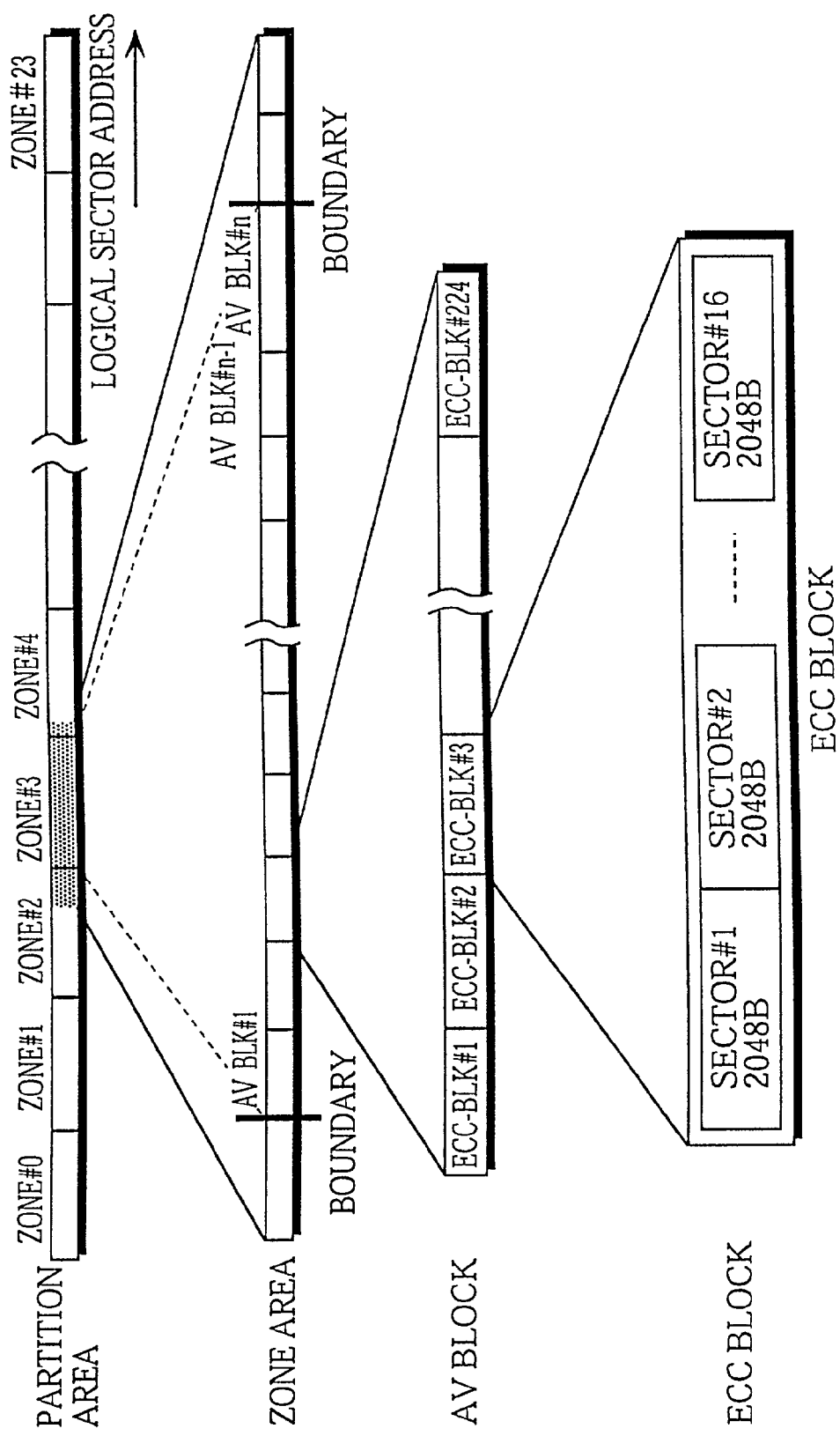
FIG. 4 shows a hierarchical relation between zone areas, ECC blocks, and sectors.

FIG. 4 shows a hierarchical relation between zone areas, ECC blocks, and sectors. As shown in the drawing, each zone area includes 224 ECC blocks (3584 sectors). However, the number of sectors in a zone is not necessary be an integral multiple of 224, or the number of ECC blocks. Therefore, the size of the last AV block in a zone is set to larger than 224 ECC blocks so that the number of sectors in a zone becomes an integral multiple of 224. For this purpose, DVD-RAM discs record a table which shows the size of the last block in each zone, as a part of management information.

FIG. 5 shows a last-block-length table. The last-block-length table shows, for each zone, the length of the last AV block related to "last LBN." The length of the last AV block is represented by the number of ECC blocks included in the AV block. The "last LBN" column shows the LBN of the last sector (zone end), namely, the last sector adjacent to the zone boundary, to indicate the position of the zone boundary.

As described above, the length of the last AV block is set to a variable-length. This prevents each AV block from including a zone boundary. With this arrangement, it is possible to use the recording area on the disc efficiently.

(1-1-2) File System Management Information (Part 1)

Here, the file system structure of DVD-RAM is described. The file system of the present embodiment complies with ISO/IEC13346. In addition, the file system manages the AV data in units of AV blocks.

Figure 6:
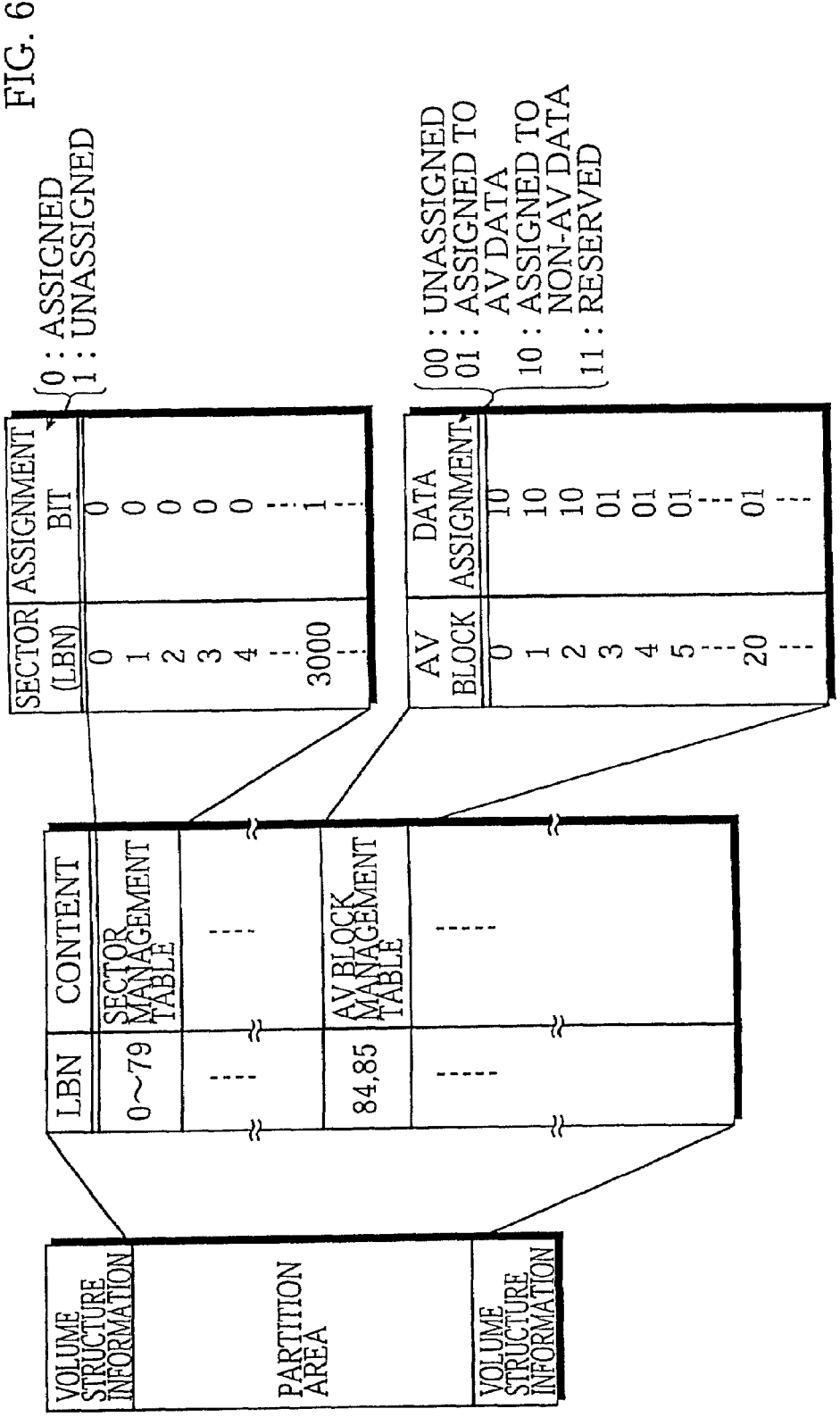
FIG. 6 shows a sector management table and an AV block management table

FIG. 6 shows a sector management table and an AV block management table. The sector management table is recorded in the partition area of the volume area and is included in the file system management information. The drawing also shows a hierarchical relation between the volume area, sectors, and contents of the sectors.

The first layer shows the volume area shown in FIG. 3D.

The second layer shows sector areas which includes the sector management table and the AV block management table. The sector areas are included in the partition area. The sector management table (also called a space bit map) showing the data assignment status for each sector is recorded in the sector areas with LBNs 0–79. The AV block management table showing the data assignment status for each AV block is recorded in the sector areas with LBNs 84 and 85.

As shown in the third layer, the "space bit map" column shows whether each sector included in the partition area is assigned or not-assigned. In this example, the assignment state of each sector is indicated by one bit. For example, each sector for logical block numbers 0–79 is given bit "0" (indicating "assigned") since these sectors have already been assigned as a space bit map. Similarly, each sector for logical block numbers 0–84 is given bit "0" (assigned) since these sectors have already been assigned as the AV block management block. As understood from these examples, each bit in the space bit map is written as "0" when a file or a part of a file is to be recorded or has been recorded by the user or the application in the current sector, otherwise written as "1."

The AV block shown in the third layer shows for each AV block in the partition area, with two bits for each AV block, whether the current AV block is unassigned (00), assigned to AV data (01), assigned to non-AV data (10), or reserved (11). For example, the AV block 0 is given bits "10" (indicating "assigned to non-AV data") since the AV block 0 has already been assigned as the space bit map and the AV block management table which are both non-AV data. When certain AV blocks are shown as assigned to AV data in the AV block management table, all the sectors included in the AV blocks are shown as assigned in the space bit map. This makes it possible to prevent mixture of AV and non-AV data in each AV block, and secures AV data consecutive recording areas.

Figure 7:
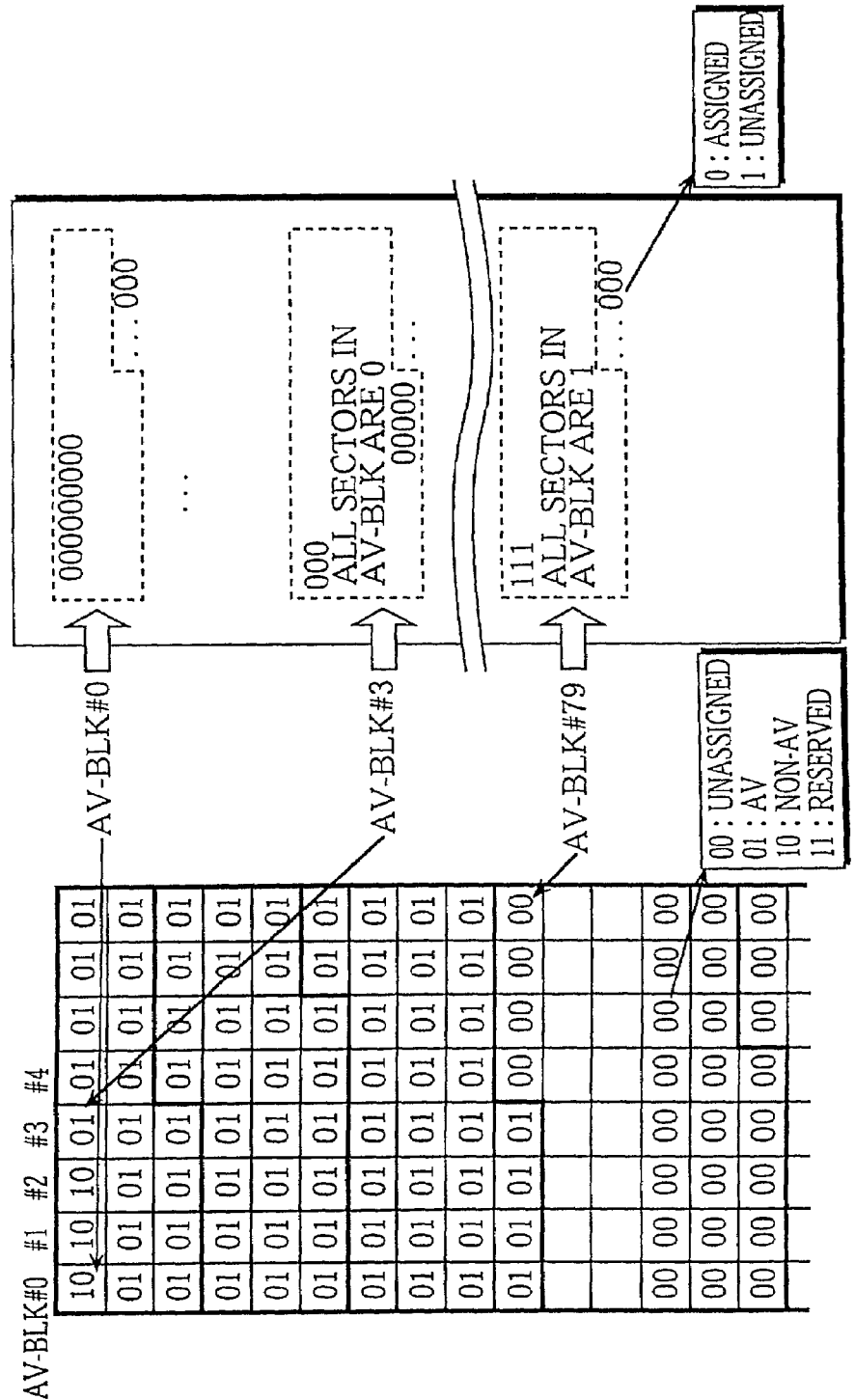
FIG. 7 shows the AV block management table and the sector management table (space bit map) which are both included in the file system management information recorded in the volume area.

FIG. 7 shows relationships between the AV block management table and the space bit map.

On the left-hand side of the figure, the AV block management table is shown. The table includes an arrangement of a plurality of pieces of two-bit data which each shows the assignment status of AV block. In this example, the AV blocks (AV_BLK in the drawing) #0–#2 are written as "10" (non-AV data); the AV blocks #3–#75 are written as "01" (AV data); and the AV blocks #76 and after are written as "00" (unassigned).

On the right-hand side of the figure, the space bit map is shown. In this example, the assignment status of the sectors included in the AV blocks #0, #3, and #79 is shown in the blocks encircled by dotted lines. The AV block #0 has been assigned to non-AV data. As a result, in a corresponding part in the space bit map, it is shown that sectors having been recorded non-AV data are written as "0" (assigned); sectors having not been recorded non-AV data are written as "1" (unassigned). The AV block #3 has been assigned to AV data. As a result, in a corresponding part in the space bit map, it is shown that all the sectors are written as "0" (assigned). The AV block #79 has not been assigned yet. As a result, in a corresponding part in the space bit map, it is shown that all the sectors are written as "1" (unassigned).

It should be noted here that the AV block management table may be recorded as data for the file system, as the space bit map is, or may be recorded as one file. In the latter case, the AV block management table is managed as a non-AV data file.

In the present embodiment, the AV block management table has a table structure. However, it may have a list structure.

(1-1-3) File System Management Information (Part 2)

Figure 8:
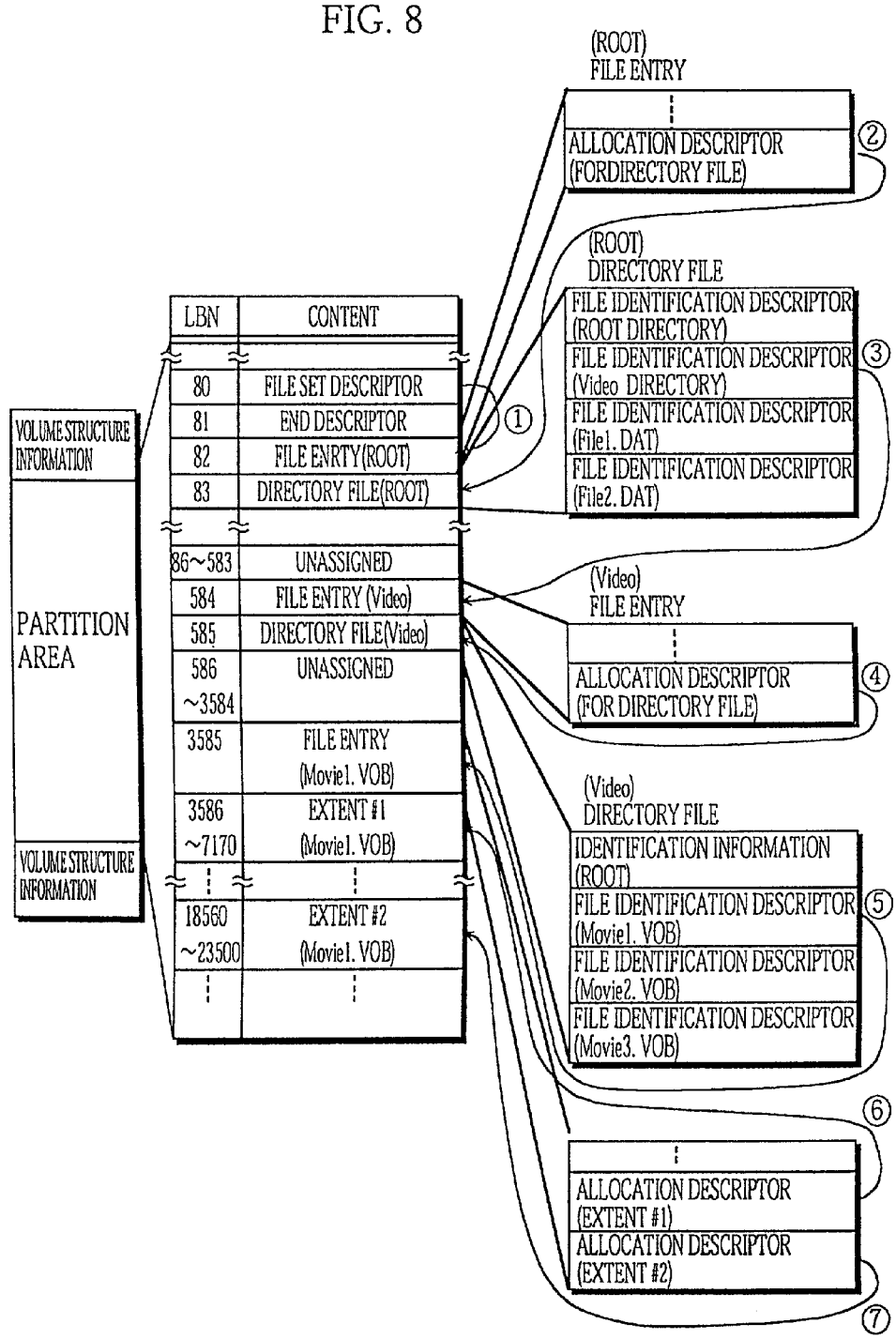
FIG. 8 shows information included in the file system management information other than the sector management table and the AV block management table shown in FIG. 6.

FIG. 8 shows information included in the file system management information other than the sector management table and the AV block management table shown in FIG. 6. The drawing shows hierarchically the volume area, sectors, and the contents of the sectors. The arrows ①–⑦ show the order in which the storage position of the file "Movie1.VOB" is detected in accordance with the management information shown in the drawing.

The first layer of the drawing shows the volume area shown in FIG. 3D.

Figure 9:
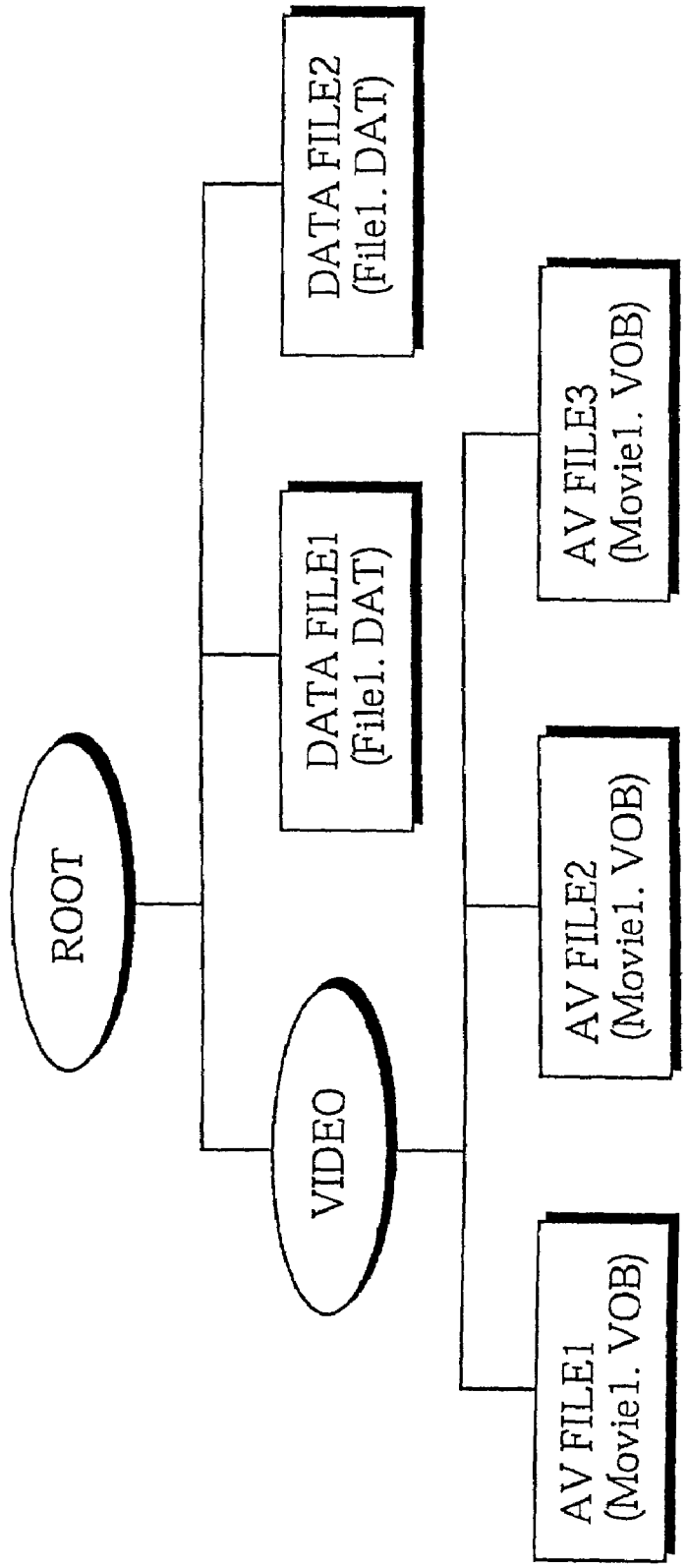
FIG. 9 shows a hierarchical directory structure corresponding to the management information shown in FIG. 8.

The second layer shows various kinds of management information such as a file set descriptor, end descriptor, file entry, and directory. These kinds of information comply with the file system defined in ISO/IEC13346. The file system defined in ISO/IEC13346 achieves a hierarchical directory management. FIG. 9 shows a hierarchical directory structure corresponding to the management information shown in FIG. 8. In FIG. 9, ovals represent directories, and rectangles represent files. The root directory branches to a directory "VIDEO" and two files "File1.DAT" and "File2.DAT." The directory "VIDEO" branches to three files "Movie1.VOB," "Movie2.VOB," and "Movie3.VOB." The management information of FIG. 8 corresponds to the directory structure. Note that each file recording area shows only "Movie1.VOB." in this example.

The file set descriptor with LBN 80 in the second layer shows an LBN of a sector in which a file entry of the root directory is recorded. The end descriptor with LBN 81 shows the end of a file set descriptor.

Each file entry (e.g., LBN 82, 584, or 3585) is recorded for each file (including directory) and shows a storage position of a file or a directory. File entries for files and directories have the same format so that a hierarchical directory structure can be constructed as one desires.

Each directory (e.g., LBN 83, or 585) shows a storage position of a file entry for each file and each directory included in a directory.

The third layer of this example includes three file entries and two directories. The file entries and directories are traced by the file system, and have a data structure constructed so that a storage position of a predetermine file can be traced no matter how the directory structure is constructed.

Each file entry includes an allocation descriptor showing a storage position of a file or a directory. When the file or the directory is divided into a plurality of extents, the file entry includes a plurality of allocation descriptors for each extent. For example, file entries with LBN 82 and 584 each include one allocation descriptor. This means that none of these files is divided into a plurality of extents. In contrast, the file entry with LBN 3585 includes two allocation descriptors, indicating that the file is composed of two extents.

Each directory includes a file identification descriptor showing, for each file and directory included in the current directory, a storage position of the current file entry. As indicated by the file entries and directories shown in this figure, the storage position of the file "root/video/Movie1.VOB" is traced in the order of: file set descriptor→①→file entry (root)→②→directory (root)→③→file entry (video)→④→directory (video)→⑤→file entry (Movie1)→⑥⑦→file (extents #1 and #2 of Movie1.VOB).

Figure 10:
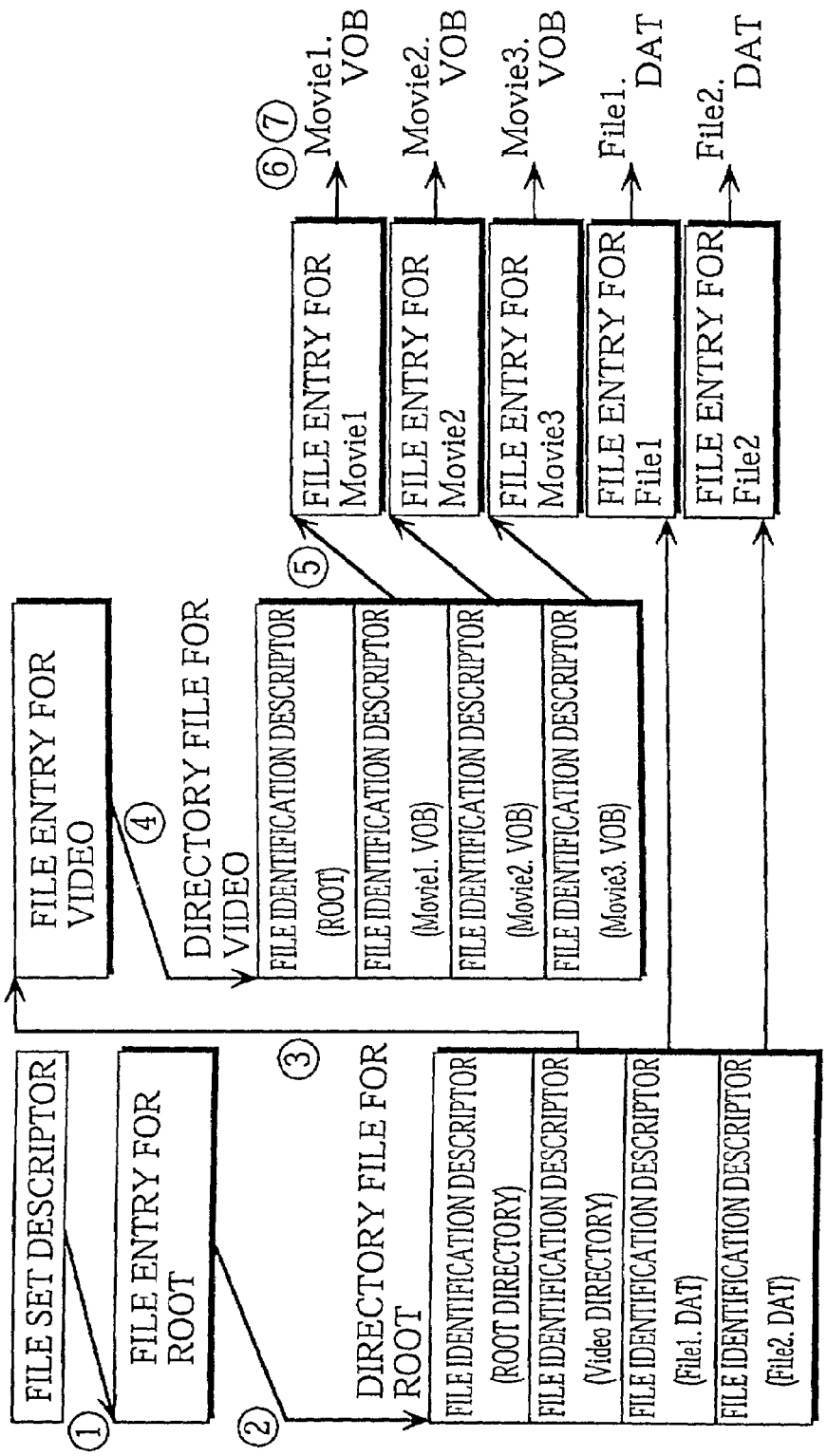
FIG. 10 shows the linkage between the file entries and directories rewritten in accordance with the directory structure.

FIG. 10 shows the linkage between the file entries and directories rewritten in accordance with the directory structure. In the drawing, the root directory includes file identification descriptors respectively for: a parent dierectory (the parent of the root is the root itself), a VIDEO directory, file "File1.DAT," and file "File2.DAT." Also, the VIDEO directory includes file identification descriptors respectively for: a parent dierectory (root), file "Movie1.VOB," file "Movie2.VOB," and file "Movie3.VOB." The storage position of file "Moviel.VOB" is detected by tracing in the order of ① to ⑥⑦.

FIG. 11A shows a detailed data structure of file entry. As shown in the drawing, the file entry includes a descriptor tag, ICB tag, allocation descriptor length, extension attribute, and allocation descriptor. "BP" in the drawing represents a bit position, and "RBP" represents a relative bit position.

The descriptor tag is a tag that shows the current piece of information is a file entry. DVD-RAM includes a various types of tags such as a file entry descriptor, a space bit map descriptor, or the like. Each file entry includes a descriptor tag written as "261" showing that the current piece of information is a file entry.

The ICB tag shows attribute information related to the current file entry.

The extension attribute is information showing a higher-level attribute than the contents defined in the attribute information field in the file entry.

The allocation descriptor field stores as many allocation descriptors as the number of extents in the file. The allocation descriptor shows an LBN indicating a storage position of an extent in a file or a directory. FIG. 11B shows the data structure of the allocation descriptor. In the drawing, the allocation descriptor includes data indicating an extent length and includes an LBN indicating a storage position of an extent. Note that the upper two bits of the data indicating an extent length shows the storage status of the extent recording area, as shown in FIG. 11C.

Figure 12A:
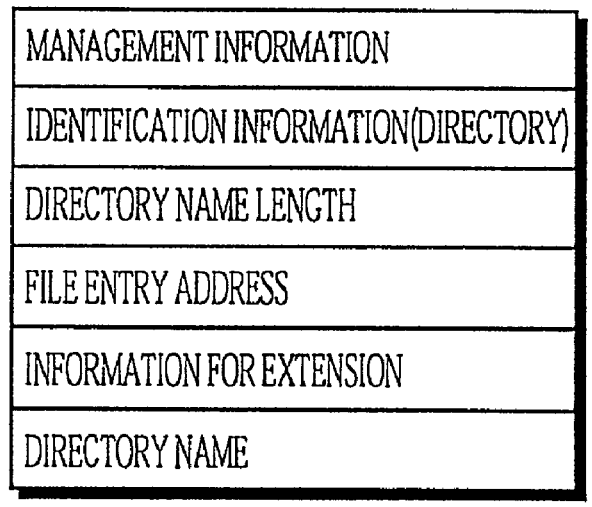
FIG. 12A shows a detailed data structure of the file identification descriptors for directory.
Figure 12B:
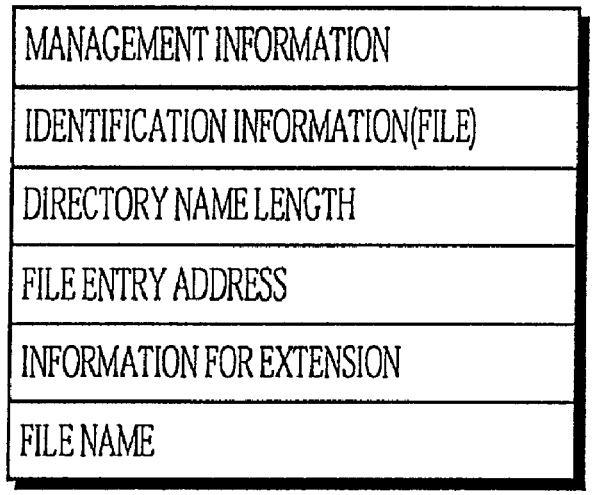
FIG. 12B shows a detailed data structure of the file identification descriptors for file.

FIGS. 12A and 12B respectively show a detailed data structure of the file identification descriptors for directory and file. These two types of the file identification descriptors have the same format: each descriptor includes: management information, identification information, directory name length, an address showing the address, represented by an LBN, of the file entry of a directory or a file, information for extension, and directory name. With such an arrangement, an address of a file entry corresponding to a directory name or a file name is identified.

(1-1-4) Minimum Size of AV Block

Here, the size of the AV block shown in the lower part of FIG. 4 is described.

Each AV block except the last one in each zone is composed of 224 ECC blocks, where each ECC block has about 7 MB. To ensure the uninterrupted reproduction of AV data, the minimum size of AV block is determined in relation with the buffer of the reproduction apparatus.

FIG. 13 shows a model of buffering of AV data into the track buffer, the AV data being read from the DVD-RAM disc by a reproduction apparatus.

In the upper part of FIG. 13, the AV data read from the DVD-RAM disc is subjected to the ECC process. The processed AV data is then temporarily stored in the track buffer (FIFO memory), and is sent to the decoder. In the drawing, "Vin" represents an input transfer rate (minimum value) of the track buffer (rate of data read from an optical disc), and "Vout" represents an output transfer rate (maximum value) of the track buffer, where Vr>Vo. In this model, Vin=8 Mbps and Vout=11 Mbps.

The lower part of FIG. 13 is a graph showing the change in the data amount of the track buffer in this model. In the graph, the vertical axis represents the data amount of the track buffer; the horizontal axis represents time.

The "T1" represents a time required for reading out the entire AV data recorded in the pseudo consecutive record #j. In this period T1, the data amount of the track buffer increases at the rate of (Vin−Vout).

The "T2" (also referred to as a jump period) represents the maximum time taken by the optical pickup for jumping from the AV block #j to AV block #k (for example, it jumps from the innermost circuit to the outermost circuit). The jump period includes the seek time of the optical pickup and the time required for the rotation of the optical disc to be stabilized. In this period T2, the data amount of the track buffer decreases at the rate of Vout. This is the same in the period T4.

The size of the AV block is obtained as follows, where the size is represented as L bytes.

In the period T2, AV data is read from the track buffer. Only this is performed. If the buffer capacity becomes 0 during this period, an underflow occurs to the decoder. When this happens, the uninterrupted reproduction of the AV data cannot be ensured.

Here, to ensure the uninterrupted reproduction of the AV data (not to generate the underflow), the following formula need be satisfied.

$$(\text{storarge amount } B) \geq (\text{read-out amount } R) \quad \text{<Formula 1>}$$

The storarge amount B is the amount of data that has been accumulated in the track buffer at the end of the period T1. The read-out amount R is the total amount of data read during the period T2.

The storarge amount B is calculated using the following formula.

$$(\text{storarge amount } B) = (\text{period } T1)*(Vin-Vout) = (\text{read out time of one } AV \text{ block})*(Vin-Vout) = (AV \text{ block size } L/Vin)*(Vin-Vout) \quad \text{<Formula 2>}$$

The read-out amount R is calculated using the following formula. It is considered that the maximum jump period Tj will be about 1.5 seconds in the worst case.

$$(\text{Read-out amount } R) = T2*Vout = (\text{maximum jump period } Tj)*Vout = 1.5 \text{ sec}*8 \text{ Mbps} = 12 \text{ megabits} = 1.5 \text{ MB} \quad \text{<Formula 3>}$$

Replacing both sides of the Formula 1 respectively by Formula 2 and Formula 3 gives us the following formula.

$$(L/Vin)*(Vin-Vout) \geq Tj*Vout \quad \text{<Formula 4>}$$

From the Formula 4, it is derived that the AV block size L should satisfy the following formula.

$$L \geq Tj*Vin*Vout/(Vin-Vout) \geq 1.5 \text{ sec}*11 \text{ Mbps}*8 \text{ Mbps}/(11 \text{ Mbps} - 8 \text{ Mbps}) \geq 44 \text{ megabits} \geq 5.5 \text{ MB} \quad \text{<Formula 5>}$$

From the above consideration, it is found that when AV data is recorded in a consecutive sectors of 5.5 MB in one AV block, uninterrupted reproduction is secured even if a jump occurs between AV blocks. The minimum size of AV block to ensure uninterrupted reproduction is 5.5 MB. In the present embodiment, the AV block size is set to 7.2 MB. This is because a margin is included in the value, taking an occurrence of a disc error or the like into account. Also, the track buffer capacity should have 1.5 MB at the minimum to prevent an occurrence of underflow.

(1-2-1) Entire System

Figure 14:
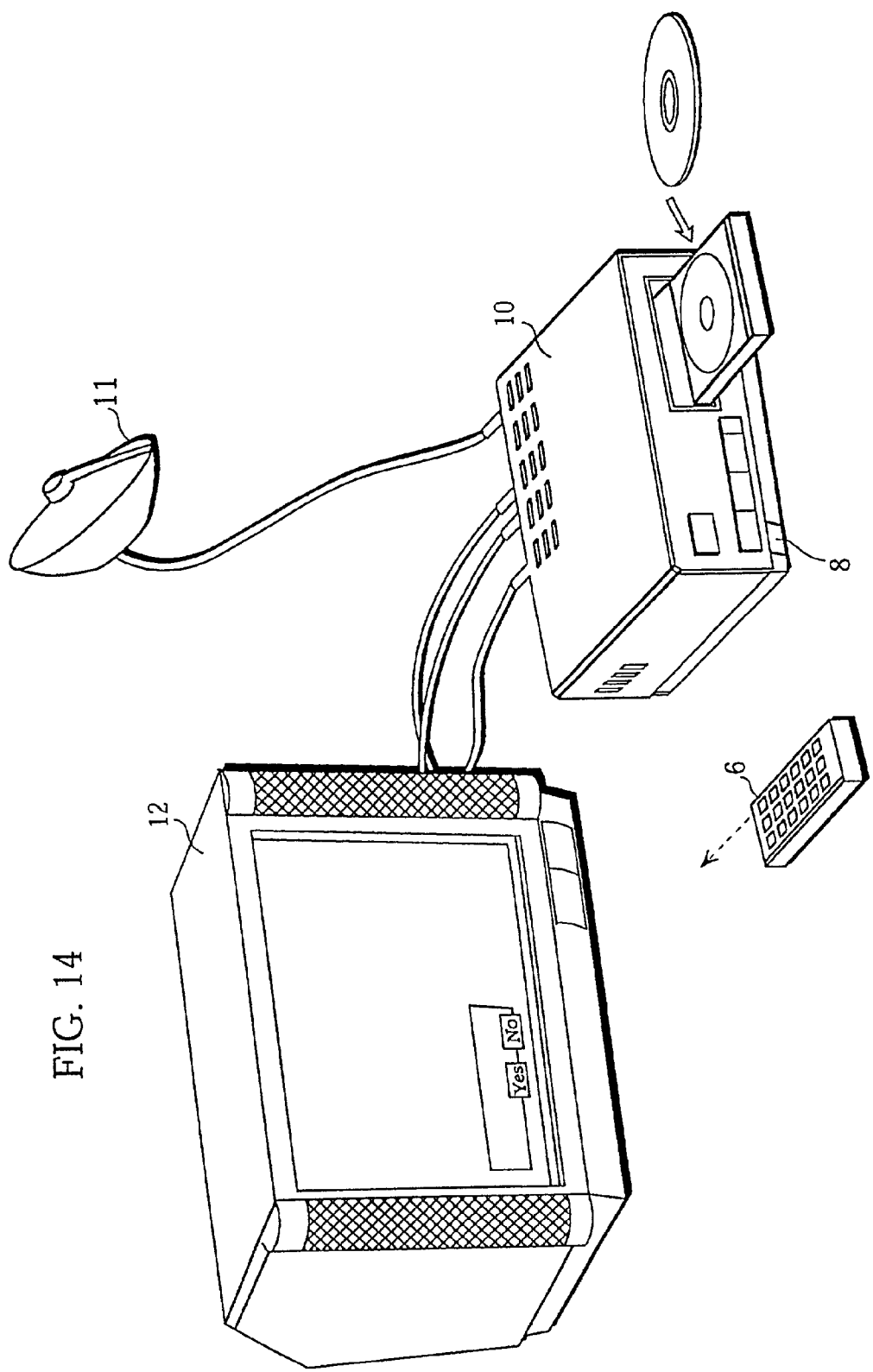
FIG. 14 shows the construction of a system including the optical disc recording/reproduction apparatus of the embodiment.

FIG. 14 shows the construction of a system including the optical disc recording/reproduction apparatus of the present embodiment.

The system includes an optical disc recording/reproduction apparatus 10 (also referred to as DVD recorder 10), a remote controller 6 used for operating the DVD recorder 10, a DVD recorder display 12 connected to the DVD recorder 10, and a receiver 9.

After the DVD-RAM disc is loaded, the DVD recorder 10 compresses the video/audio data which is included in the analog broadcasting waves which is received through the receiver 9, records the compressed data, with the AV block as the minimum unit, into the DVD-RAM disc, expands the compressed video/audio data, and outputs the expanded video/audio signals onto a display 12.

(1-2-2) Hardware Structure of DVD Recorder 10

Figure 15:
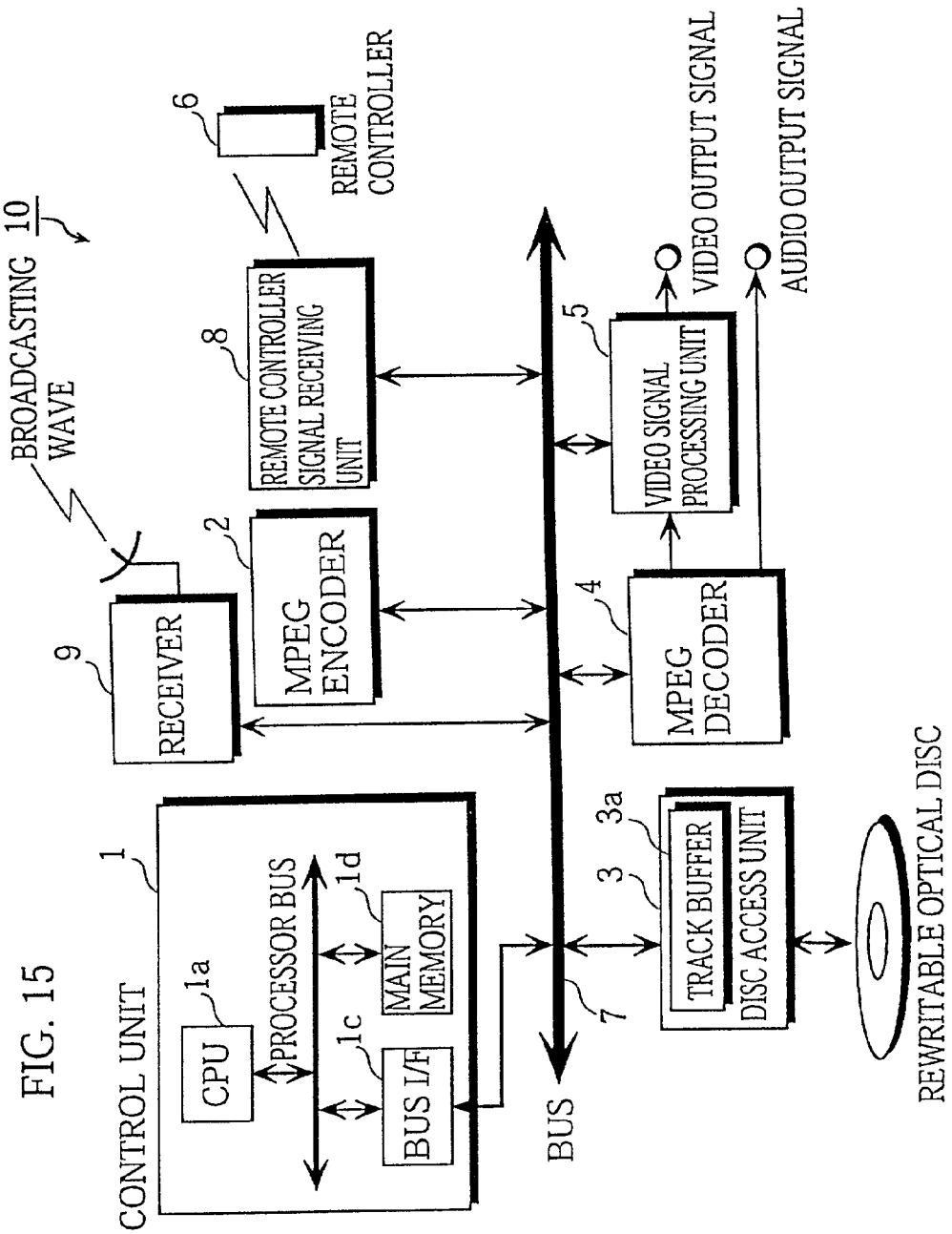
FIG. 15 is a block diagram showing the hardware structure of the DVD recorder 10.

FIG. 15 is a block diagram showing the hardware structure of the DVD recorder 10.

The DVD recorder 10 includes a control unit 1, an MPEG encoder 2, a disc access unit 3, an MPEG decoder 4, a video signal processing unit 5, a remote controller 6, a bus 7, a remote controller signal receiving unit 8, and a receiver 9.

The control unit 1 includes a CPU1a, a processor bus 1b, a bus interface 1c, and a main memory 1d. The control unit 1 executes a program stored in the main memory 1d to control the entire DVD recorder 10 in terms of recording, reproducing, editing, etc. Especially, the control unit 1 controls the DVD recorder in accordance with the file system when AV data is recorded in the DVD-RAM disc in the minimum units of AV blocks.

The MPEG encoder 2 compresses the video/audio data which is included in the analog broadcasting waves received through the receiver 9 and generates an MPEG stream.

The disc access unit 3, having a track buffer 3a, under the control of the control unit 1, records the MPEG stream received from the MPEG encoder 2 into the DVD-RAM disc via the track buffer 3a, reads out the MPEG stream from the DVD-RAM disc, and outputs the read MPEG stream to the MPEG decoder 4 via the track buffer 3a.

The MPEG decoder 4 expands the compressed MPEG-stream which is read out by the disc access unit 3, and outputs the expanded video data and audio signals.

The video signal processing unit 5 converts the video data output from the MPEG decoder 4 into video signals for the display 12.

The remote controller signal receiving unit 8 receives remote controller signals from the remote controller 6 and informs the control unit 1 of which operation the user has instructed.

The DVD recorder 10 is, as shown in FIG. 14, constructed based on the premise that it is used as a replacement for a VTR used at home. Not limited to the construction, when the DVD-RAM disc is to be used as a recording medium for computers, the following constructions are possible. That is to say, the disc access unit 3 is connected, as a DVD-RAM drive apparatus, to a computer bus via an IF called SCSI or IDE. Also, the components other than the disc access unit 3 shown in FIG. 15 are achieved or operated when the OS and the application program are executed on the computer hardware.

Figure 16:
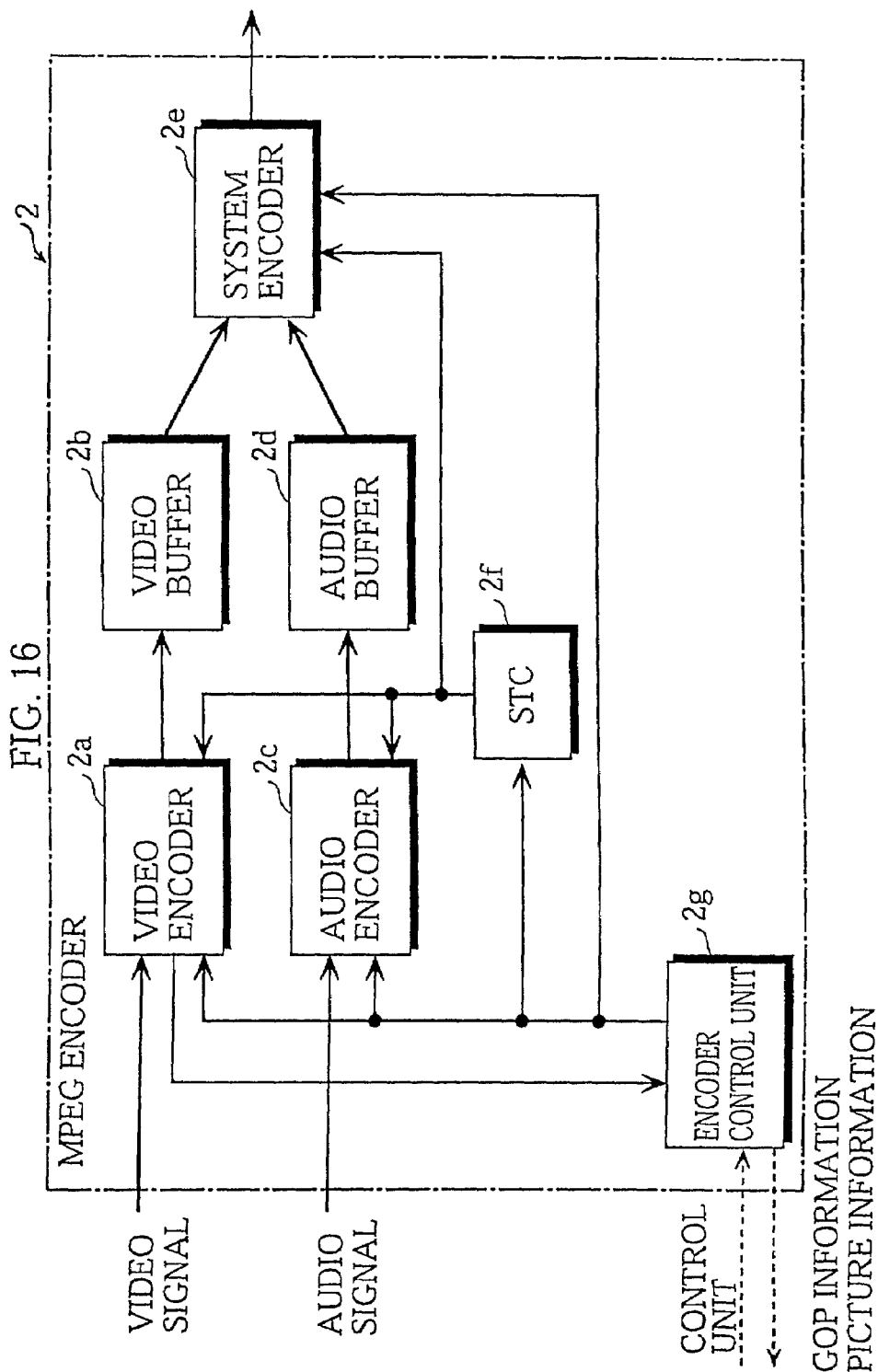
FIG. 16 is a block diagram showing the construction of the MPEG encoder 2.

FIG. 16 is a block diagram showing the construction of the MPEG encoder 2. As shown in the drawing, the MPEG encoder 2 includes a video encoder 2a, a video buffer 2b for storing the output of the video encoder, an audio encoder 2c, an audio buffer 2d for storing the output of the audio encoder, a system encoder 2e for multiplexing the encoded video data and audio data respectively stored in the video buffer 2b and the audio-buffer 2d, an STC (System Time Clock) unit 2f for generating sync clock signals for the encoder 2, and an encoder control unit 2g for controlling and managing these units.

The encoder control unit 2g sends information such as the GOP information and the picture information to the control unit 1 shown in FIG. 15 every time a VOBU is generated in the encoding. Here, the GOP information includes the number of packs in the VOBU and the number of packs in the first I-picture in the VOBU. The packs mentioned here are, for example, video packs (V_PACK) and audio packs (A_PACK) shown in FIG. 10, each having a fixed length of 2 KB. Accordingly, in the present embodiment, the GOP information indicates the number of sectors assigned to the VOBU and the number of sectors assigned to first I-picture in the VOBU.

Figure 17:
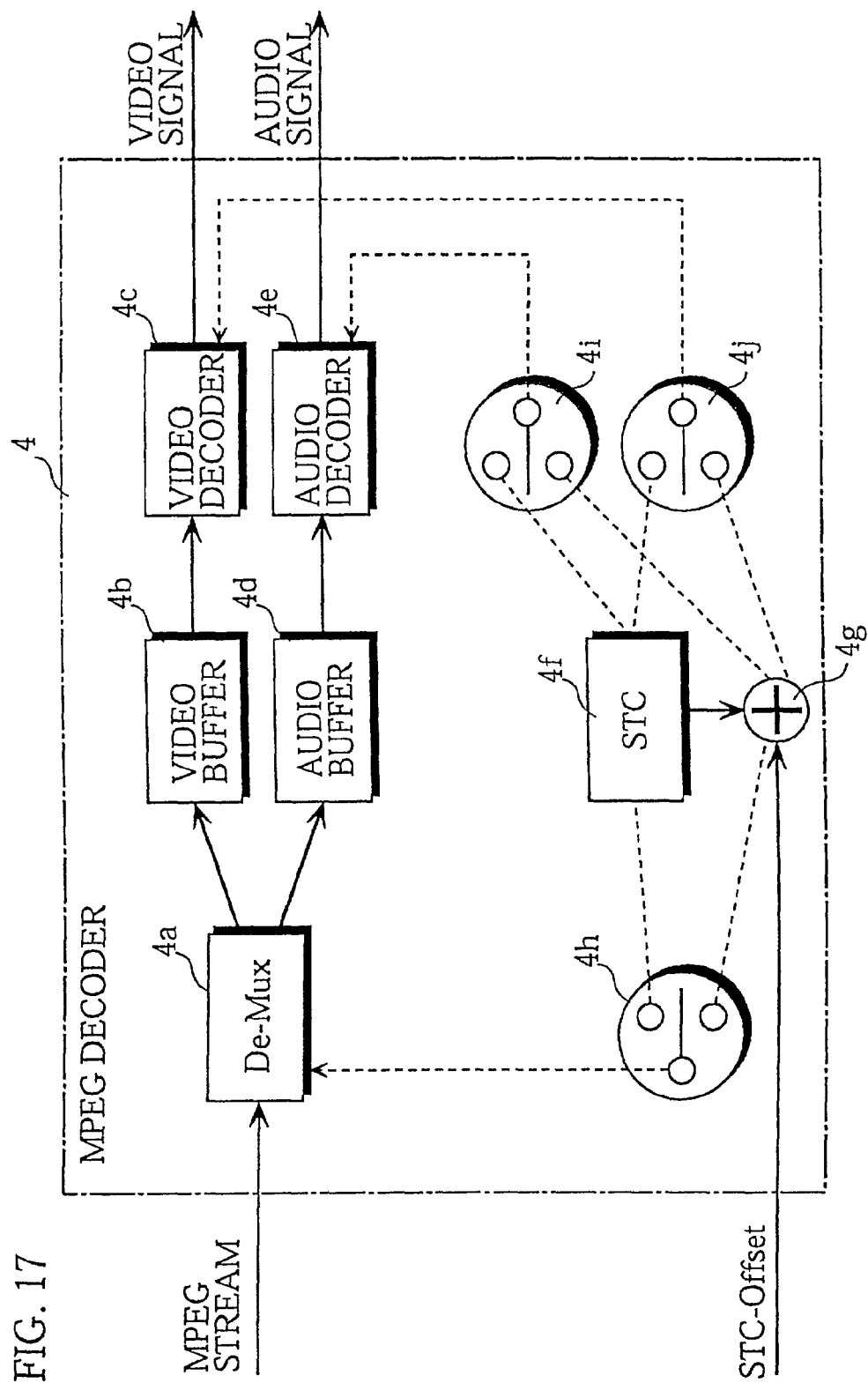
FIG. 17 is a block diagram showing the construction of the MPEG decoder 4.

FIG. 17 is a block diagram showing the construction of the MPEG decoder 4. As shown in the drawing, the MPEG decoder 4 includes a demultiplexor 4a for dividing MPEG streams into video streams and audio streams, a video buffer 4b for temporarily storing the divided video streams, a video decoder 4c for decoding the video streams stored in the video buffer 4b, an audio buffer 4d for temporarily storing the divided audio streams, an audio decoder 4e for decoding the audio streams stored in the audio buffer 4d, an STC (System Time Clock) unit 4f for generating sync clock signals, an adder 4g for adding offset values to the sync clock signals, and selectors 4h–4j for selecting either a sync clock signal or a sync clock signal added with an offset value and supplying the selected signal to the demultiplexor 4a, audio decoder 4e, and video decoder 4c, respectively.

It should be noted here that the MPEG decoder 4 shown in the drawing may be constructed the same as ordinary MPEG decoders in which the selectors 4h to 4j and adder 4g are not included.

(1-2-3) Function Block Diagram

Figure 18:
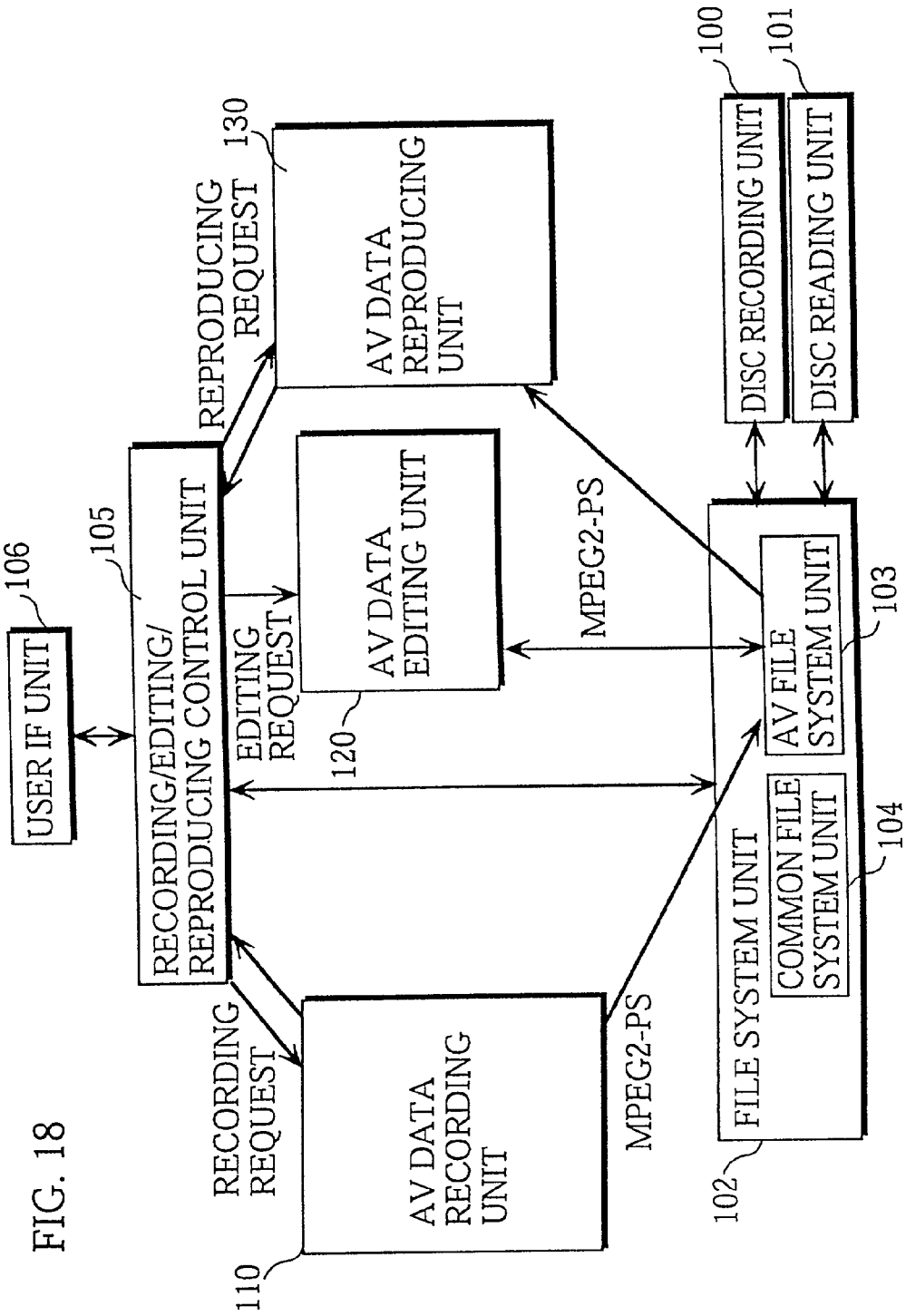
FIG. 18 is a function block diagram showing the construction of the DVD recorder 10 based on the functions of the components.

FIG. 18 is a function block diagram showing the construction of the DVD recorder 10 based on the functions of the components. Each function shown in the figure is achieved after the CPU 1a in the control unit 1 executes the program in the main memory 1d to control the hardware shown in FIG. 14.

As shown in FIG. 18, the DVD recorder 10 is composed of a disc recording unit 100, a disc reading unit 101, a file system unit 102, a recording/editing/reproducing control unit 105, a user IF unit 106, an AV data recording unit 110, an AV data editing unit 120, and an AV data reproducing unit 130.

The disc recording unit 100, on receiving a logical sector number and logical data in units of sectors from the file system unit 102, records the received logical data onto the disc in units of ECC blocks (each block composed of 16 sectors). If the logical data has less than 16 sectors, the disc recording unit 100 reads the ECC block, executes the ECC process, then writes the ECC block onto the disc.

The disc reading unit 101, on receiving a logical sector number and the number of sectors from the file system unit 102, reads data in units of ECC blocks, subjects the read data to the ECC process, the transfers only necessary sector data to the file system unit. This is because by reading AV data in units of ECC blocks (each block composed of 16 sectors), overhead is reduced. This is the same with the disc recording unit 100.

The file system unit 102 includes an AV file system unit 103 for mainly writing and editing AV files, and a common file system unit 104 for executing processes common to AV files and non-AV files. The file system unit 102, on receiving commands from the AV data recording unit 110, AV data editing unit 120, and AV data reproducing unit 130 in relation to writing or reading files, manages files on the optical disc in units of sectors at the minimum.

Among various types of file management functions performed by the file system unit 102, (a) recording AV data, (b) deleting AV data, (c) recording non-AV data, and (d) deleting non-AV data are explained.

(a) Recording AV Data

On receiving a command to record AV data from the AV data recording unit 110 or the like, the AV file system unit 103 updates the AV block management table by assigning an AV block written as "00" (unassigned) to the specified AV data. The AV file system unit 103 then records the AV data into the assigned AV block via the disc recording unit 100. After this, the AV file system unit 103 updates the AV block management table by writing the assigned AV block as "01" (for AV block), and updates the space bit map by writing all the sectors included in the assigned AV block as "0" (assigned).

Figure 19:
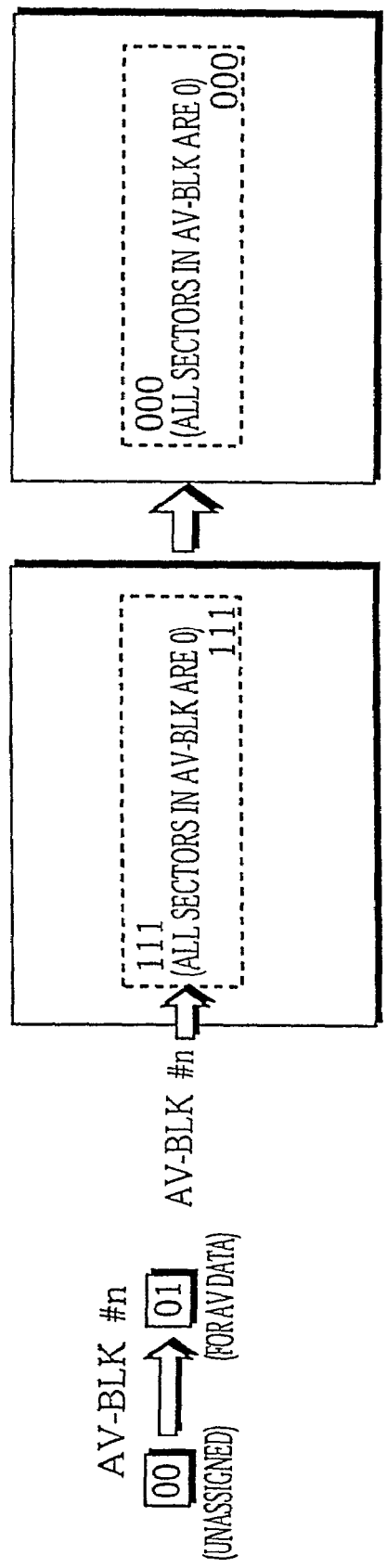
FIG. 19 shows the changes in the AV block management table and the space bit map when AV data is recorded.

FIG. 19 shows the changes in the AV block management table and the space bit map when AV data is recorded.

The left-hand side of the drawing shows change of the two-bit data in the AV block management table showing the assignment status of the AV block #n. The right-hand side of the drawing shows change of a part of the space bit map corresponding to the sectors included in the AV block #n. As shown in the drawing, when the status of the AV block #n in the AV block management table is changed from "00" (unassigned) to "01" (for AV data), the statuses of all the sectors included in the AV block #n are changed from "1" (unassigned) to "0" (assigned). With this arrangement, each AV block does not include a mixture of AV data and non-AV data, and a consecutive recording area is assigned to AV data as an AV block.

(b) Deleting AV Data

On receiving a command to delete AV data from the AV data editing unit 120, the AV file system unit 103 updates the AV block management table by writing an AV block recording the specified AV data as "00" (unassigned). The AV file system unit 103 then updates the space bit map by writing all the sectors included in the current AV block as "1" (unassigned).

FIG. 20 shows the changes in the AV block management table and the space bit map when AV data is deleted. As shown in the drawing, when the status of the AV block #n in the AV block management table is changed from "01" (for AV data) to "00" (unassigned), the statuses of all the sectors included in the AV block #n are changed from "0" (assigned) to "1" (unassigned).

(c) Recording Non-AV Data

On receiving a command to record non-AV data from the recording/editing/reproducing control unit 105, the common file system unit 104 detects unassigned sectors which are written as "1" (unassigned) in the space bit map and are included in the AV blocks written as "10" (for non-AV) in the AV block management table, and assigns the detected sectors to the specified non-AV data. The common file system unit 104 then records the non-AV data into the assigned sectors via the disc recording unit 100. After this, the common file system unit 104 updates the space bit map by writing the sectors having recorded the non-AV data as "0" (assigned). When not able to find unassigned sectors which are written as "1" (unassigned) in the space bit map and are included in the AV blocks written as "10" (for non-AV) in the AV block management table, the common file system unit 104 assigns sectors in an AV block written as "00" (unassigned) to the specified non-AV data, updates the AV block management table by changing the status of the AV block to "10" (for non-AV), and updates the space bit map changing the statuses of the sectors to "0" (assigned).

(d) Deleting non-AV Data

On receiving a command to delete non-AV data from the recording/editing/reproducing control unit 105, the common file system unit 104 updates the space bit map by changing the statuses of all the sectors recording the specified non-AV data to "1" (unassigned). When it is found from the AV block management table that one AV block is occupied by the sectors with status "1" (unassigned) by the above process, the common file system unit 104 updates the AV block management table by changing the status of the AV block from "10" (for non-AV data) to "00" (unassigned).

The recording/editing/reproducing control unit 105 controls the entire DVD recorder 10. More specifically, the control unit 105 controls display of guidance which urges the user to operate, receives instructions from the user reacting to the guidance via the user IF unit 106, and, in accordance with the user instructions, requests the AV data recording unit 110, AV data editing unit 120, or AV data reproducing unit 130 to execute operations such as newly recording of AV data, and reproducing and editing of recorded AV data.

The user IF unit 106 receives instructions for operations from the user via the remote controller 6, and informs the received user instructions to the recording/editing/reproducing control unit 105.

The AV data recording unit 110, AV data editing unit 120, and AV data reproducing unit 130, on receiving a recording request from the control unit 105, issue a command necessary for achieving respectively the recording, editing, and reproducing requests to the AV file system unit 103.

(1-2-4) Commands Executed by File System Unit 102

Following are the commands supported by the file system unit 102.

The file system unit 102 receives various commands from the AV data recording unit 110, AV data editing unit 120, AV data reproducing unit 130, and the recording/editing/reproducing control unit 105, and manages the files in accordance with the received commands.

FIG. 21 shows a list of commands supported by the file system unit 102 for the file management. The operations executed by the file system unit 102 in response to the commands are described below.

CREATE: generate a new file on the disc, and return a file identification descriptor.

DELETE: delete a file from the disc. More specifically, the command cancels the assignment of recording areas in units of AV blocks for deleting an AV file, and cancels the assignment of recording areas in units of sectors for deleting a non-AV file.

OPEN: obtain a file identification descriptor to access a file recorded on the disc.

CLOSE: close an opened file.

WRITE: record a file onto the disc. More specifically, the command assigns recording areas in units of sectors for AV blocks for non-AV data, and records data into the assigned sectors.

READ: read a file from the disc.

SEEK: move inside a data stream recorded on the disc.

RENAME: change a file name.

MKDIR: generate a new directory on the disc.

RMDIR: remove a directory from the disc.

STATEFS: inquire about the current state of the file system.

GET-ATTR: obtain an attribute of a file.

SET-ATTR: change an attribute of a currently opened file.

AV-WRITE: record an AV file onto the disc. More specifically, the command recording areas in units of AV blocks, and records data into the assigned AV blocks.

MERGE: merge two AV files on the disc into data in the memory.

SPLIT: split an AV file on the disc into two AV files.

SHORTEN: delete unnecessary part (an edge part) of an AV file on the disc.

REPLACE: replace a part of an AV file with data in the memory.

SEARCH DISCON: detect whether a specified section includes a discontinuous boundary (zone boundary), return "TRUE" if it includes the discontinuous boundary; and return "FALSE" if it does not include the discontinuous boundary.

It should be noted here that comands for recording AV data and non-AV data are separately supported as the AV-WRITE command and the WRITE command.

The AV data recording unit 110, AV data editing unit 120, and AV data reproducing unit 130 achieves processes such as recording, editing, and reproducing by using combinations of the above commands.

(1-3) Recording/Deleting

Now, the operations of the DVD recorder 10 is described in detail. The operations are: (1-3-1) Manual Recording of AV Data, (1-3-2) Programmed Recording of AV Data, (1-3-3) Deleting of AV Data, (1-3-4) Recording of Non-AV Data, and (1-3-5) Deleting of Non-AV Data.

(1-3-1) Manual Recording of AV Data

The manual recording is a recording immediately started when the user presses the "Record" key on the remote controller without setting a time for a programmed recording and sets two or three items on the screen.

Figure 22:
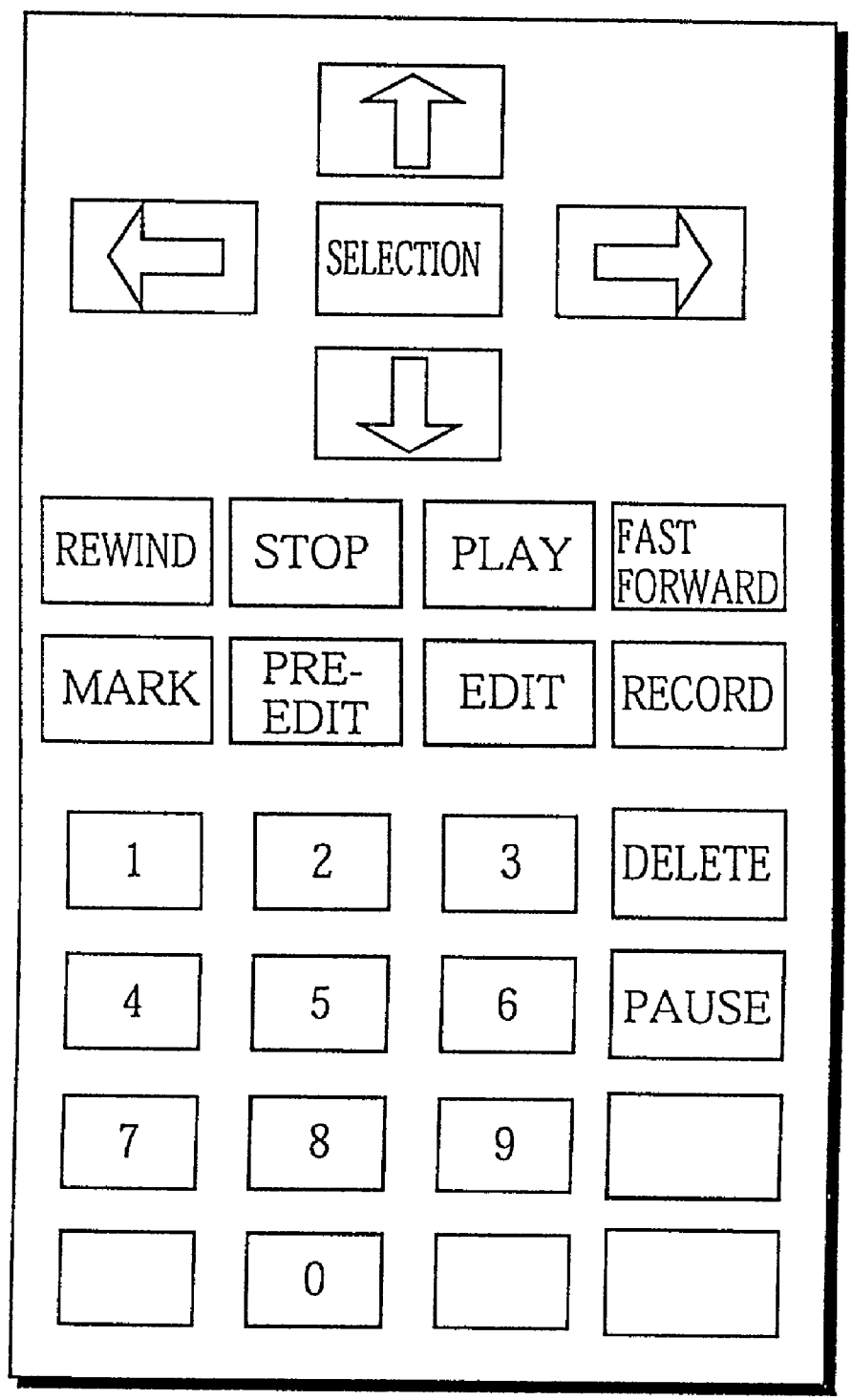
FIG. 22 shows an arrangement of buttons of the remote controller 6.
Figure 23:
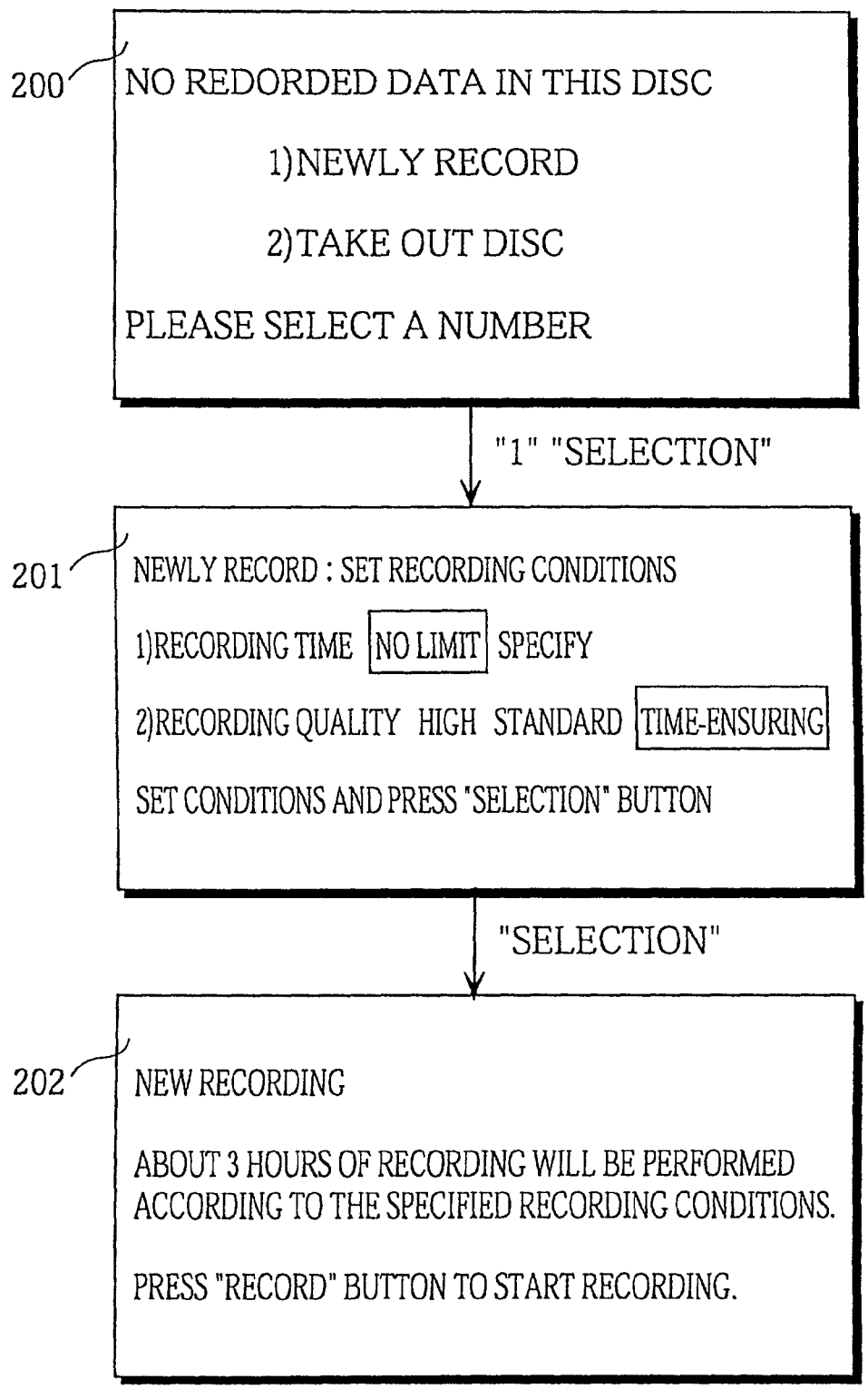
FIG. 23 shows guidance images.

For example, when the user presses the RECORD button on the remote controller 6 shown in FIG. 22, the display 12 displays a guidance image 200 shown in FIG. 23 under the control of the recording/editing/reproducing control unit 105. When the user presses "1" and "Selection" keys on the remote controller while the guidance image 200 is displayed on the screen, a guidance image 201 for setting recording conditions (in the present example, the "recording time" and "recording quality") is displayed.

For setting the recording time, the user first moves the focus on the screen onto either "no limit" or "specify" by operating the cursor button on the remote controller 6, then presses "Selection" button. Here, if the user selects "specify," the screen changes to a guidance image for urging the user to input a time by operating the ten key buttons. After the user specifies the time, the screen returns to the guidance image 201.

The "recording quality" as a recording condition relates to the bit rate and resolution of the MPEG data and has three types: "high," "standard," and "time-ensuring." The bit rate and resolution for each quality type is shown in FIG. 24.

Here, suppose the user selects "no limit" and "time-ensuring" quality on the guidance image 201, and then presses the "Record" button on the guidance image 202, as a sample case of the manual recording. This series of operations allows the manual recording to be started.

Figure 25A:
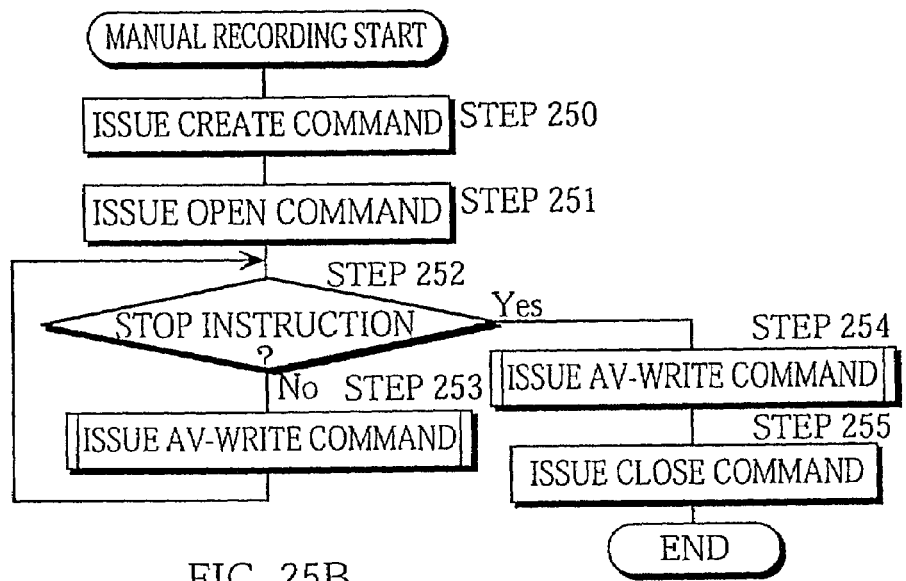
FIG. 25A is a flowchart showing the manual recording process performed by the AV file system unit 103 of the DVD recorder unit 10.

FIG. 25A is a flowchart showing the manual recording process.

The process starts as a notification that the user has pressed the "Record" button is sent to the recording/editing/reproducing control unit 105 via the user IF unit 106. On receiving the notification, the control unit 105 issues the CREATE command to the common file system unit 104 (step 250). On receiving the command, the common file system unit 104 returns the file identification descriptor when it is possible to create a file. In this process, the file size is specified as the maximum size of the disc since "no limit" has been specified by the user as the recording time. Also, the recording/editing/reproducing control unit 105 sends a file identifier and a parameter indicating the "time-ensuring" quality specified as the recording condition to the AV data recording unit 110.

The AV data recording unit 110 instructs the MPEG encoder 2 to start encoding the video and audio data of a predetermined channel received through the receiver 9 and transferring the encoded MPEG data to the track buffer 3*a*. While the above process is proceeding, the AV data recording unit 110 issues the OPEN command to the AV file system unit 103 (step 251) to allow the AV file system unit 103 to store the file identification descriptor given by the control unit 105 and information on the file entry into a work memory (not illustrated) (the information stored in the work memory is also referred to as "Fd" (File descriptor).

The AV data recording unit 110 issues the AV-WRITE command to the AV file system unit 103 every time the track buffer 3*a* stores a predetermined amount of MPEG data until it receives a stop command from the control unit 105 (steps 252 and 253). When receiving the stop command, the AV data recording unit 110 issues the AV-WRITE command (step 254), and issues the CLOSE command (step 255) to end the present process. The AV-WRITE command is issued in step 254 to process the allocation descriptor of the last extent to be held in the Fd. The CLOSE command is issued in step 255 to write back the Fd in the work memory onto the DVD-RAM disc as a file identification descriptor, a file entry or the like on the DVD-RAM disc.

Now, the data recording process executed by the AV-WRITE command is described in detail.

Figure 26:
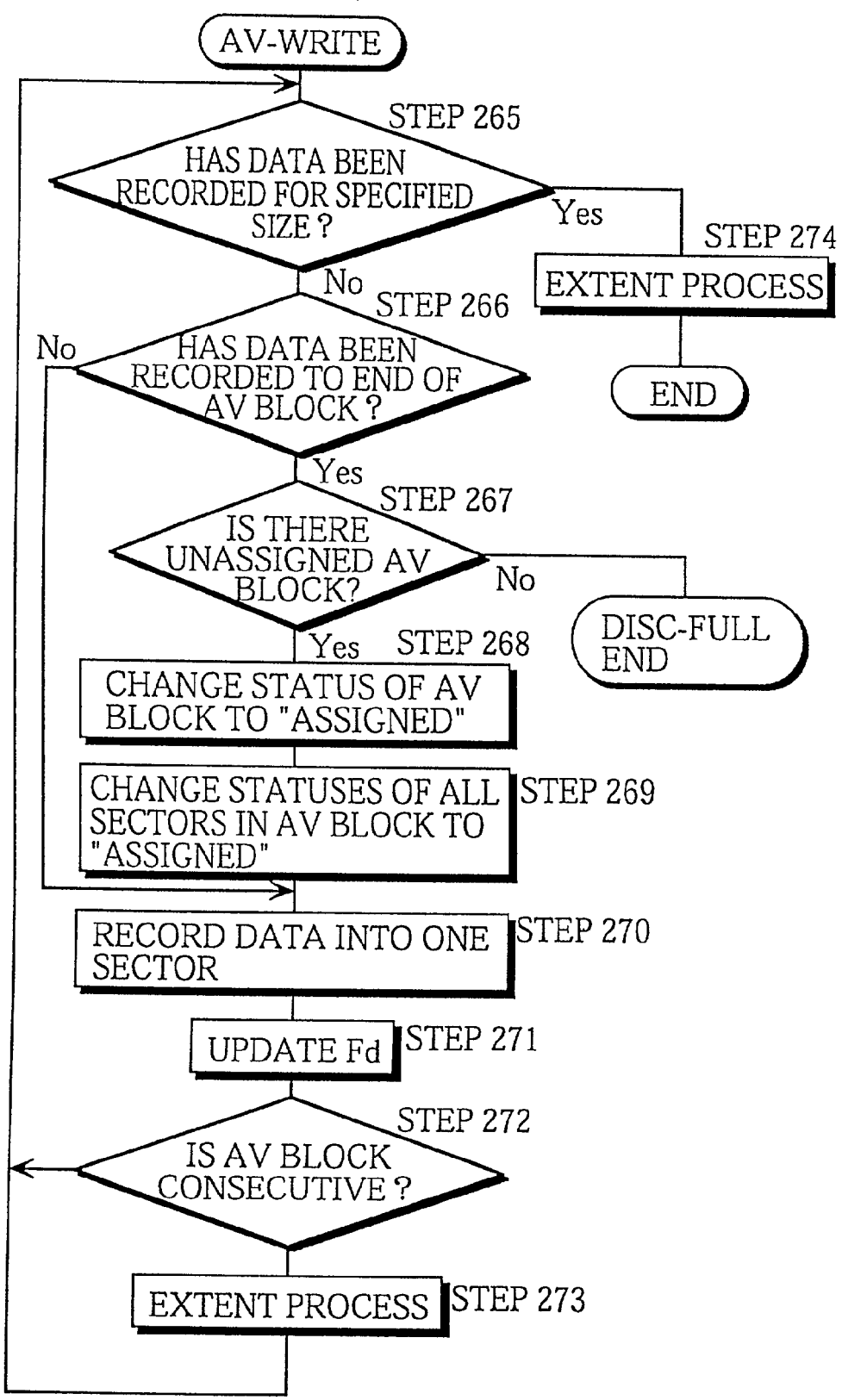
FIG. 26 is a flowchart showing the process performed by the AV file system unit 103 having received the AV-WRITE command.

FIG. 26 is a flowchart showing the process performed by the AV file system unit 103 having received the AV-WRITE command. Here, it is presumed that the AV-WRITE command is issued to the AV file system unit 103 together with three parameters specified. The three parameters respectively indicate: the Fd having been opened by the OPEN command as described above; the size of data to be recorded; and a buffer (in this embodiment, the track buffer 3*a*) storing the data. The Fd specified by the parameter includes, as the file entry does, information of a storage position of an extent and a length of the extent. The Fd is updated every time the AV-WRITE command is issued during the period between the opening and closing of the Fd. For the second or a subsequent issue of the AV-WRITE command, new data is additionally written, following the already-recorded data.

As shown in FIG. 26, the AV file system unit 103 holds a counter for counting for a size specified as a parameter. Until data of the specified size is completely recorded (step 265: No), the AV file system unit 103 assigns areas to the data, one sector by one sector, and records the data onto the disc. More specifically, when an opened file does not include already-recorded data (when the AV-WRITE command is issued once in a recording process); or when an opened file includes already-recorded data (when the AV-WRITE command is issued twice in a recording process) and the data is recorded to the end of an AV block (step 266: No), the AV file system unit 103 detects an AV block with status "00" (unassigned) by referring to the AV block management table (step 267), changes the status to "01" (for AV data) (step 268), and changes the statuses of all the sectors included in the AV block from "1" (unassigned) to "0" (assigned) (step 269).

When an opened file includes already-recorded data and the data is not recorded to the end of an AV block (step 266: Yes), the AV file system unit 103 proceeds to step 270.

The AV file system unit 103 fetches data having a size of one sector from the track buffer 3*a*, and records the fetched data to the first sector of the newly assigned AV block or to a sector following a data-recorded sector on the DVD-RAM disc (step 270). The AV file system unit 103 then updates the counter (step 271). The AV file system unit 103 judges whether two sectors in which data was recorded most recently are consecutive sectors (step 272). The AV file system unit 103 judges that the two sectors are not consecutive when the two sectors are not physically consecutive or when a zone boundary exists between the sectors. The presence of a zone boundary between the sectors is judged by referring to the last-block-length table shown in FIG. 5. When it is judged as negative in step 272, the AV file system unit 103 allows the allocation descriptor of Fd to hold, as one extent, the AV data recorded the AV block immediately before the current AV block (step 273). When it is judged as positive in step 272, control returns to step 265.

When data of the specified size is completely recorded by repeating the recording of data into sectors (step 265: Yes), the AV file system unit 103 allows Fd to hold the allocation descriptor of the last extent including the last-recorded sector (step 274) to end the "AV-WRITE" process.

As described above, on receiving the AV-WRITE command, the AV file system unit 103 assigns areas to the specified AV data in units of AV blocks which are each a consecutive area of about 7 MB. With this arrangement, each extent, except the last extent, in each AV file in which AV data has been recorded has at least about 7 MB. This ensures the uninterrupted reproduction.

It is described for the sake of conveniences that data having a size of one sector is recorded onto the DVD-RAM disc in step 270. However, in reality, data is recorded onto the DVD-RAM disc each time the track buffer stores data equivalent to one ECC block (16 sectors) in size.

(1-3-2) Programmed Recording of AV Data

The programmed recording is a recording process performed when the user presses the "Record" key on the remote controller with a time for programmed recording set.

Here, it is presumed that the user selects "Specify" and "Time-Ensuring" on the guidance image 201, as a sample case of the programmed recording. This allows the programmed recording to be started.

Figure 25B:
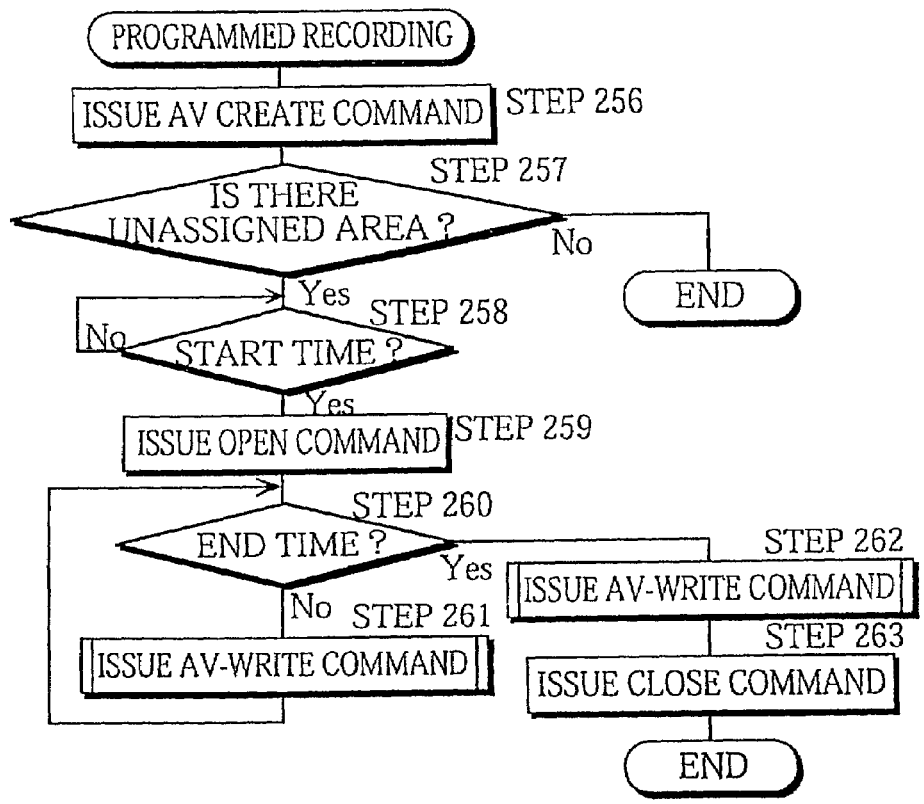
FIG. 25B is a flowchart showing the programmed recording process performed by the AV file system unit 103 of the DVD recorder unit 10.

FIG. 25B is a flowchart showing the programmed recording process.

The process starts as a notification that the user has pressed the "Record" button is sent to the recording/editing/reproducing control unit 105 via the user IF unit 106. On receiving the notification, the control unit 105 notifies the common file system unit 104 of the specified time and issues the CREATE command to the same unit 104 (step 256). On receiving the command, the common file system unit 104 returns the file identification descriptor when it is possible to create a file. In this process, the file size is specified to be the number of AV blocks corresponding to the specified time. Also, the recording/editing/reproducing control unit 105 judges whether areas corresponding to the specified time can be assigned based on whether a file identification descriptor has been sent (step 257).

Having judged that the areas cannot be assigned, the control unit 105 ends the programmed recording process by performing the error process.

Having judged that the areas can be assigned, the control unit 105 sends a file identifier. A specified time, and a parameter indicating the "time-ensuring" quality specified as the recording condition to the AV data recording unit 110. On receiving these types of information, the AV data recording unit 110 issues the OPEN command (step 259) when it is the specified time to start recording (step 258). The subsequent processes of the AV data recording unit 110 are almost the same as the steps 252–255 shown in FIG. 25A: issuing the OPEN command to the AV file system unit 103, repeating to issue the AV-WRITE command until it is the end time, and issuing the CLOSE command (steps 258–262).

As described above, the programmed recording starts after checking whether enough unassigned AV blocks for the specified time are available for the programmed recording.

Note that the order of the steps 256 and 257 may be reversed.

(1-3-3) Deleting of AV Data

Both AV files and non-AV files are deleted by the common file system unit 104 when the DELETE command is issued. When receiving the DELETE command to delete a certain file, the common file system unit 104 judges whether the certain file is an AV file or a non-AV file by referring to the extension of the file name and attribute information. The common file system unit 104 performs different processes on the AV block management table and the space bit map in accordance with the above judgement result.

Figure 27:
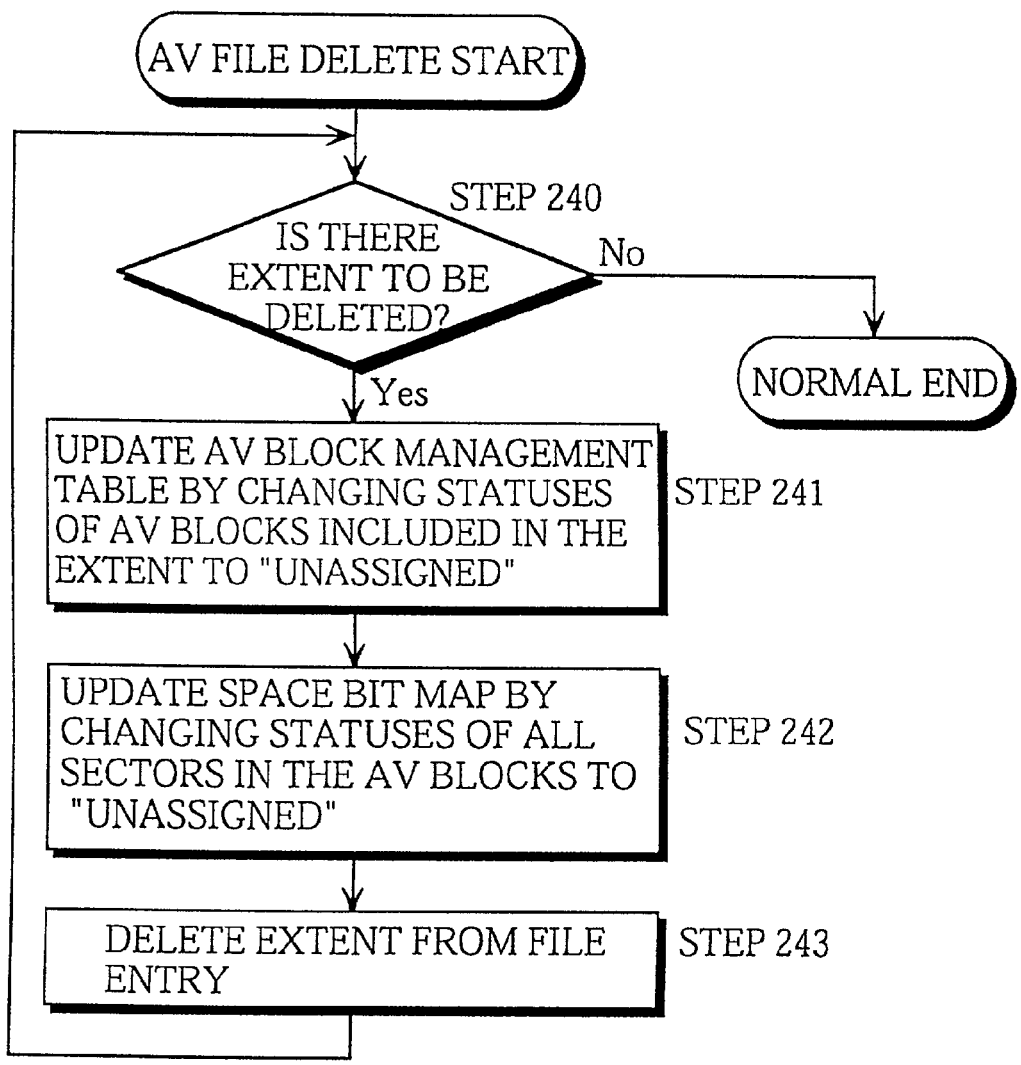
FIG. 27 is a flowchart showing the process of deleting AV files performed by the common file system unit 104.

FIG. 27 is a flowchart showing the process of deleting AV files performed by the common file system unit 104.

The common file system unit 104 judges whether an extent should be deleted by referring to the file entry of the specified AV file (step 240). Having judged as positive in this step, the common file system unit 104 updates the AV block management table by changing the status of the AV block included in the extent from "01" (for AV data) to "00" (unassigned) (step 241), updates the space bit map by changing the statuses of all the sectors included in the AV block from "0" (assigned) to "1" (unassigned) (step 242), and deletes the extent from file entry (step 243). When there is no extent to be deleted (step 240: No), the common file system unit 104 deletes the file identification descriptor and ends the AV file deletion process.

FIG. 28A shows deleted AV files. The upper part of the drawing shows that AV files #1 and #2 are recorded in the AV blocks #10 to #14. The AV file #1 is composed of two extents (AV files #1-1 and #1-2). The AV file #2 is composed of AV files #2-1 and #2-2. The lower part of FIG. 28A shows that extents have been deleted from the AV file #1 of the AV blocks #11 and #14.

FIG. 28B shows the changes in the AV block management table and the space bit map corresponding to the deletion shown in FIG. 28A. The left-hand side of FIG. 28B shows the state before deletion, and the right-hand side shows after deletion. In the AV block management table, statuses of the AV blocks #11 and #14 are changed from "01" (for AV data) to "00" (unassigned) in accordance with the procedure shown in FIG. 27. In the space bit map, statuses of all the sectors included in the AV blocks are changed from "0" (assigned) to "1" (unassigned). It should be noted here that the lower part of FIG. 28A is not intended to show that the AV data included in the AV blocks #11 and #14 is physically deleted. In reality, the AV data is dealt with as invalid data by the AV file system unit 103.

(1-3-4) Recording of Non-AV Data

FIG. 29 is a flowchart showing the process of recording non-AV files performed by the common file system unit 104.

The common file system unit 104

On receiving the WRITE command from the recording/editing/reproducing control unit 105, the common file system unit 104 judges whether there is non-AV data to be recorded (step 261). Having judged as positive in this step, the common file system unit 104 detects unassigned sectors which are written as "1" (unassigned) in the space bit map and are included in the AV blocks written as "10" (for non-AV) or "00" (unassigned) in the AV block management table (step 262). When the status of the AV block including the detected sectors is "00" (unassigned), the common file system unit 104 changes the status to "10" (for non-AV) (step 263), changes the statuses of the detected sectors from "0" (assigned) to "1" (unassigned) (step 264), and records the non-AV data into the detected sectors (step 265). The common file system unit 104 then judges whether two sectors in which data was recorded most recently are consecutive (step 266). When it is judged as potive in step 266, control returns to step 261; when it is judged as negative, the common file system unit 104 records into the file enty the allocation descriptor of the extent including the sector immediately before the current sector (step 268) to end the non-AV data recording process.

(1-3-5) Deleting of Non-AV Data

On receiving the DELETE command specifying a certain file from the recording/editing/reproducing control unit 105, and when the certain file is non-AV file, the common file system unit 104 performs the deletion process as follows.

Figure 30:
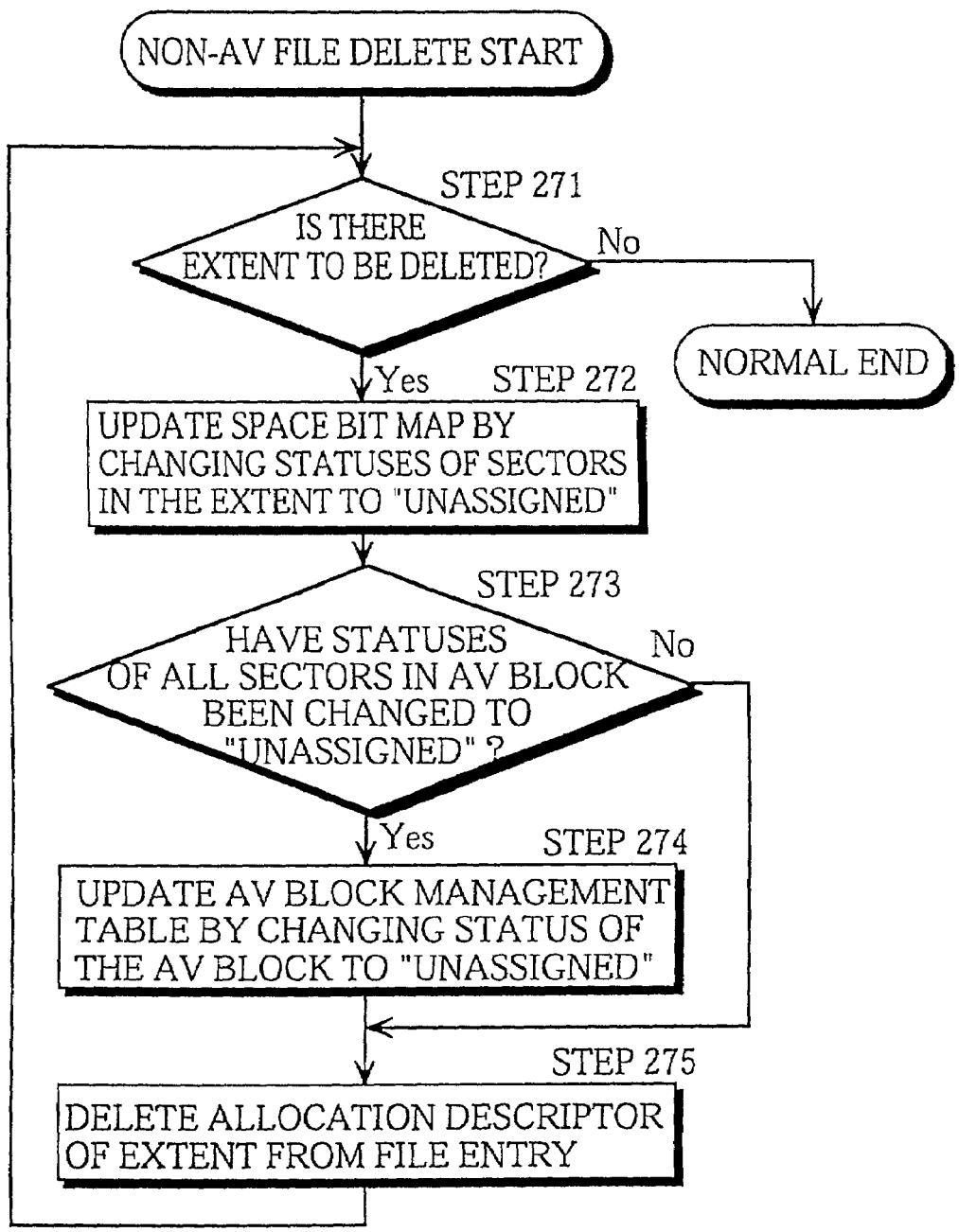
FIG. 30 is a flowchart showing the process of deleting non-AV files performed by the common file system unit 104.

FIG. 30 is a flowchart showing the process of deleting non-AV files performed by the common file system unit 104.

The common file system unit 104 judges whether an extent should be deleted by referring to the file entry of the specified non-AV file (step 271). Having judged as positive in this step, the common file system unit 104 updates the space bit map by changing the statuses of all the sectors included in the extent from "0" (assigned) to "1" (unassigned) (step 272).

The common file system unit 104 then judges whether the statuses of all the sectors included in an AV block in the extent are "1" (unassigned) by referring to the AV block management table (step 273). When it is judged so in the step, the common file system unit 104 updates the AV block management table by changing the status of the AV block from "10" (for non-AV data) to "00" (unassigned) (step 274). The common file system unit 104 deletes the allocation descriptor of the extent from the file entry (step 275), then returns to step 271. When it is judged that there is no extent to be deleted, the non-AV file deletion process ends.

Figures 31A, 31B:
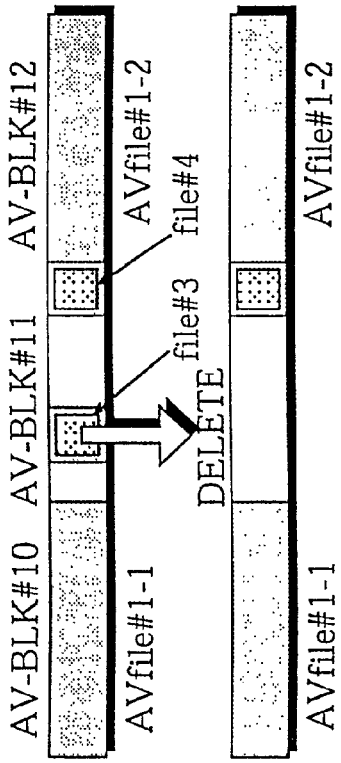
FIG. 31A shows non-AV files before and after deletion.
FIG. 31B shows the changes in the AV block management table and the space bit map corresponding to the deletion.

FIG. 31A shows deleted non-AV files. The upper part of the drawing shows that AV block #11 includes non-AV files #3 and #4. Each of the non-AV files #3 and #4 includes only one extent. The lower part of FIG. 31A shows that the extent has been deleted from the non-AV file #3.

FIG. 31B shows the changes in the AV block management table and the space bit map corresponding to the deletion shown in FIG. 31A. The left-hand side of FIG. 31B shows the state before deletion, and the right-hand side shows after deletion. In the AV block management table, the status of the AV block #11 remains to be "10" (for non-AV data) in accordance with the procedure shown in FIG. 30 since file #4 remains in the block. In the space bit map, statuses of all the sectors included in the extent of AV block #11 are changed from "0" (assigned) to "1" (unassigned). It should be noted here that the lower part of FIG. 31A is not intended to show that the non-AV data included in the file #3 is physically deleted. In reality, the non-AV data is dealt with as invalid data by the AV file system unit 103.

As apparent from the above description, the DVD-RAM of the present embodiment includes the space bit map and the AV block management table as a part of the file system management information. This construction ensures uninterrupted reproduction of AV data since consecutive areas are assigned in units of AV blocks.

In the DVD-RAM of the present embodiment, when an AV block is assigned to AV data, the statuses of all the sectors included in the AV block are changed to "assigned" in the space bit map. With such a management method, even if the DVD-RAM of the present invention is accessed by a conventional file system which supports only the space bit map, the following problems are prevented: data is written into sectors included in AV blocks for AV data, and consecutive sector areas assigned to AV data are used and lost.

Concerning the sectors included in AV blocks assigned to non-AV data, only the statuses of the sectors in which data has actually been recorded are shown as "assigned" in the space bit map. That is to say, different from the case of the AV blocks assigned to AV data, the statuses of the sectors in which data has not been recorded are not shown as "assigned" in the space bit map.

With the above construction, non-AV data can be recorded into an AV block when there are unassigned areas in it even if the AV block has already been assigned to another kind of non-AV data. This enables the use efficiency of the entire disc to be improved even if the disc includes both AV blocks for AV data and AV blocks for non-AV data.

In the above embodiment, the DVD recorder 10 is, as shown in FIG. 14, constructed based on the premise that it is used as a replacement for a VTR used at home. Not limited to the construction, when the DVD-RAM disc is to be used as a recording medium for computers, the following constructions are possible. That is to say, the disc access unit 3 is connected, as a DVD-RAM drive apparatus, to a computer bus via an IF called SCSI or IDE. Also, the components other than the disc access unit 3 shown in FIG. 15 are achieved or operated when the OS and the application program are executed on the computer hardware. In this case, the disc recording unit 100, disc reading unit 101, and file system unit 102 are mainly achieved as applications for enhancing the OS or the functions of the OS. Also, the other components other than these are mainly achieved as functions of the application programs. The various commands supported by the file system unit 102 are equivalent to service commands, such as a system call command, provided to the applications.

In the above embodiment, two bits are used to indicate the assignment status of each piece of AV data in the AV block management table. However, the number of bits may be increased so that other kinds of attribute information can be added.

Figure 32:
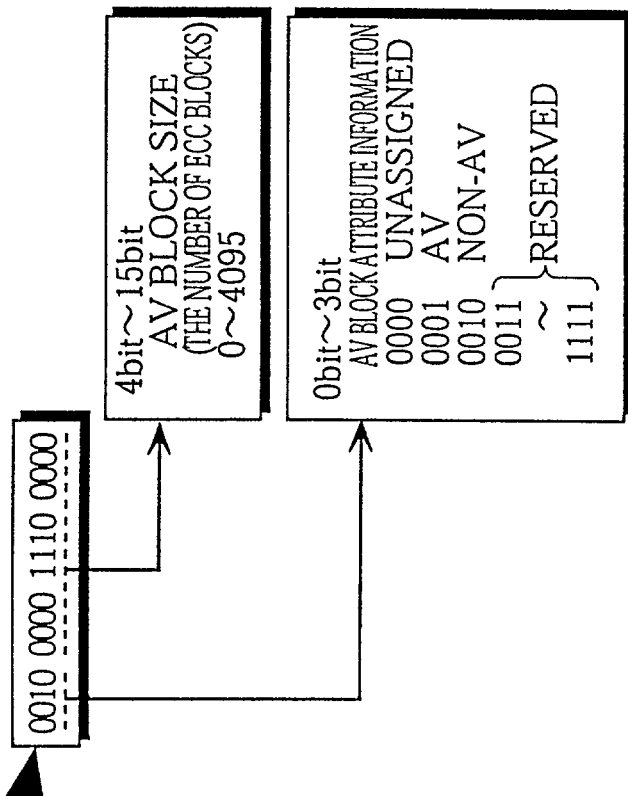
FIG. 32 shows the second construction example of the AV block management table.

FIG. 32 shows the second construction example of the AV block management table.

The AV block management table includes an arrangement of a plurality of pieces of two-byte data which each shows the assignment information and attribute information. The upper four bits of each piece of two-byte data are used for representing the assignment status of the AV blocks as described in the present embodiment. The lower 12 bits represent the number of effective ECC blocks in the corresponding AV block. For example, the first AV block includes 224 ("E0" in hexadecimal notation) effective ECC blocks, and the sixth AV block includes 223 ("DF" in hexadecimal notation) effective ECC blocks.

As described above, in the AV block management table shown in FIG. 32, the number of effective ECC blocks for each AV block is recorded, the number of effective ECC blocks being the total number of ECC blocks included in each AV block from which the number of ECC blocks including an address error is subtracted. If the file system unit 102 could not obtain the number of effective ECC blocks, the file system unit 102 would be required to perform an address error process when recording data since it is impossible for the file system unit 102 to recognize the amount of data that can be recorded into each AV block without the information. According to the AV block management table shown in the drawing, the file system unit 102 is relieved from the complicated address error process necessary when data is recorded.

Note that it is also possible to have another information which indicates the ECC blocks or sectors in which address errors occur and to allow the AV file system to use the information.

It is also possible to reduce the amount of process performed by the file system by using the most significant bit as a flag indicating "variable length" or "not-variable length" and by using the value indicating the size of the AV block as an effective value only when the flag is on. This is possible when the probability of the occurrence of address errors is very low and when almost all the AV blocks are recognized as having a fixed length.

Figure 33:
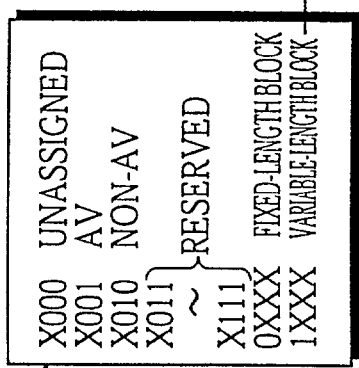
FIG. 33 shows the third construction example of the AV block management table.

FIG. 33 shows the third construction example of the AV block management table.

The AV block management table includes an arrangement of a plurality of pieces of four-bit data which each shows the assignment information and attribute information. The lower three bits of each piece of four-bit data are used for representing the assignment status of the AV blocks as described in the present embodiment. When the most significant bit is "1" (also referred to as a variable-length bit) the bit indicates that the current AV block has a variable length, when the bit is "0," the bit indicates a fixed length. Here, when an AV block has a fixed length, it indicates that the AV block includes 224 effective ECC blocks without address errors. Otherwise, the AV block has a variable length. An AV blocks has a variable length when the AV block includes an ECC block having an address error or when the AV block is the last AV block adjacent to a zone boundary.

The block length of a variable AV block is recorded in the variable-length AV block table shown on the right-hand side of the drawing. The table, replacing the last block-length table shown in FIG. 5, includes, for each variable AV block, a block number and the number of effective ECC blocks. As shown in the drawing, in the AV block management table, AV blocks with the variable-length bit are represented by boxes with slant lines. The number of effective ECC blocks for each of these variable-length AV blocks is recorded in the variable-length AV block table. With such an arrangement in which the variable-length AV block table includes, for each variable AV block, a block number and the number of effective ECC blocks, it is possible for the file system to refer to the variable-length AV block table using the AV block number when managing the AV blocks with variable-length flag in the AV block management table. Also, the third construction example, compared with the second construction example, has a reduced size of the AV block management table.

When the physical size of each AV block is set as variable-length, it is possible to perform the mapping of the sectors and the AV blocks without difficulty by recording the sizes of all the AV blocks in the variable-length AV block table. it is further possible to perform the mapping of the sectors and the AV blocks without difficulty by recording the start sector number, track number, zone number in the AV block management table, instead of recording the physical sizes of AV blocks in the variable-length AV block table.

Figure 34:
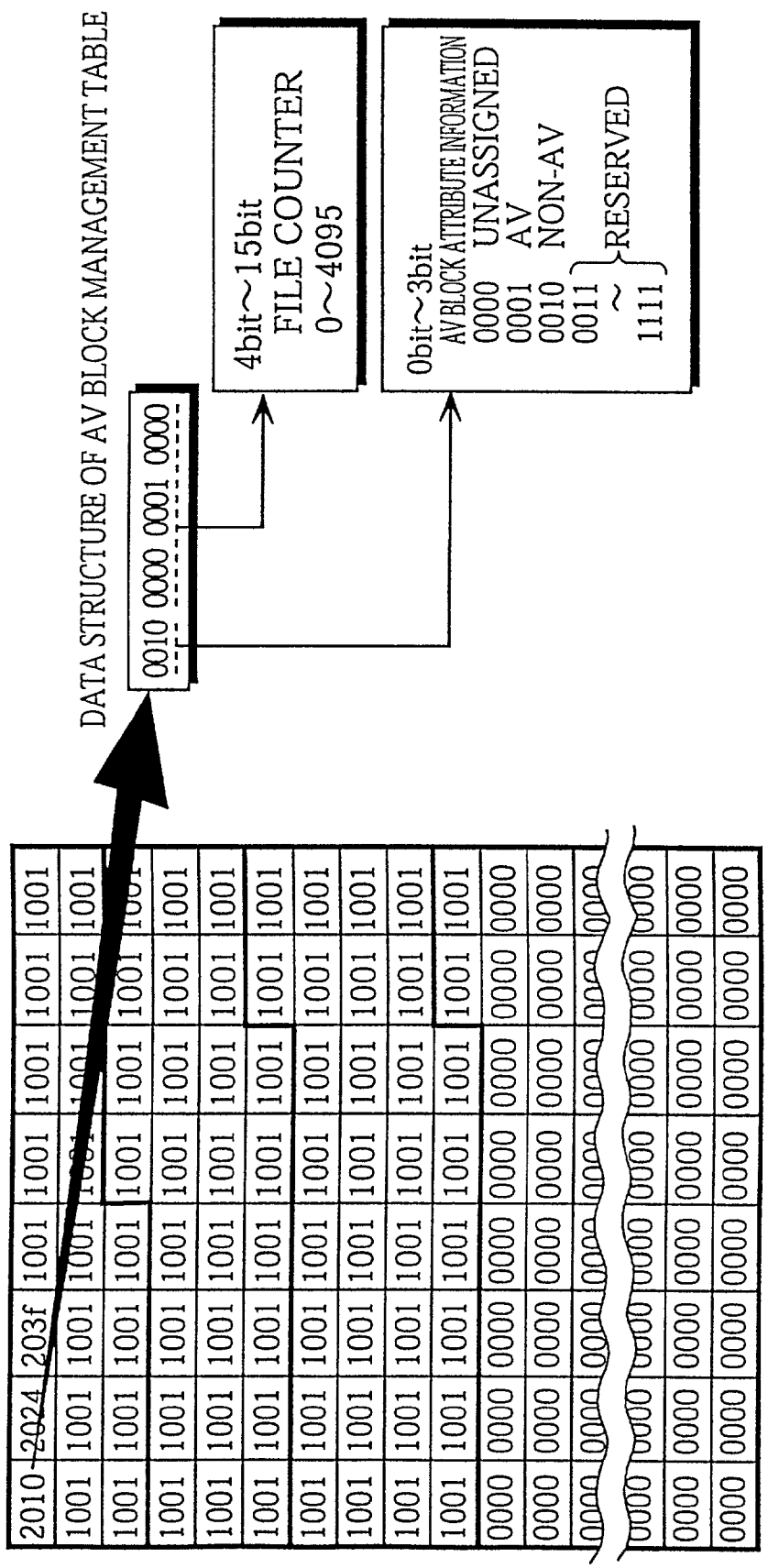
FIG. 34 shows the fourth construction example of the AV block management table.

FIG. 34 shows the fourth construction example of the AV block management table.

The AV block management table includes an arrangement of a plurality of pieces of two-byte data which each correspond to one AV block. Each piece of two-byte data indicates the number of files recorded in the AV block, as well as the assignment status. The upper four bits are used for representing the assignment status of the AV blocks as described in the present embodiment. The lower 12 bits indicate the number of files. Here, the number of files is 4095 at the maximum. Therefore, it is possible to record 4095 files in one AV block.

Here, the lower 12 bits are referred to as a counter. Each counter corresponds to one AV block. It may happen that one file is divided and recorded in a plurality of AV blocks when the file is AV file generally having a large size or due to the area assignment even in case of a non-AV file generally having a small size. In this case, the counter regards a part of a file recorded in the AV file as one file. That is to say, whether the AV file includes a whole file or a part of a file, each case is recognized as one file by the counter. Also, when a file is divided and recorded in a plurality of extents in one AV block, the file is regarded as one file.

The use of such a counter provides two merits to the management of the AV blocks. The first merit is that it becomes easier to judge whether to release AV blocks for non-AV data. In the present embodiment, the file system unit 102 releases an AV block as unassigned when confirming by referring to the space bit map that all the sectors included in the AV block are unassigned. As understood from this, in the present embodiment, to release an AV block, the space bit map is referred to. However, when the AV block management table includes counters as shown in FIG. 34, it is possible to release an AV block for non-AV data when the counter is "0." This eliminates the necessity for referring to the space bit map. It is needless to say that the space bit map should be updated each time data is deleted from any sectors.

The second merit is that it becomes easier for a plurality of files to coexist in one AV block for AV data. The term "coexist" indicates a case in which one AV file is divided into a plurality of AV files by editing not that an AV file is added to an AV block in which another AV file has already been recorded. In this case, it is possible by using the counter to detect the presence of a plurality of AV files in an AV block and to release an AV block when the counter is "0."

In reality, it is enough to take into account a case where two files coexist in one AV block. In this case, it is enough to set a flag, instead of a counter, indicating "coexist" of "not coexist." In this case, the file system unit 102 may refer to the space bit map to determine whether to release an AV block for non-AV data, as described in the present embodiment, and may refer to the "coexistent" flag to determine whether to release an AV block for AV data.

It is also possible for the fourth construction example to use the variable-length bit described in the third construction example. Furthermore, it will also be possible for the AV block management table to additionally include the size of AV block if the size of the data for each AV block is increased to three bytes or more.

Figure 35:
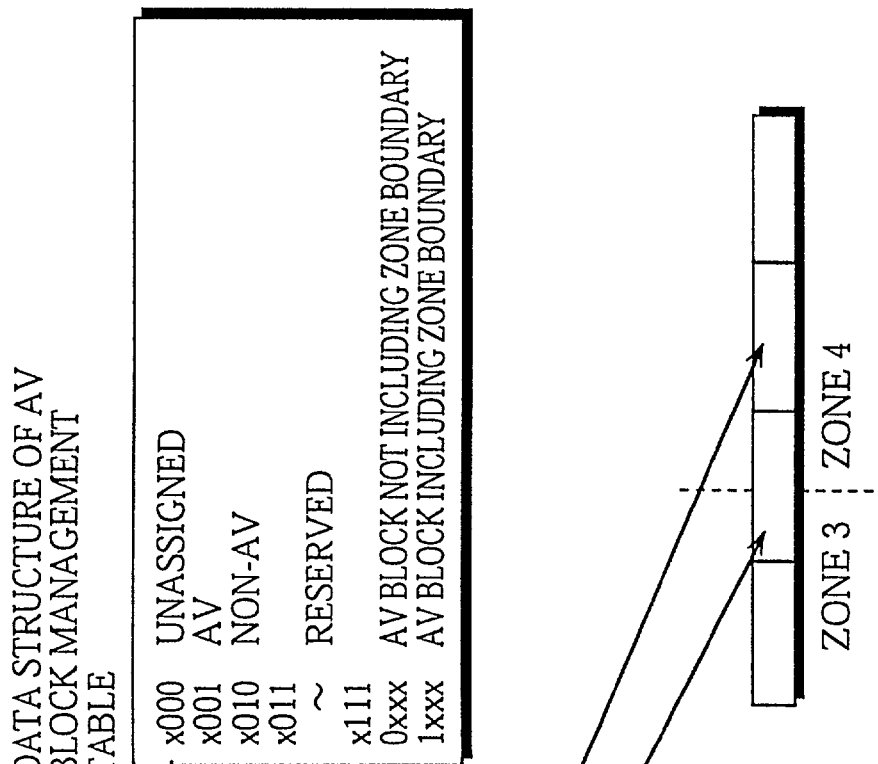
FIG. 35 shows the fifth construction example of the AV block management table.

FIG. 35 shows the fifth construction example of the AV block management table.

In the present embodiment, the last AV block in each zone has a variable length so as not a zone boundary is within one AV block. In the fifth construction example, each AV block has a fixed length of about 7 MB, and AV blocks are arranged from the start of the disc in order. In this case, like the AV blocks represented by slant lines in FIG. 35, some AV blocks may include a zone boundary. It is impossible to secure the uninterrupted reproduction for the AV blocks including a zone boundary. Therefore, it is required to manage the information indicating whether each AV block includes a zone boundary. For this purpose, the fifth construction example allows the AV block management table to have a flag indicating whether each AV block includes a zone boundary.

The AV block management table shown in FIG. 35 includes an arrangement of a plurality of pieces of four-bit data which each correspond to one AV block. The upper one bit indicates whether the corresponding AV block includes a zone boundary. The lower three bits indicate the assignment status of the AV block. In this case, the file system unit 102 assigns three consecutive AV blocks whose center AV block having a zone boundary to one AV file, and does not assign one AV block having a zone boundary to one AV file. With this arrangement, it is possible to ensure the uninterrupted reproduction even if an AV file is recorded into the AV block having a zone boundary.

When it is presumed that only non-AV files can be recorded in the AV blocks including a zone boundary, the same number of AV blocks as the number of zone boundaries, that is 24 AV blocks should be prepared for the non-AV files. The total capacity of the 24 AV blocks amounts to 164 MB. That means, the capacity of the area in which AV files can be recorded reduces. As a result, it is desirable for the file system unit 102 to manage the above-described three consecutive AV blocks together for each zone boundary.

It is also possible for the AV block management table shown in FIG. 6 to include a discontinuous flag which indicates that the AV blocks before and after a zone boundary are not consecutive. With this arrangement, it will be easier for the file system unit 102, when assigning two consecutive AV blocks, to judge whether the two consecutive AV blocks have a zone boundary in between since the unit 102 can obtain the information by referring to the AV block management table.

When a set of AV blocks for non-AV data is reserved in advance, with the set having a predetermined size, the mixed presence of the AV blocks for AV data and non-AV data is prevented. This makes it easier to assign consecutive areas to AV data.

When a disc having been written by an AV file system is not compatible with discs having been written by another type of file system, and when the disc is accessed only by the AV file system, it is possible to write as "assigned" the statuses of the sectors in which AV data has actually been recorded, not the statuses of all the sectors included in AV blocks whose statuses are written as "for AV data." This makes it easier to manage the unassigned areas in the AV blocks.

In the present embodiment, the statuses of all the sectors included in an AV block for AV data are written as "assigned." However, only the statuses of the sectors in which AV data has actually been recorded may be written as "assigned." This makes it easier to manage the unassigned areas in the AV blocks though compatibility between discs having been written by the AV file system and another type of file system is somewhat lost.

(2) Embodiment 2

Now, the optical disc and the optical disc recording/reproducing apparatus of Embodiment 2 are described.

(2-1) Optical Disc

Embodiment 2 differs from Embodiment 1 in that (1) pseudo consecutive records, instead of the AV blocks, are assigned to AV data to be recorded, and that (2) pseudo consecutive record assignment management information is used instead of the AV block management table. The differences (1) and (2) are described below in detail.

With regard to the above difference (1), in Embodiment 1, the entire data recording area is almost fixedly divided into AV blocks each with a fixed length in advance whether AV data has been recorded or not in the area. In contrast, in Embodiment 2, AV blocks are not used. Instead, areas called pseudo consecutive records are dynamically assigned to AV data, each pseudo consecutive record having a size greater than the fixed length described in Embodiment 1.

With regard to the above difference (2), in Embodiment 1, one AV block management table is used to manage the assignment states of all the AV blocks. In contrast, in Embodiment 2, the pseudo consecutive record assignment management information for managing the pseudo consecutive record is recorded on the disc for each AV file.

Accordingly, FIGS. 1–3 and 8–12 used in Embodiment 1 also apply to the optical disc of Embodiment 2. FIG. 4 can also be applied to Embodiment 2 by deleting the AV blocks. Since in Embodiment 2, the other characteristics are the same as Embodiment 1: the partition region is divided into a plurality of zone areas; and reading and writing of data are performed in units of ECC blocks (each having 16 sectors). Also, although the AV management table shown in FIG. 6 is not used in Embodiment 2, the sector management table (space bit map) is used as well.

(2-1-1) Pseudo Consecutive Record

Each AV file in the present Embodiment is composed of one or more pseudo consecutive records to ensure the uninterrupted reproduction. The "pseudo consecutive record" is defined as an area recording AV data or the AV data recorded in the area, where the AV data may be whole or partial, has a size greater than a size that ensures a consecutive reproduction, and the area is composed of consecutive sectors or ECC blocks. However, the skipping by the ECC block skip method is counted in for the consecutive sectors or ECC blocks.

According to the ECC block skip method, when a defective sector which causes an address error or the like is detected, the ECC block including the defective sector is skipped and data is written into the next ECC block. This method is more suitable for the consecutive reproduction of AV data than the linear replacement method in which when a similar defect sector is detected, data is written into a sector in a replacement area having been reserved in the same zone. This is because a jump to the replacement area does not occur in case of the ECC block skip method.

Each pseudo consecutive record includes ECC blocks the number of which is represented by any integer. The start sector of each pseudo consecutive record is the start sector of one of the ECC blocks. That is to say, each pseudo consecutive record is located within a single zone. The minimum size of the pseudo consecutive record is set to 224 ECC blocks (about 7 MB) to ensure the consecutive reproduction of AV data, as in the AV block in Embodiment 1.

The pseudo consecutive record assignment management information showing an assignment result of a pseudo consecutive record is generated and recorded for each AV file. The pseudo consecutive record assignment management information may be recorded in the start of the corresponding AV file. However, in the present embodiment, the information is recorded as non-AV files respectively corresponding to the AV files. The pseudo consecutive record assignment management information has a list structure.

(2-1-2) Assignment of Pseudo Consecutive Records

Each piece of pseudo consecutive record assignment management information (also referred to as management information) corresponds to an AV file and shows areas on the disc which are assigned as pseudo consecutive records to the current AV file.

The optical disc recording apparatus assigns unassigned areas on the optical disc as pseudo consecutive records to AV files prior to recording of the AV files.

Figure 36:
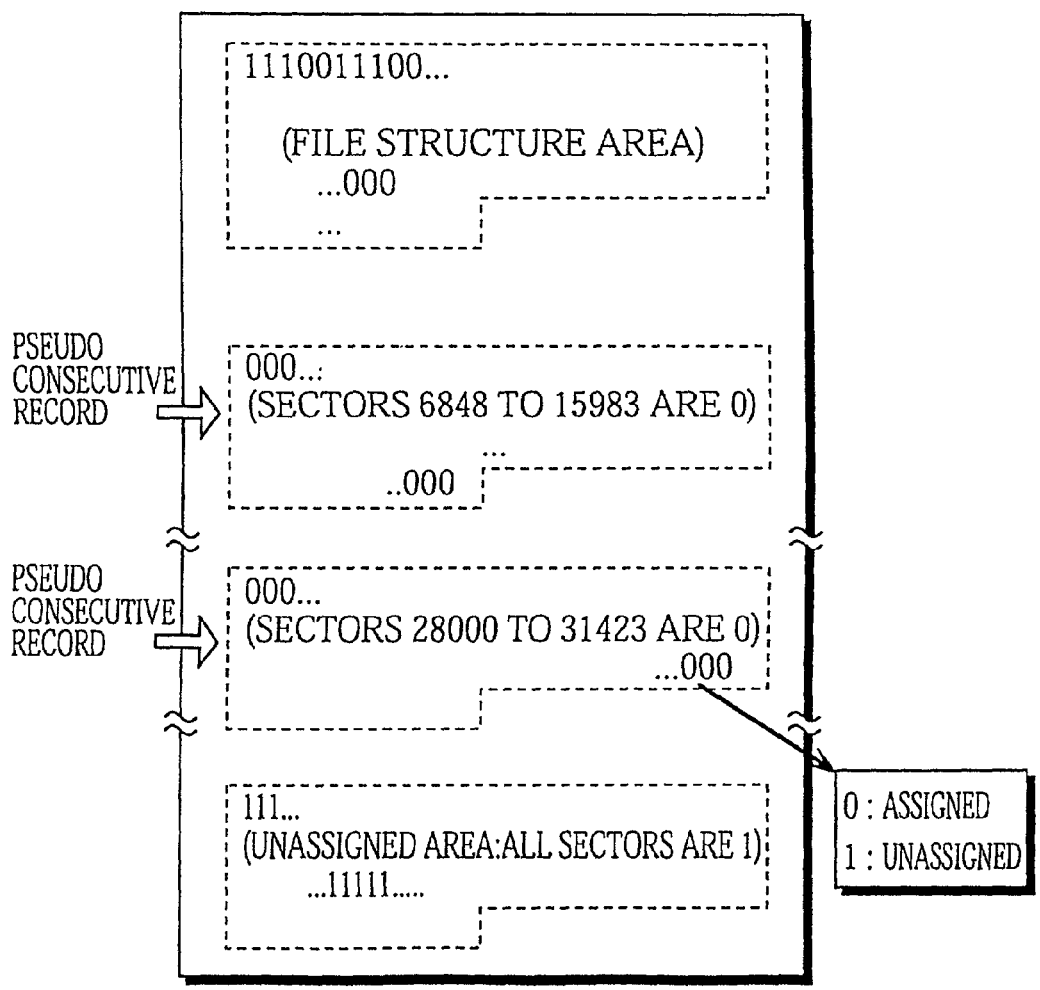
FIG. 36A shows a specific example of the management information.
FIG. 36B shows a space bit map corresponding to the management information shown in FIG. 36A.

FIG. 36A shows a specific example of the management information. FIG. 36B shows a space bit map corresponding to the management information shown in FIG. 36A.

In FIG. 36A, the management information is described as a table including entries e1 and e2. Each entry includes, from left to right in the drawing, a start sector number (LSN: Logical Sector Number), an end sector number, and an attribute. Attribute "0" indicates a pseudo consecutive record; attribute "1" indicates an unassigned area. In the present example, the attribute is always "0."

The area identified by the start and end sector numbers specified by each entry indicates a series of sectors which has been assigned as a whole or a partial pseudo consecutive record.

Here, a relationship between the pseudo consecutive record and the extent which is managed in the file system is described. The pseudo consecutive records and the extents correspond to each other in a one-to-one relation when the extent does not outstep a zone boundary; a plurality of pseudo consecutive records correspond to one extent when the extent outsteps a zone boundary. For example, when an extent outsteps a zone boundary, two pseudo consecutive records are formed before and after the zone boundary, both corresponding to the extent.

(2-1-3) Pseudo Consecutive Record Assignment Management Information and Space Bit Map FIG. 36B shows a space bit map corresponding to the management information shown in FIG. 36A. In the example shown in the drawing, bits corresponding to sectors (sector numbers 6848-15983) of pseudo consecutive area #1 are all "0" indicating "assigned." It is desirable that the management information and the space bit map are managed together so that they reflect each other, although they use different units to indicate the assignment states of the data area. The optical disc recording apparatus sets the bits in the space bit map corresponding to sectors assigned as pseudo consecutive areas to "0" indicating "assigned."

(2-2) Recording/Reproducing Apparatus

Here, the optical disc recording/reproducing apparatus of Embodiment 2 is explained.

(2-2-1) System and Hardware Structure

Embodiment 2 uses the same structures as Embodiment 1 in terms of the system structure shown in FIG. 14, the hardware structure of the DVD recorder shown in FIG. 15, the structure of MPEG encoder 2 shown in FIG. 16, and the structure of MPEG decoder 4 shown in FIG. 17.

Embodiment 2 differs from Embodiment 1 in that (1) pseudo consecutive records, instead of the AV blocks, are assigned to AV data to be recorded, and that (2) pseudo consecutive record assignment management information is used instead of the AV block management table. Accordingly, a program different from the program is stored in the main memory 1d shown in FIG. 15 for use in the present embodiment.

(2-2-2) Function Block Diagram

Figure 37:
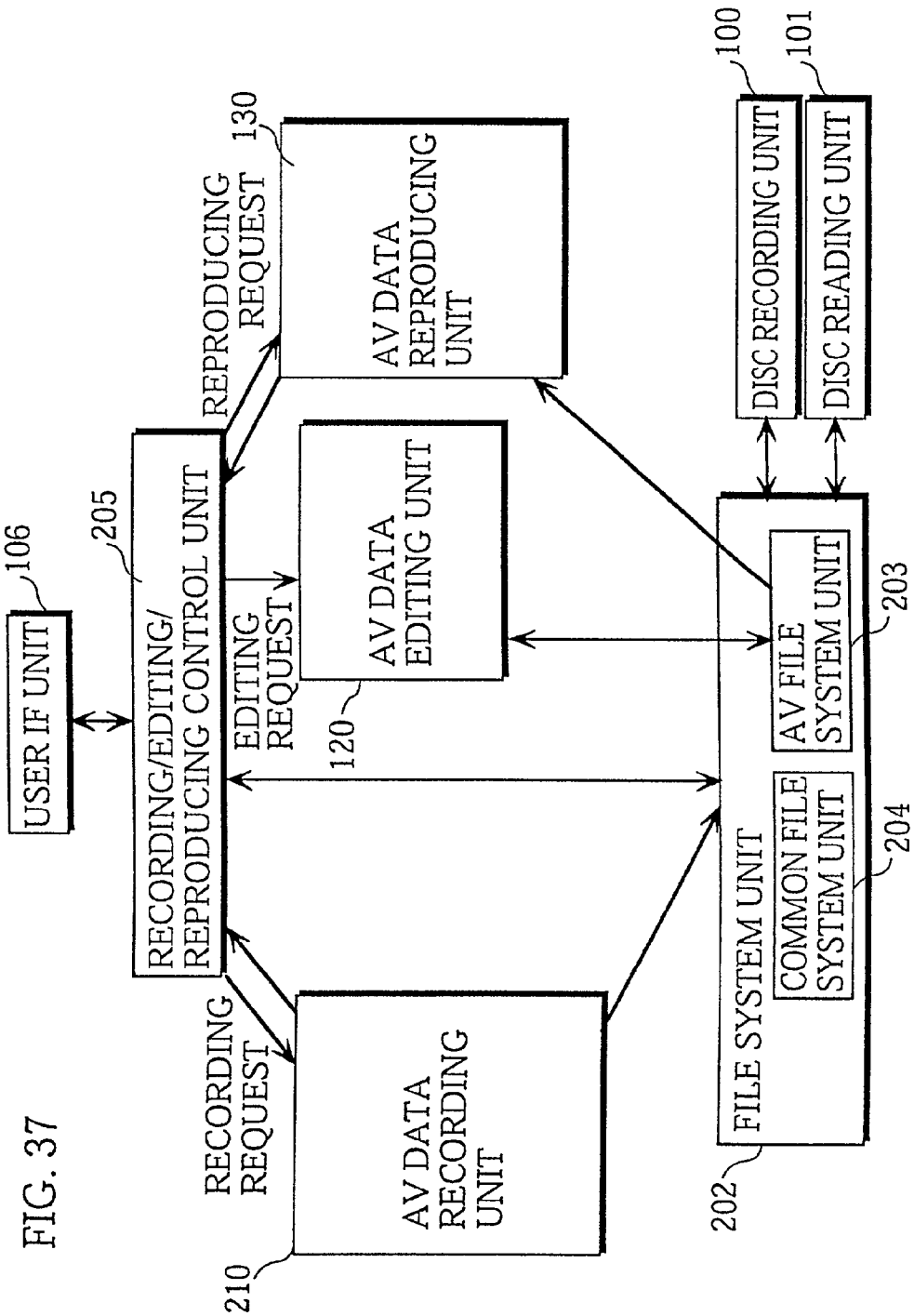
FIG. 37 is a function block diagram showing the construction of the DVD recorder 10 of Embodiment 2 based on the functions of the components.

FIG. 37 is a function block diagram showing the construction of the DVD recorder 10 of Embodiment 2 based on the functions of the components. Each function shown in the figure is achieved after the CPU 1a in the control unit 1 executes the program in the main memory 1d to control the hardware shown in FIG. 14.

In FIG. 37, reference numerals similarly numbered as those in FIG. 18 for Embodiment 1 designate like components, and a recounting of their function will be omitted from the description of this embodiment.

Embodiment 2 differs from Embodiment 1 in that the file system unit 102, recording/editing/reproducing/control unit 105, and AV data recording unit 110 shown in FIG. 18 are not used, but a file system unit 202, recording/editing/ reproducing/control unit 205, and AV data recording unit 210 are used instead.

The file system unit 202 differs from the counterpart in Embodiment 1 in that it includes an AV file system unit 203 and a common file system unit 204 instead of the AV file system unit 103 and a common file system unit 104.

The AV file system unit 203 differs from the AV file system unit 103 only in that it does not support the AV_WRITE command shown in FIG. 21.

The common file system unit 204 differs from the common file system unit 104 only in that the WRITE command is used to write AV data as well as non-AV data onto the disc. That is, the file system unit 202 does not discriminate between AV data and non-AV data, but deals with them equally. The AV data and non-AV data are treated differently by the AV data recording unit 210, AV data editing unit 220, and AV data reproducing unit 230.

The AV data recording unit 210, AV data editing unit 220, and AV data reproducing unit 230, respectively on receiving a recording request, an editing request, and a reproducing request from the recording/editing/reproducing/control unit 205, issues necessary commands to the AV file system unit 103.

The AV data recording unit 210, on receiving a recording request from the control unit 205, issues a command necessary for the requested recording to the AV file system unit 103, and also creates or updates the management information shown in FIG. 36A. More specifically, the AV data recording unit 210, on receiving a recording request, searches for unassigned areas by referring to the space bit map and the management information, assigns an area having a size greater than the earlier-mentioned fixed length of about 7 MB, and also creates a new piece of management information shown in FIG. 36A. Here, when a pseudo consecutive record has already been created, it is desirable that an area following or as close as possible to the existent pseudo consecutive record is assigned as a new pseudo consecutive record. The AV data recording unit 210 then creates a new piece of management information for the newly assigned area.

(2-3-1) Recording of AV Files

Recording of AV files in the DVD recorder 10 is described in detail.

Figure 38:
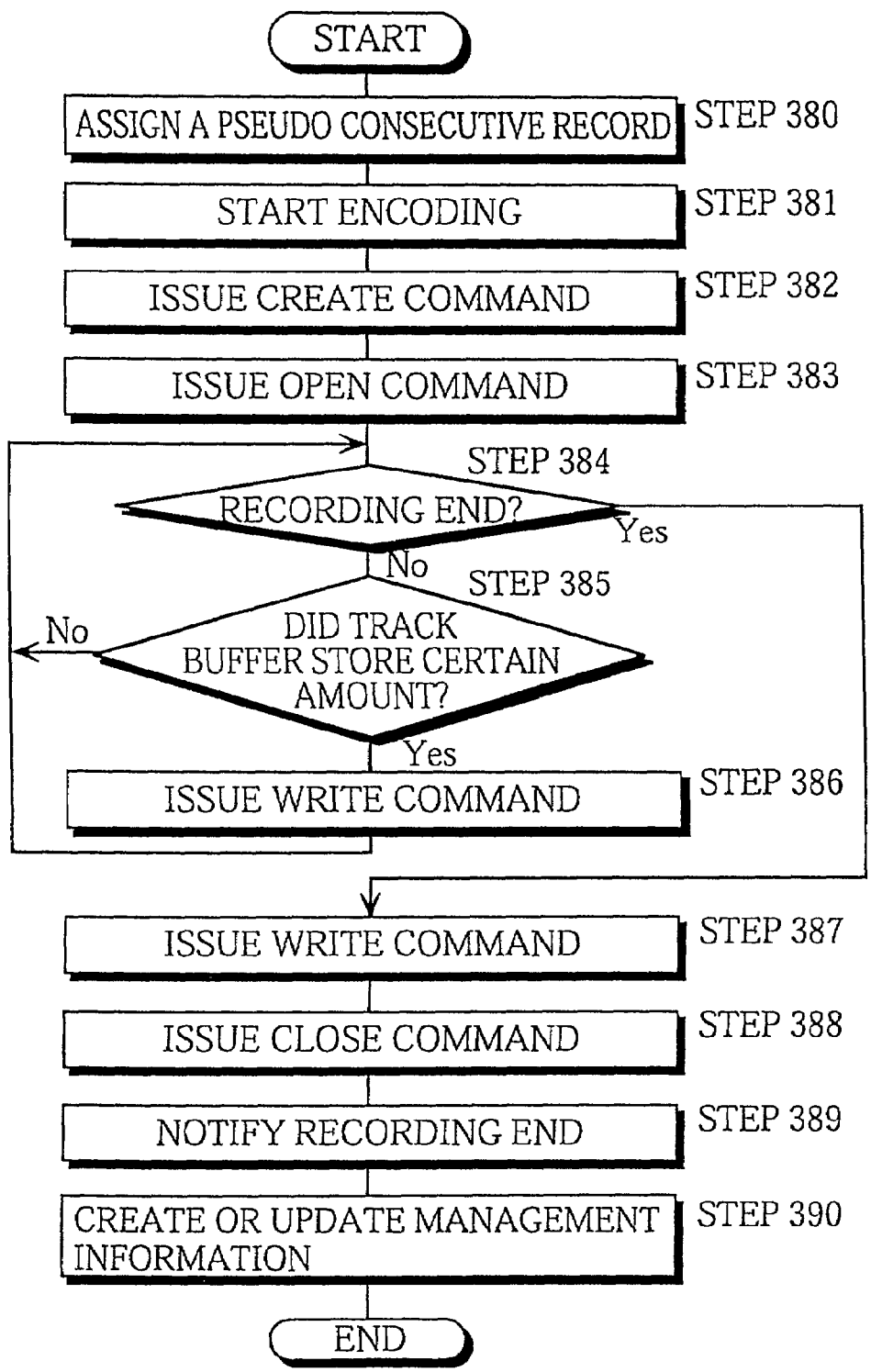
FIG. 38 is a flowchart showing the recording process performed by the AV recorder unit.

FIG. 38 is a flowchart showing the recording process in the DVD recorder of the present embodiment.

When the user presses the RECORD button or when the "current time" reaches the start time of "programmed recording," a notification of recording start is sent to the recording/editing/reproducing/control unit 105 via the user IF unit 106.

On receiving the notification, the control unit 105 assigns an area having a size greater than the predetermined size (about 7 MB) as a pseudo consecutive record (step 380). More specifically, the control unit 105 refers to the space bit map and the management information to detect unassigned consecutive sector areas. The control unit 105 then assigns the detected unassigned consecutive sector areas as a new pseudo consecutive record. In doing so, when other AV data has already been recorded in the disc and when the AV data to be recorded continues from the existent AV data logically, the control unit 105 assigns a consecutive recording area that continues from the already-assigned consecutive recording area of the existent AV data, if it is possible.

The recording/editing/reproducing control unit 105 sends a file identifier and a parameter indicating the "time-ensuring" quality specified as the recording condition to the AV data recording unit 210. The AV data recording unit 210 instructs the MPEG encoder 2 to start encoding the video and audio data of a predetermined channel received through the receiver 9 and transferring the encoded MPEG data to the track buffer 3a (step 381).

The recording/editing/reproducing control unit 105 issues the CREATE command specifying the newly assigned pseudo consecutive record to the common file system unit 204 (step 382). On receiving the command, the common file system unit 204 returns a new file identification descriptor when it is possible to create a file in the newly assigned pseudo consecutive record.

After the above process, the AV data recording unit 210 issues the OPEN command to the AV file system unit 203 (step 383) to allow the AV file system unit 203 to store the file identification descriptor given by the control unit 105 and information on the file entry into a work memory (not illustrated) (the information stored in the work memory is also referred to as "Fd" (File descriptor).

The AV data recording unit 210 issues the WRITE command to the AV file system unit 203 every time the track buffer 3a stores a predetermined amount of MPEG data (steps 385 and 386). The AV data recording unit 210 continues to perform this process until it receives a stop instruction from the control unit 105 (step 384:Yes). Here, it is presumed that the WRITE command is issued to the system unit 203 together with three parameters specified. The three parameters respectively indicate: the Fd having been opened by the OPEN command as described above; the size of data to be recorded; and a buffer (in this embodiment, the track buffer 3a) storing the data.

The Fd specified by the parameter includes, as the file entry does, information of a storage position of an extent and a length of the extent. The information represents the pseudo consecutive record assigned in the step 380. The Fd is updated every time the WRITE command is issued during the period between the opening and closing of the Fd. For the second or a subsequent issue of the WRITE command, new data is additionally written, following the already-recorded data.

On receiving the stop instruction (step 384), the AV data recording unit 210 issues the WRITE command (step 387). The AV data recording unit 210 then issues the CLOSE command (step 388). The AV data recording unit 210 further informs the AV file management information generating unit 112 that a recording of an AV file (VOB) has ended (step 389). The AV data recording unit 210 then refers to the Fd (extent) of the recorded AV data to create or update the management information (step 390). That is, the AV data recording unit 210 creates a new piece of management information when an AV file is recorded for the first time; the AV data recording unit 210 updates the management information and the space bit map when an AV file is additionally recorded. The created or updated management information is recorded into the disc as a non-AV file via the common file system unit 204.

It should be noted here that the WRITE command is issued in step 387 to record onto the disc the rest of the data in the track buffer. Also, the CLOSE command issued in step 255 is a command used to write back the Fd in the work memory onto the DVD-RAM disc as a file identification descriptor, a file entry or the like on the DVD-RAM disc.

As apparent from the above description, when recording AV data, the DVD recorder of the present embodiment dynamically assigns areas as pseudo consecutive records by referring to the space bit map and the management information. As a result, compared with the DVD recorder of Embodiment 1, the DVD recorder of the present embodiment can use the data area on the optical disc more effectively since the data area does not include AV blocks which are logically divided sections.

(3) Embodiment 3

Embodiment 3 differs from Embodiment 2 in that (1) the minimum size of the pseudo consecutive record can be dynamically changed, and (2) the pseudo consecutive record assignment management information is not used. The differences are described as follows.

With regard to the above difference (1), the DVD recorder 10 of the present embodiment determines the minimum size of the pseudo consecutive record in accordance with the bit rate of a video object to be encoded actually, while in Embodiment 2, the minimum size of the pseudo consecutive record is set to a fixed length of about 7 MB to ensure the consecutive reproduction of AV data.

With regard to the above difference (2), the DVD recorder 10 of the present embodiment does not use the management information. Instead, the DVD recorder 10 searches for unassigned areas by referring to the space bit map to assign areas as pseudo consecutive records to AV data to be recorded.

(3-1) Minimum Size of Pseudo Consecutive Record

First, the reason for determining the minimum size of the pseudo consecutive record as mentioned in the above difference (1) is explained.

FIG. 39 shows a model of buffering of AV data into the track buffer, the AV data being read from the DVD-RAM disc by a reproduction apparatus reproducing a video object. This model is created based on minimum specifications required for the reproduction apparatus. As far as these specifications are satisfied, the uninterrupted reproduction is ensured.

In the upper part of FIG. 39, the AV data read from the DVD-RAM disc is subjected to the ECC process. The processed AV data is then temporarily stored in the track buffer (FIFO memory), and is sent to the decoder. In the drawing, "Vr" represents an input transfer rate of the track buffer (rate of data read from an optical disc), and "Vo" represents an output transfer rate of the track buffer (decoder input rate), where Vr>Vo. In this model, Vr=11 Mbps.

The lower part of FIG. 39 is a graph showing the change in the data amount of the track buffer in this model. In the graph, the vertical axis represents the data amount of the track buffer; the horizontal axis represents time. The graph is based on the premise that a pseudo consecutive record #j that has no defective sectors and a pseudo consecutive record #k that has a defective sector are read in the order.

The "T1" represents a time taken for reading out the entire AV data recorded in the pseudo consecutive record #j that has no defective sectors. In this period T1, the data amount of the track buffer increases at the rate of (Vr−Vo).

The "T2" (also referred to as a jump period) represents a time taken by the optical pickup for jumping from the pseudo consecutive record #j to #k. The jump period includes the seek time of the optical pickup and the time required for the rotation of the optical disc to be stabilized. The maximum jump period is equal to the time taken for jumping from the innermost circuit to the outermost circuit. In this model, it is presumed that the maximum jump period is about 1500 mS. In this period T2, the data amount of the track buffer decreases at the rate of Vo.

A period including three periods "T3" to "T5" represents a time taken for reading out the entire AV data recorded in the pseudo consecutive record #k that has a defective sector.

Among these periods T3 to T5, the period T4 represents a time taken for skipping the current ECC block that has a defective sector and moving to the next ECC block. The skipping to the next ECC block is performed when even one defective sector is found in the current ECC block (16 sectors). That means, when a defective sector is found, the problem of the defective sector is solved by not using the whole ECC block (all 16 sectors) including the defective sector, not by logically replacing the defective sector by a replacement sector (replacement ECC block). This method is called ECC block skip method which has been described earlier. The period T4 represents a disc rotation wait time, where the maximum disc rotation wait time is equal to one complete rotation time of the disc. In this model, it is presumed that the maximum disc rotation wait time is about 105 mS. In the periods T3 and T5, the data amount of the track buffer increases at the rate of (Vr−Vo). In the periods T4, the data amount decreases at the rate of Vo.

The size of the pseudo consecutive record is represented as "N_ecc*16*8*2048," where the "N_ecc" represents the total number of ECC blocks included in the pseudo consecutive record. The smallest value of N_ecc, namely the minimum size of the pseudo consecutive record is calculated through the following procedure.

In the period T2, AV data is read from the track buffer. Only this is performed. If the buffer capacity becomes 0 during this period, an underflow occurs to the decoder. When this happens, the uninterrupted reproduction of the AV data cannot be ensured. Here, to ensure the uninterrupted reproduction of the AV data (not to generate the underflow), the following formula need be satisfied.

$$\text{(storage amount B)} \geq \text{(consumption amount R)} \qquad \text{<Formula 6>}$$

The storage amount B is the amount of data that has been accumulated in the track buffer at the end of the period T1. The consumption amount R is the total amount of data read during the period T2.

The storage amount B is calculated using the following formula.

$$\begin{aligned}\text{(storage amount } B) &= (\text{period } T1)*(Vr-Vo) = \text{(read out time of one pseudo consecutive record)}*(Vr-Vo)\\ &= (L/Vr)*(Vr-Vo) = (N\_ecc*16*8*2048/Vr)*(Vr-Vo)\\ &= (N\_ecc*16*8*2048)*(1-Vo/Vr)\end{aligned} \qquad \text{<Formula 7>}$$

In this formula, "L" represents the size of the pseudo consecutive record.

The consumption amount R is calculated using the following formula.

$$\text{(consumption amount } R) = T2*Vo \qquad \text{<Formula 8>}$$

Replacing both sides of the Formula 6 respectively by Formula 7 and Formula 8 gives us the following formula.

$$(N\_ecc*16*8*2048)*(1-Vo/Vr) \geq T2*Vo \qquad \text{<Formula 9>}$$

From the Formula 9, it is derived that "N_ecc" representing the total number of ECC blocks included in the pseudo consecutive record should satisfy the following formula to ensure the uninterrupted reproduction of the AV data.

$$N\_ecc \geq Vo*Tj/((16*8*2048)*(1-Vo/Vr)) \qquad \text{<Formula 10>}$$

In this formula, "Tj" represents the Dump period that has been described earlier. The maximum jump period is about 1.5 seconds. "Vr" is a fixed value (In the reproduction apparatus model shown in the upper part of FIG. 39, Vr=11 Mbps). Also, considering that the video object is represented by a variable bit rate, "Vo" is obtained from the following Formula 11. That is, "Vo" is obtained from Formula 11 not as the maximum value of the physical transfer rate of the track buffer output, but as a substantial decoder input rate for AV data represented by a variable bit rate. In Formula 11, concerning the pseudo consecutive record length, N_pack is the total number of packs included in the video object that should be recorded in N_ecc ECC blocks.

$$\begin{aligned}Vo &= \text{(pseudo consecutive record length (bits))}*(1/\text{reproduction time of pseudo consecutive record (sec)})\\ &= (N\_pack*2048*8)*(27\,M/(SCR\_first_{13}\,next-SCR\_first\_current))\end{aligned} \qquad \text{<Formula 11>}$$

In the above formula, "SCR_first_current" is a time (in 1/(27 mega) seconds) at which the track buffer of the reproduction apparatus should output the first pack of the video object, and $SCR_{13}$ first_next is a time (in 1/(27 mega) seconds) at which the track buffer of the reproduction apparatus should output the first pack of the following video object.

As shown in the above Formulas 10 and 11, the minimum size of the pseudo consecutive record can theoretically be calculated in accordance with the bit rate of AV data.

Formula 10 cannot be applied to a case where any defective sectors exist on the optical disc. Such a case is explained below in terms of the value of "N_ecc" required to ensure the uninterrupted reproduction, the "N_ecc" representing the number of ECC blocks in the pseudo consecutive record.

It is presumed here that the pseudo consecutive record includes ECC blocks with defective sectors the number of which is represented as "dN_ecc." No Av data is recorded into the dN_ecc defective ECC blocks due to the ECC block skipping which has been described earlier. The loss time Ts generated by skipping the dN_ecc defective ECC blocks is represented as "T4*dN ecc," where "T4" represents the ECC block skip time for the model shown in FIG. 39.

With the above description taken into account, to ensure the uninterrupted reproduction of the AV data even if defective sectors are included, the pseudo consecutive record need to include as many ECC blocks as represented by the following formula.

$$N\_ecc \geq dN\_ecc + Vo*(Tj+Ts)/((16*8*2048)*(1-Vo/Vr)) \qquad \text{<Formula 12>}$$

As apparent from the above description, the size of the pseudo consecutive record is calculated from Formula 10 when no defective sector is included, and from Formula 12 when any defective sectors are included.

It should be noted here that when an AV data sequence is composed of a plurality of pseudo consecutive records, the first and last pseudo consecutive records need not satisfy the Formula 10 or 12. This is because the last pseudo consecutive record has no subsequent AV data, and that the uninterrupted reproduction between the first and second pseudo consecutive records is ensured by delaying the timing of the decode start, namely by starting supplying data to the decoder after the track buffer stores a certain amount of data.

(3-2) Recording of AV Files

Recording of AV files in the DVD recorder 10 is described in detail.

Figure 40:
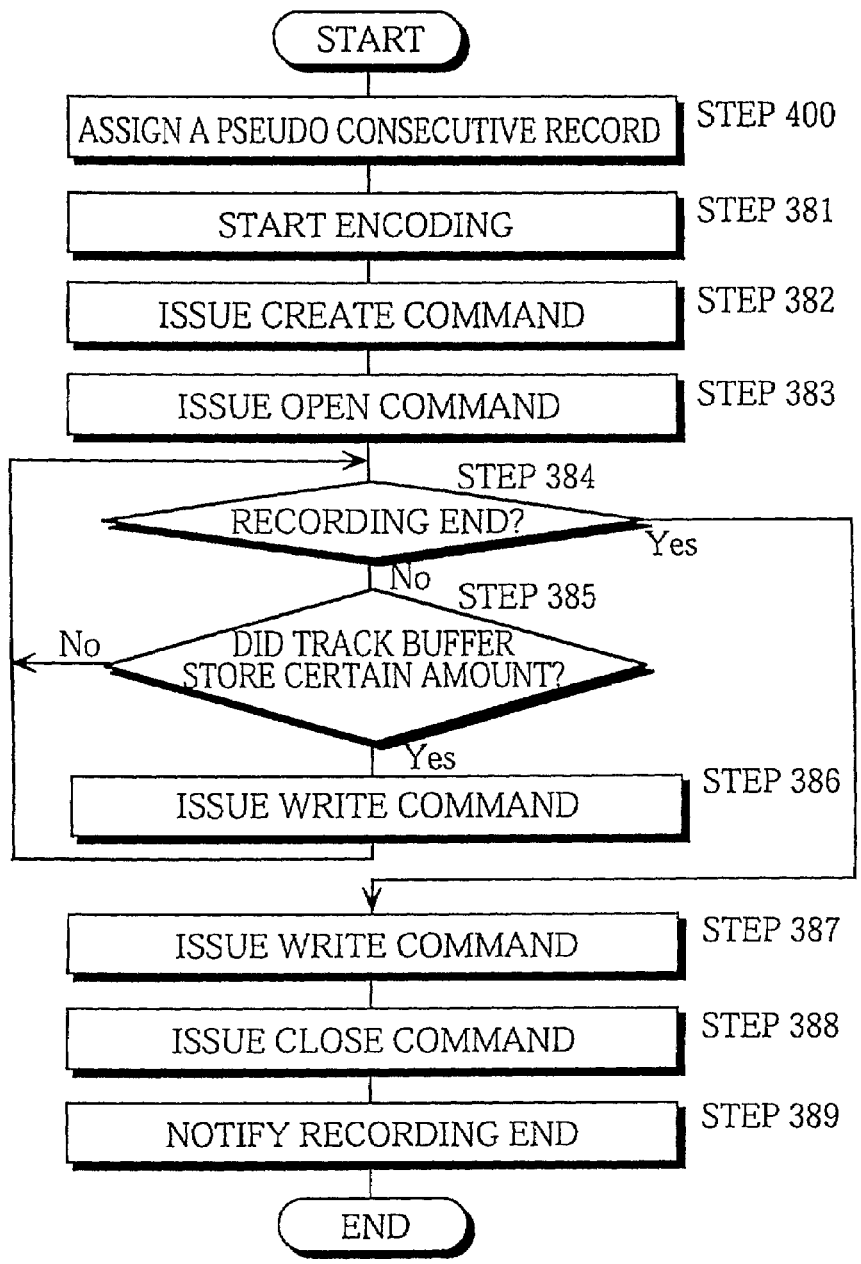
FIG. 40 is a flowchart showing the recording process in the DVD recorder of Embodiment 3.

FIG. 40 is a flowchart showing the recording process in the DVD recorder of the present embodiment. The flowchart is the same as FIG. 38 except that the step 380 is replaced with step 400 and the step 390 is deleted.

The flowchart of FIG. 40 is described concentrating on the differences.

When the user presses the RECORD button or when the "current time" reaches the start time of "programmed recording," a notification of recording start is sent to the recording/editing/reproducing/control unit 105 via the user IF unit 106.

On receiving the notification, the control unit 105 assigns an area having a size greater than the above-described minimum size as a pseudo consecutive record (step 400). More specifically, the control unit 105 calculates the actual bit rate of the video object using the Formulas 10 and 11. However, here, a predetermined size satisfying the minimum size may be used instead for the sake of conveniences. The control unit 105 refers to the space bit map and each allocation descriptor of the file management area to detect unassigned areas on the optical disc, creates a free space list showing the detected areas, and assigns an area among the detected areas which is larger than the minimum size as a pseudo consecutive record. In doing so, an area including a zone boundary is treated as two unassigned areas, before and after the zone boundary.

Figure 41:
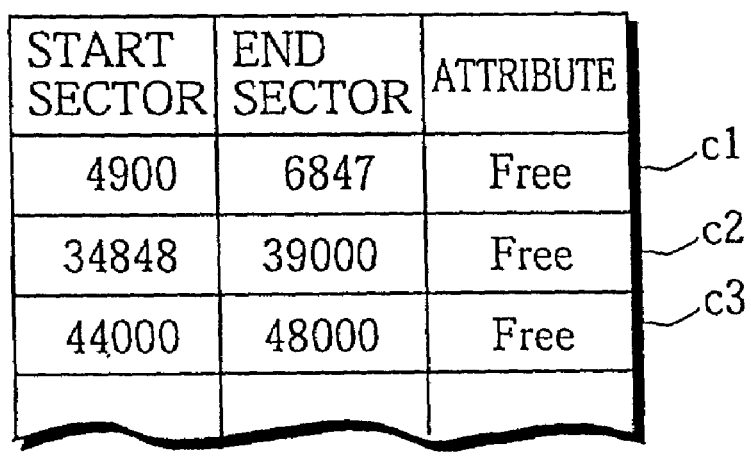
FIG. 41 shows a free space list.

FIG. 41 shows a free space list. In the drawing, the "start sector" column shows the start sector numbers of the unassigned areas; the "end sector" column shows the end sector numbers of the unassigned areas; and the "attribute" column shows whether the corresponding areas are assigned. The "Free" shown in the drawing indicates that the corresponding area is not assigned.

Presuming the minimum size is determined to be about 7 MB (3500 sectors), it is found that unassigned area c1 is smaller than this value, and unassigned areas c2 and c3 are both greater than this value. In this case, the recording/editing/reproducing/control unit 105 assigns the unassigned areas c2 and c3 as pseudo consecutive records.

The same steps as FIG. 38 follow the above step. It should be noted here that when recording AV data, the AV data recording unit 210 uses the unassigned areas located on the innermost side first by referring to the free space list, followed by the unassigned areas in order from the innermost to the outermost areas of the optical disc. Also note that the free space list is not recorded on the optical disc.

FIG. 42 is a flowchart detailing the procedure of assigning the pseudo consecutive record performed in the step 400 of FIG. 40.

The control unit 105 refers to the space bit map and each allocation descriptor of the file management area to detect unassigned areas on the optical disc (step 421). In doing so, the control unit 105 may disregard areas that are so small to record AV data (e.g., several-hundred kilobytes in size).

The control unit 105 creates the free space list based on the detected unassigned areas (step 422). In doing so, an area including a zone boundary is treated as two unassigned areas, before and after the zone boundary. It should be noted here that the control unit 105 judges whether an area includes a zone boundary by inquiring the AV file system unit 103, that is, by issuing the SEARCH_DISCON command shown in FIG. 21. The positions of zone boundaries on the optical disc are fixedly set in advance, and are stored and managed by the AV file system unit 103.

Furthermore, the control unit 105 determines the minimum size of the pseudo consecutive record using the Formulas 10 and 11 (step 423). Here, when defective sectors are found, the control unit 105 uses the Formulas 12 and 11. To simplify this process, the control unit 105 may determine the minimum size of the pseudo consecutive record using a bit rate of AV data determined in advance in compliance with the picture quality (e.g., a quality classified into "high," "standard," and and "time-ensuring" shown in FIG. 24), an expected rate of defective sectors, and a margin.

The recording/editing/reproducing/control unit 105 then assigns an area among the detected areas which is larger than the minimum size as a pseudo consecutive record, and determines the recording order (step 424). The order is determined to be, for example, from the innermost side to the outermost side of the disc so that the seek move is as small as possible.

As described above, when recording AV data, the DVD recorder of the present embodiment dynamically assigns unassigned areas as pseudo consecutive records by referring to the space bit map and each allocation descriptor of the file management area. As a result, different from Embodiment 2, the DVD recorder of the present embodiment dynamically assigns pseudo consecutive records for recording AV data, without recording the pseudo consecutive record assignment management information.

It should be noted here that in Embodiment 3, the free space list is created for each recording. However, the DVD recorder may create the free space list when the optical disc is loaded into the optical disc drive, and may update the free space list each time the DVD recorder records AV data.

Also, the DVD recorder may create and record the free space list onto the optical disc, refer to the recorded free space list before recording AV data, and update the list after the recording of the AV data.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical disc recording apparatus for recording video objects on an optical disc, wherein
a recording area of the optical disc is divided into a plurality of blocks, each of which is composed of a set of N_sec consecutive sectors, each sector having a size of S_size bytes,
the optical disc records sector information showing data assignment for each sector on the optical disc,
said optical disc recording apparatus comprising:
a reading unit operable to read the sector information from the optical disc;
a detecting unit operable to detect a series of consecutive unassigned sectors on the optical disc by referring to the read sector information, a total size of the series being no smaller than a predetermined size that corresponds to a data amount that ensures the reproduction apparatus for uninterrupted reproduction of the video object; and
a recording unit operable to divide and record a video object onto two or more series of consecutive unassigned sectors detected by the detecting unit, and
the predetermined size is the number of blocks which is represented as "N" in the following formula:

$N=dN+Vo*(Tj+Ts)/((N\_sec*8*S\_size)*(1-Vo/Vr))$, where "dN" is a number of blocks, in the series of consecutive unassigned sectors, that include defective sectors, "Tj" represents a maximum jump time of an optical pickup of a reproduction apparatus, "Ts" represents a time taken by the optical pickup to skip dN blocks, "Vr" represents an input transfer rate of a track buffer of the reproduction apparatus, and "Vo" represents an effective output transfer rate of the track buffer.

2. The optical disc recording apparatus of claim 1 further comprising
unit operable to generate management information showing areas of the optical disc where the video object has been recorded by the recording unit.

3. An optical disc recording method for recording video objects on an optical disc, wherein
a recording area of the optical disc is divided into a plurality of blocks, each of which is composed of a set of N_sec consecutive sectors, each sector having a size of S_size bytes,
the optical disc records sector information showing data assignment for each sector on the optical disc,
said optical disc recording method comprising:
a reading step for reading the sector information from the optical disc;
a detecting step for detecting a series of consecutive unassigned sectors on the optical disc by referring to the read sector information, a total size of the series being no smaller than a predetermined size that corresponds to a data amount that ensures the reproduction apparatus for uninterrupted reproduction of the video object; and a recording step for dividing and recording a video object onto two or more series of consecutive unassigned sectors detected by the detecting unit, and the predetermined size is the number of blocks which is represented as "N" in the following formula:

$$N=dN+Vo*(Tj+Ts)/((N\_sec*8*S\_size)*(1-Vo/Vr)),$$

where "dN" is a number of blocks, in the series of consecutive unassigned sectors, that include defective sectors, "Tj" represents a maximum jump time of an optical pickup of a reproduction apparatus, "Ts" represents a time taken by the optical pickup to skip dN blocks, "Vr" represents an input transfer rate of a track buffer of the reproduction apparatus, and "Vo" represents an effective output transfer rate of the track buffer.

4. The optical disc recording method of claim 3 further comprising
a step for generating management information showing areas of the optical disc where the video object has been recorded by the recording unit.

5. A computer-readable recording medium recording a program for recording video objects on an optical disc, wherein a recording area of the optical disc is divided into a plurality of blocks, each of which is composed of a set of N_sec consecutive sectors, each sector having a size of S_size bytes, the optical disc records sector information showing data assignment for each sector on the optical disc, said program causing a computer to execute:

a reading step for reading the sector information from the optical disc;

a detecting step for detecting a series of consecutive unassigned sectors on the optical disc by referring to the read sector information, a total size of the series being no smaller than a predetermined size that corresponds to a data amount that ensures the reproduction apparatus for uninterrupted reproduction of the video object; and a recording step for dividing and recording a video object onto two or more series of consecutive unassigned sectors detected by the detecting unit, and the predetermined size is the number of blocks which is represented as "N" in the following formula:

$$N=dN+Vo*(Tj+Ts)/((N\_sec*8*S\_size)*(1-Vo/Vr)),$$

where "dN" is a number of blocks, in the series of consecutive unassigned sectors, that include defective sectors, "Tj" represents a maximum jump time of an optical pickup of a reproduction apparatus, "Ts" represents a time taken by the optical pickup to skip dN blocks, "Vr" represents an input transfer rate of a track buffer of the reproduction apparatus, and "Vo" represents an effective output transfer rate of the track buffer.

6. The computer-readable recording medium of claim 5, wherein
the program further causes the computer to execute
a step for generating management information showing areas of the optical disc where the video object has been recorded by the recording unit.

7. A rewritable optical disc, wherein a recording area of the optical disc is divided into a plurality of blocks, each of which is composed of a set of N_sec consecutive sectors, each sector having a size of S_size bytes, the recording area recording a series of consecutive unassigned sectors, a total size of the series being no smaller than a predetermined size that corresponds to a data amount that ensures a reproduction apparatus for uninterrupted reproduction of the video object, the recording area recording sector information showing data assignment for each sector on the optical disc, and the predetermined size is the number of blocks which is represented as "N" in the following formula:

$$N=dN+Vo*(Tj+Ts)/((N\_sec*8*S\_size)*(1-Vo/Vr)),$$

where "dN" is a number of blocks, in the series of consecutive unassigned sectors, that include defective sectors, "Tj" represents a maximum jump time of an optical pickup of the reproduction apparatus, "Ts" represents a time taken by the optical pickup to skip dN blocks, "Vr" represents an input transfer rate of a track buffer of the reproduction apparatus, and "Vo" represents an effective output transfer rate of the track buffer.

8. The rewritable optical disc of claim 7 further recording management information showing areas of the optical disc where the video object has been recorded.

9. An optical disc recording apparatus in which an optical disc is inserted, wherein a recording area of the optical disc is divided into a plurality of blocks, each of which is composed of a set of N_sec consecutive sectors, each sector having a size of S_size bytes, the optical disc records sector information showing data assignment for each sector on the optical disc, said optical disc recording apparatus comprising:

a reading unit operable to read the sector information from the optical disc;

a detecting unit operable to detect a series of consecutive unassigned sectors on the optical disc by referring to the read sector information, a total size of the series being no smaller than a predetermined size that corresponds to a data amount that ensures the reproduction apparatus for uninterrupted reproduction of the video object; and a recording unit operable to divide and record a video object onto two or more series of consecutive unassigned sectors detected by the detecting unit, and the predetermined size is the number of blocks which is represented as "N" in the following formula:

$$N=dN+Vo*(Tj+Ts)/((N\_sec*8*S\_size)*(1-Vo/Vr)),$$

where "dN" is a number of blocks, in the series of consecutive unassigned sectors, that include defective sectors, "Tj" represents a maximum jump time of an optical pickup of a reproduction apparatus, "Ts" represents a time taken by the optical pickup to skip dN blocks, "Vr" represents an input transfer rate of a track buffer of the reproduction apparatus, and "Vo" represents an effective output transfer rate of the track buffer.

10. The optical disc recording apparatus of claim 9 further comprising
unit operable to generate management information showing areas of the optical disc where the video object has been recorded by the recording unit.

* * * * *